US011317013B2

(12) United States Patent
Aoki

(10) Patent No.: US 11,317,013 B2
(45) Date of Patent: Apr. 26, 2022

(54) FOCUS ADJUSTMENT OPERATION DETECTION DEVICE, FOCUS ADJUSTMENT OPERATION DETECTION METHOD, FOCUS ADJUSTMENT OPERATION DETECTION PROGRAM, IMAGING DEVICE MAIN BODY, AND IMAGING DEVICE

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/006,924

(22) Filed: Aug. 31, 2020

(65) Prior Publication Data

US 2020/0404156 A1 Dec. 24, 2020

Related U.S. Application Data

(63) Continuation of application No. PCT/JP2019/002046, filed on Jan. 23, 2019.

(30) Foreign Application Priority Data

Mar. 1, 2018 (JP) ............................. JP2018-036754

(51) Int. Cl.
*H04N 5/232* (2006.01)
*G03B 13/34* (2021.01)
*G03B 17/14* (2021.01)

(52) U.S. Cl.
CPC ......... *H04N 5/23212* (2013.01); *G03B 13/34* (2013.01); *G03B 17/14* (2013.01)

(58) Field of Classification Search
CPC ........... H04N 5/23212; H04N 5/23287; H04N 5/232127; H04N 5/2253; H04N 5/36961;
(Continued)

(56) References Cited

U.S. PATENT DOCUMENTS

2011/0194018 A1* 8/2011 Kosaka .............. H04N 5/23296 348/349
2015/0319356 A1* 11/2015 Ohara .............. H04N 5/232122 348/349
(Continued)

FOREIGN PATENT DOCUMENTS

JP 2004177476 6/2004
JP 2012008522 1/2012
(Continued)

OTHER PUBLICATIONS

"International Search Report (Form PCT/ISA/210) of PCT/JP2019/002046," dated Apr. 9, 2019, with English translation thereof, pp. 1-4.
(Continued)

*Primary Examiner* — Gevell V Selby
(74) *Attorney, Agent, or Firm* — JCIPRNET

(57) ABSTRACT

Provided are a focus adjustment operation detection device, a focus adjustment operation detection method, a focus adjustment operation detection program, an imaging device main body, and an imaging device capable of accurately detecting a focus adjustment operation of an imaging lens. An optical image passed through the imaging lens is received, and a phase difference of the received optical image is detected for each of a plurality of divided areas. Whether or not the focus adjustment operation of the imaging lens is performed is detected based on the amount of change in the phase difference for each divided area.

11 Claims, 35 Drawing Sheets

(58) Field of Classification Search
CPC ......... H04N 5/23209; H04N 5/232122; H04N 5/225; G03B 13/34; G03B 17/14; G03B 13/36
See application file for complete search history.

(56) References Cited

U.S. PATENT DOCUMENTS

| | | | | |
|---|---|---|---|---|
| 2017/0214845 | A1* | 7/2017 | Ohara ................ | H04N 5/23218 |
| 2017/0289436 | A1 | 10/2017 | Katsuyama et al. | |
| 2018/0176453 | A1* | 6/2018 | Yamazaki ............ | H04N 5/3696 |

FOREIGN PATENT DOCUMENTS

| | | |
|---|---|---|
| JP | 2012108243 | 6/2012 |
| JP | 2013015751 | 1/2013 |
| JP | 2015231192 | 12/2015 |
| JP | 2016148832 | 8/2016 |
| JP | 2017182054 | 10/2017 |

OTHER PUBLICATIONS

"International Preliminary Report on Patentability (Form PCT/IPEA/409) of PCT/JP2019/002046," completed on Sep. 27, 2019, with English translation thereof, pp. 1-23.
"Office Action of Japan Counterpart Application", dated Oct. 29, 2021, with English translation thereof, p. 1-p. 5.

* cited by examiner

FOCUS ADJUSTMENT OPERATION DETECTION DEVICE, FOCUS ADJUSTMENT OPERATION DETECTION METHOD, FOCUS ADJUSTMENT OPERATION DETECTION PROGRAM, IMAGING DEVICE MAIN BODY, AND IMAGING DEVICE

CROSS-REFERENCE TO RELATED APPLICATIONS

The present application is a Continuation of PCT International Application No. PCT/JP2019/002046 filed on Jan. 23, 2019 claiming priority under 35 U.S.C § 119(a) to Japanese Patent Application No. 2018-036754 filed on Mar. 1, 2018. Each of the above applications is hereby expressly incorporated by reference, in its entirety, into the present application.

BACKGROUND OF THE INVENTION

1. Field of the Invention

The present invention relates to a focus adjustment operation detection device, a focus adjustment operation detection method, a focus adjustment operation detection program, an imaging device main body, and an imaging device, and particularly to focus adjustment operation detection device, a focus adjustment operation detection method, a focus adjustment operation detection program, an imaging device main body, and an imaging device for detecting a focus adjustment operation of an imaging lens.

2. Description of the Related Art

In general, in an interchangeable lens type camera, a camera main body and an interchangeable lens are connected so as to communicate with each other. Normally, in a case where the interchangeable lens is manually operated, operation information is transmitted to the camera main body. Thus, an operation state of the interchangeable lens can be recognized even on the camera main body side by receiving the information transmitted from the interchangeable lens.

However, some interchangeable lenses do not have a function of communicating with the camera main body. In a case where this type of interchangeable lens is attached to the camera main body, the camera main body cannot recognize the operation state of the interchangeable lens.

JP2016-148832A describes a technology for detecting an operation performed on an interchangeable lens based on changes in a contrast value and a luminance value of a subject image acquired via an image sensor.

SUMMARY OF THE INVENTION

However, in a case where detection of a focus adjustment operation is focused on, since the method of JP2016-148832A has a disadvantage that accurate detection cannot be performed since a case where the subject moves and a case where focus adjustment is performed cannot be clearly distinguished.

The present invention has been made in view of the above circumstances, and an object of the present invention is to provide a focus adjustment operation detection device, a focus adjustment operation detection method, a focus adjustment operation detection program, an imaging device main body, and an imaging device that can accurately detect a focus adjustment operation of an imaging lens.

Means for solving the aforementioned problems are as follows.

(1) A focus adjustment operation detection device comprises a phase difference detection unit that receives an optical image passed through an imaging lens, and detects a phase difference of the received optical image for each divided area of a plurality of divided areas, and a focus adjustment operation detection unit that detects whether or not a focus adjustment operation of the imaging lens is performed based on an amount of change in the phase difference for each divided area detected by the phase difference detection unit.

According to the present aspect, the phase difference of the optical image passed through the imaging lens is detected for each divided area. Whether or not the focus adjustment operation of the imaging lens is performed is detected based on the amount of change in the phase difference for each detected divided area. That is, in a case where the focus of the imaging lens is adjusted, since the phase difference for each divided area changes, whether or not the focus adjustment operation is performed is detected by detecting the amount of change in the phase difference for each divided area. Accordingly, whether or not the focus adjustment operation is performed can be accurately detected.

(2) In the focus adjustment operation detection device according to (1), the focus adjustment operation detection unit detects whether or not the focus adjustment operation of the imaging lens is performed based on whether or not the phase differences detected for the divided areas change as a whole.

According to the present aspect, whether or not the focus adjustment operation of the imaging lens is performed is detected based on whether or not the phase differences detected for the divided areas change as a whole. In a case where the focus of the imaging lens is adjusted, the phase differences detected for the divided areas change as a whole. That is, the phase differences change in all the divided areas. Thus, it is possible to discriminate whether or not the focus adjustment is performed by determining whether or not the phase differences detected for the divided areas change as a whole.

(3) In the focus adjustment operation detection device according to (1) or (2), the focus adjustment operation detection unit detects whether or not the focus adjustment operation of the imaging lens is performed based on a frequency distribution of the amount of change in the phase difference detected for each divided area.

In a case where the focus is adjusted, the frequency distribution of the amount of change in the phase difference detected for each divided area is a predetermined distribution. That is, the distribution is a distribution in which the frequencies are concentrated in the vicinity of the specific amount of change. Thus, whether or not the focus adjustment operation is performed can be discriminated by obtaining the frequency distribution of the amount of change in the phase difference detected for each divided area. The "frequency distribution of the amount of change in the phase difference" mentioned herein is the distribution of the number of divided areas having the same amount of change in the phase difference. In a case where the focus is adjusted, almost the same amount of change in the phase difference is shown in many divided areas. In this case, in a case where the frequency distribution of the amount of change in the phase difference detected for each divided area is obtained, the distribution is a distribution in which the frequencies are concentrated in the vicinity of the specific amount of change. Thus, whether or not the focus adjustment operation is performed can be discriminated by obtaining the frequency distribution of the amount of change in the phase difference detected for each divided area.

(4) The focus adjustment operation detection device according to any one of (1) to (3) further comprises a reliability determination unit that determines reliability of the phase difference detected for each divided area. The focus adjustment operation detection unit detects whether or not the focus adjustment operation of the imaging lens is performed based on the amount of change in the phase difference of the divided area in which the reliability determination unit determines that the phase difference is reliable.

According to the present aspect, the reliability of the phase difference in each detected divided area is determined, and whether or not the focus adjustment operation of the imaging lens is performed is detected based only on the amount of change in the phase difference in the reliable divided area. Accordingly, whether or not the focus detection operation is performed can be more accurately detected.

(5) The focus adjustment operation detection device according to any one of (1) to (4) further comprises a moving body detection unit that detects a moving body within an area to be captured through the imaging lens. The focus adjustment operation detection unit detects whether or not the focus adjustment operation of the imaging lens is performed by excluding the divided area in which the moving body is present.

According to the present aspect, the moving body is further detected. The focus adjustment operation detection unit detects whether or not the focus adjustment operation is performed by excluding the divided area in which the moving body is present. That is, whether or not the focus adjustment operation of the imaging lens is performed is detected based on the amount of change in the phase difference in the divided area other than the divided area in which the moving body is present. In the area in which the moving body is present, the phase difference fluctuates regardless of whether or not the focus adjustment is performed. Thus, more stable and highly accurate detection can be performed by excluding the area from the detection target.

(6) The focus adjustment operation detection device according to any one of (1) to (5) further comprises a first luminance detection unit that individually detects luminance for each divided area. The focus adjustment operation detection unit detects whether or not the focus adjustment operation of the imaging lens is performed by excluding the divided area in which a change in the luminance for each divided area is equal to or greater than a first threshold value.

According to the present aspect, the luminance of each divided area is further detected individually. The focus adjustment operation detection unit detects whether or not the focus adjustment operation is performed by excluding the divided areas in which the change in the luminance is equal to or greater than the first threshold value. That is, whether or not the focus adjustment operation of the imaging lens is performed is detected based on the change in the phase difference of the divided area in which the change in the luminance is other than the first threshold value. In general, in the area in which the moving body is present, the luminance changes greatly. Thus, it is possible to perform more stable and highly accurate detection by excluding the divided area having a large luminance (area having the first threshold value or greater) from the detection target.

(7) The focus adjustment operation detection device according to any one of (1) to (6) further comprises a second luminance detection unit that detects luminance of an entire area to be captured through the imaging lens. In a case where a change in the luminance of the entire area to be captured is equal to or less than a second threshold value, the focus adjustment operation detection unit detects whether or not the focus adjustment operation of the imaging lens is performed.

According to the present aspect, the luminance of the entire captured area is further detected. The focus adjustment operation detection unit detects whether or not the focus adjustment operation of the imaging lens is performed in a case where the change in the luminance of the entire captured area is equal to or less than the second threshold value. In a case where the stop is operated, the entire luminance changes. Usually, the phase difference detected in each divided area also changes simultaneously with the change in the entire luminance. Thus, in a case where the entire luminance changes greatly (case where the entire luminance exceeds the second threshold value), the detection of the focus adjustment operation is stopped. Accordingly, it is possible to perform more stable and highly accurate detection. Usually, in a case where the captured area changes greatly, the phase difference detected in each divided area also changes. Usually, the entire luminance changes simultaneously with the change in the phase difference. Thus, in a case where the entire luminance changes greatly, the detection of the focus adjustment operation is stopped. Accordingly, it is possible to perform more stable and highly accurate detection.

(8) The focus adjustment operation detection device according to any one of (1) to (7) further comprises an angle-of-view change detection unit that detects a change in an angle of view. In a case where the angle of view detected by the angle-of-view change detection unit is maintained at a constant value, the focus adjustment operation detection unit detects whether or not the focus adjustment operation of the imaging lens is performed.

According to the present aspect, the change in the angle of view is further detected. The focus adjustment operation detection unit detects whether or not the focus adjustment operation of the imaging lens is performed in a case where the detected angle of view is maintained at a constant value. In a case where the angle of view changes, the phase difference detected in each divided area changes. Thus, in a case where the angle of view changes, the detection of the focus adjustment operation is stopped. Accordingly, it is possible to perform more stable and highly accurate detection.

(9) The focus adjustment operation detection device according to any one of (1) to (8) further comprises a notification unit that notifies of the detection in a case where the focus adjustment operation detection unit detects the focus adjustment operation of the imaging lens.

According to the present aspect, the notification is performed in a case where the focus adjustment operation of the imaging lens is detected. Accordingly, the user can recognize whether or not the detection is performed.

(10) An imaging device main body comprises a mount which an imaging lens is attachable to and detachable from, an image sensor that images an optical image passed through the imaging lens, and the focus adjustment operation detection device according to any one of (1) to (9).

According to the present aspect, the focus adjustment operation detection device is provided in the imaging device main body of the so-called interchangeable lens type imaging device. Accordingly, for example, even in a case where the imaging lens and the imaging device main body cannot communicate with each other, the focus adjustment operation performed on the imaging lens side can be detected on the imaging device main body side. The imaging lens mentioned herein is attached to the imaging device main body via a so-called mount adapter.

(11) The imaging device main body according to (10) further comprises a communication availability determination unit that determines whether or not communication with the imaging lens is available. In a case where the communication with the imaging lens is not available, the focus adjustment operation detection unit detects whether or not the focus adjustment operation of the imaging lens is performed.

According to the present aspect, the communication availability determination unit that determines whether or not communication with the imaging lens is available is further provided. The focus adjustment operation detection unit detects whether or not the focus adjustment operation of the imaging lens is performed in a case where the communication with the imaging lens is not available. Accordingly, in a case where the communication is not available, whether or not the focus adjustment operation is performed can be automatically detected.

(12) In the imaging device main body according to (10) or (11), the image sensor comprises a phase difference detection pixel on an imaging surface so as to correspond to the divided area, and the phase difference detection unit detects a phase difference for each divided area based on an output of the phase difference detection pixel.

According to the present aspect, the image sensor has the phase difference detection function. Accordingly, the configuration of the imaging device main body can be simplified.

(13) The imaging device main body according to any one of (10) to (12) further comprises a main body side focus adjustment unit that adjusts a focus by moving the image sensor along an optical axis, and a focusing assistance controller that assists focusing by moving the image sensor by controlling driving of the main body side focus adjustment unit based on a detection result of the phase difference detection unit. In a case where the focus adjustment operation of the imaging lens is detected by the focus adjustment operation detection unit, the focusing assistance controller assists the focusing by controlling the driving of the main body side focus adjustment unit.

According to the present aspect, the main body side focus adjustment unit that adjusts the focus by moving the image sensor along the optical axis, and the focusing assistance controller that assists the focusing by controlling the driving of the main body side focus adjustment unit are further provided. In a case where the focus adjustment operation detection unit detects the focus adjustment operation of the imaging lens, the focusing adjustment assist controller assists the focusing by controlling the drive of the main body side focus adjustment unit. Accordingly, the focus adjustment can be appropriately assisted.

(14) An imaging device comprises an imaging lens, an image sensor that images an optical image using the imaging lens, and the focus adjustment operation detection device according to any one of (1) to (9).

According to the present aspect, the imaging device comprising the imaging lens and the image sensor comprises the focus adjustment operation detection device. Accordingly, it is possible to detect whether or not the focus adjustment operation of the imaging lens is performed.

(15) In the imaging device according to (14), the image sensor comprises a phase difference detection pixel on an imaging surface so as to correspond to the divided area, and the phase difference detection unit detects a phase difference for each divided area based on an output of the phase difference detection pixel.

According to the present aspect, the image sensor has the phase difference detection function. Accordingly, the configuration of the imaging device main body can be simplified.

(16) The imaging device according to (14) or (15) further comprises a main body side focus adjustment unit that adjusts a focus by moving the image sensor along an optical axis, and a focusing assistance controller that assists focusing by moving the image sensor by controlling driving of the main body side focus adjustment unit based on a detection result of the phase difference detection unit. In a case where the focus adjustment operation of the imaging lens is detected by the focus adjustment operation detection unit, the focusing assistance controller assists the focusing by controlling the driving of the main body side focus adjustment unit.

According to the present aspect, the main body side focus adjustment unit that adjusts the focus by moving the image sensor along the optical axis, and the focusing assistance controller that assists the focusing by controlling the driving of the main body side focus adjustment unit are further provided. In a case where the focus adjustment operation detection unit detects the focus adjustment operation of the imaging lens, the focusing adjustment assist controller assists the focusing by controlling the drive of the main body side focus adjustment unit. Accordingly, the focus adjustment can be appropriately assisted.

(17) A focus adjustment operation detection method comprises a step of receiving an optical image passed through an imaging lens, and detecting a phase difference of the received optical image for each divided area of a plurality of divided areas, and a step of detecting whether or not a focus adjustment operation of the imaging lens is performed based on an amount of change in the phase difference for each divided area.

According to the present aspect, the amount of change in the phase difference of the optical image passed through the imaging lens is detected for each divided area. Whether or not the focus adjustment operation of the imaging lens is performed is detected based on the amount of change in the phase difference for each detected divided area. Accordingly, whether or not the focus adjustment operation is performed can be accurately detected.

(18) A focus adjustment operation detection program causes a computer to realize a function of receiving an optical image passed through an imaging lens, and detecting a phase difference of the received optical image for each divided area of a plurality of divided areas, and a function of detecting whether or not a focus adjustment operation of the imaging lens is performed based on an amount of change in the phase difference for each divided area.

According to the present aspect, the amount of change in the phase difference of the optical image passed through the imaging lens is detected for each divided area. Whether or not the focus adjustment operation of the imaging lens is performed is detected based on the change in the phase difference for each detected divided area. Accordingly, whether or not the focus adjustment operation is performed can be accurately detected.

According to the present invention, it is possible to accurately detect the focus adjustment operation of the imaging lens.

DESCRIPTION OF THE PREFERRED EMBODIMENTS

Hereinafter, preferred embodiments for carrying out the present invention will be described in detail with reference to the accompanying drawings.

[Digital Camera System]

In the following description, an example in which the present invention is applied to an interchangeable lens type digital camera system will be described.

Figure 1:
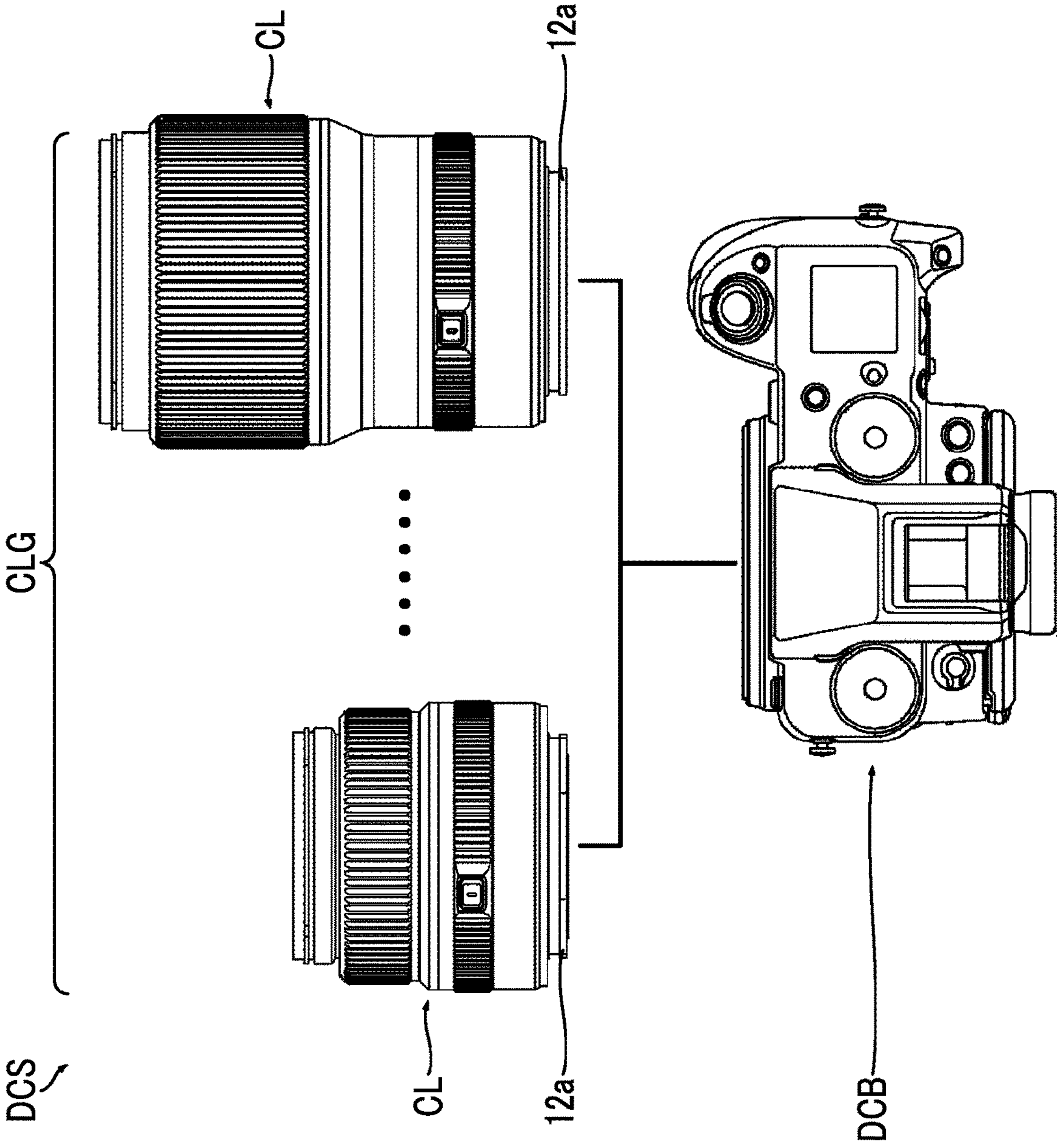
FIG. 1 is a system configuration diagram showing an embodiment of a digital camera system to which the present invention is applied.

FIG. 1 is a system configuration diagram showing an embodiment of the digital camera system to which the present invention is applied.

A digital camera system DCS according to the present embodiment mainly includes a digital camera main body DCB and an interchangeable lens group CLG. The interchangeable lens group CLG is composed of a plurality of interchangeable lenses CL having different specifications. A digital camera DC is constituted by attaching one of the interchangeable lenses CL on the digital camera main body DCB (see FIG. 2). The digital camera is an example of an imaging device. The digital camera main body is an example of an imaging device main body. The interchangeable lens CL is an example of an imaging lens.

[Appearance Configuration of Digital Camera]

Figure 2:
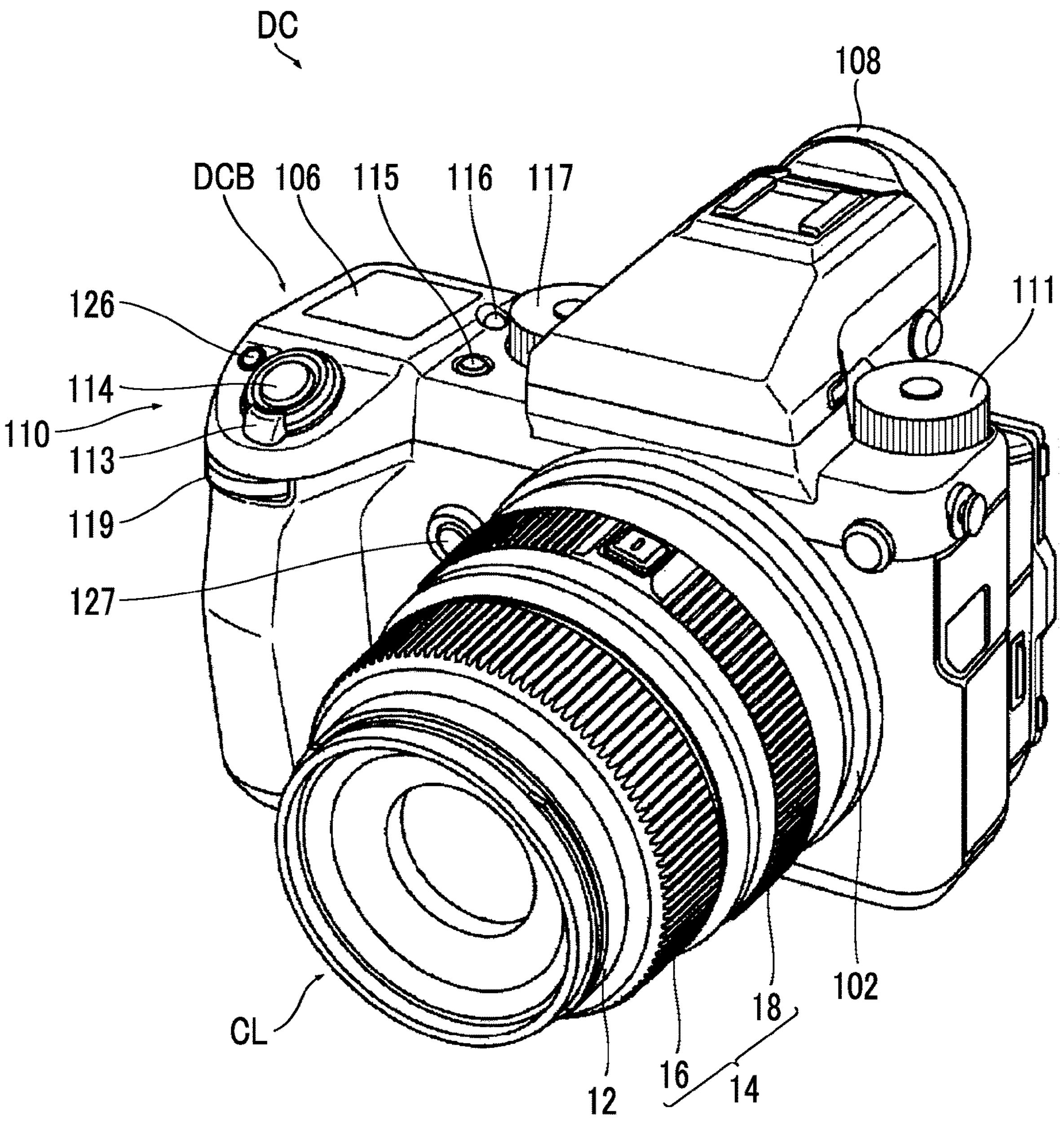
FIG. 2 is a front perspective view showing an external configuration of a digital camera.
Figure 3:
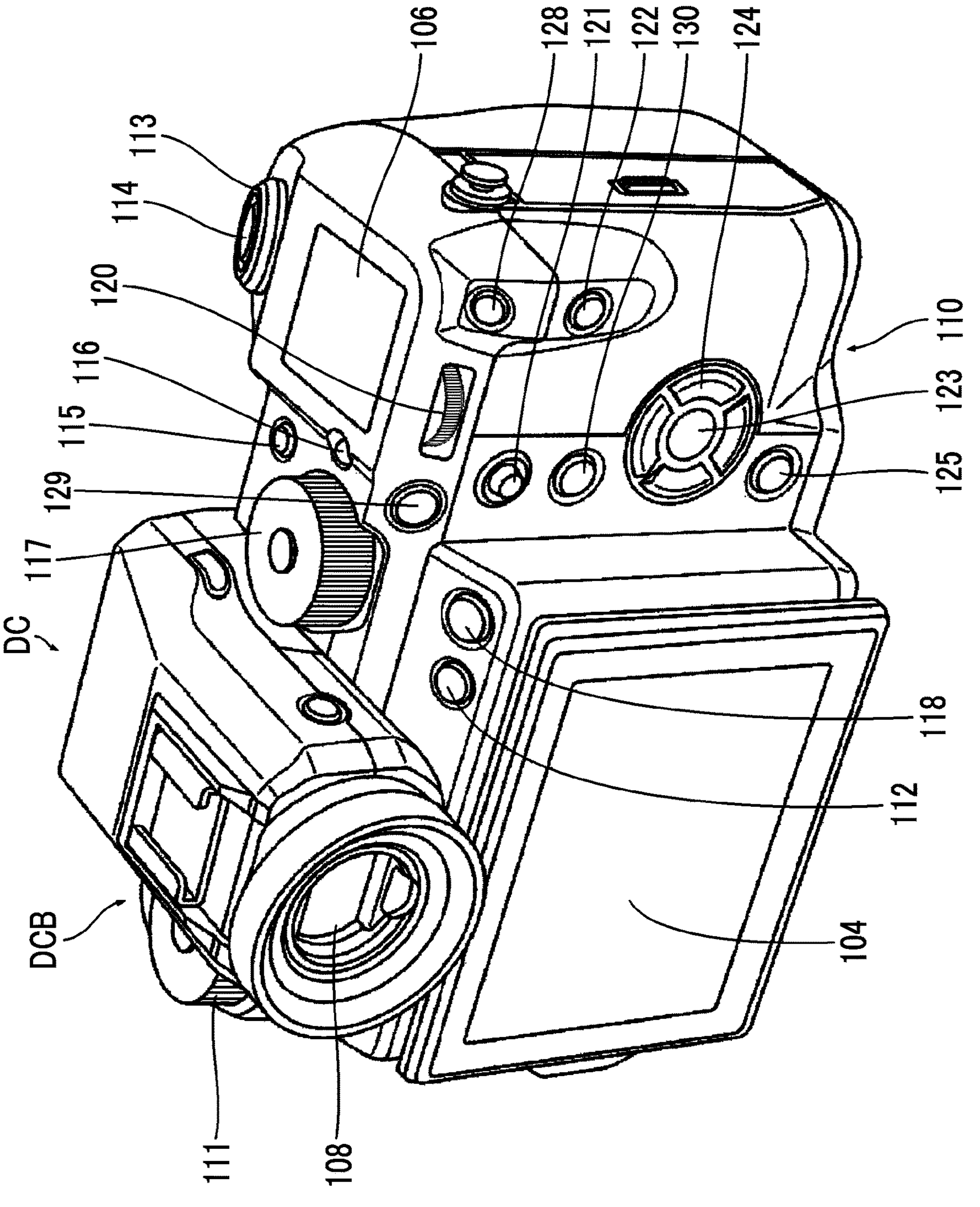
FIG. 3 is a rear perspective view showing the external configuration of the digital camera.
Figure 4:
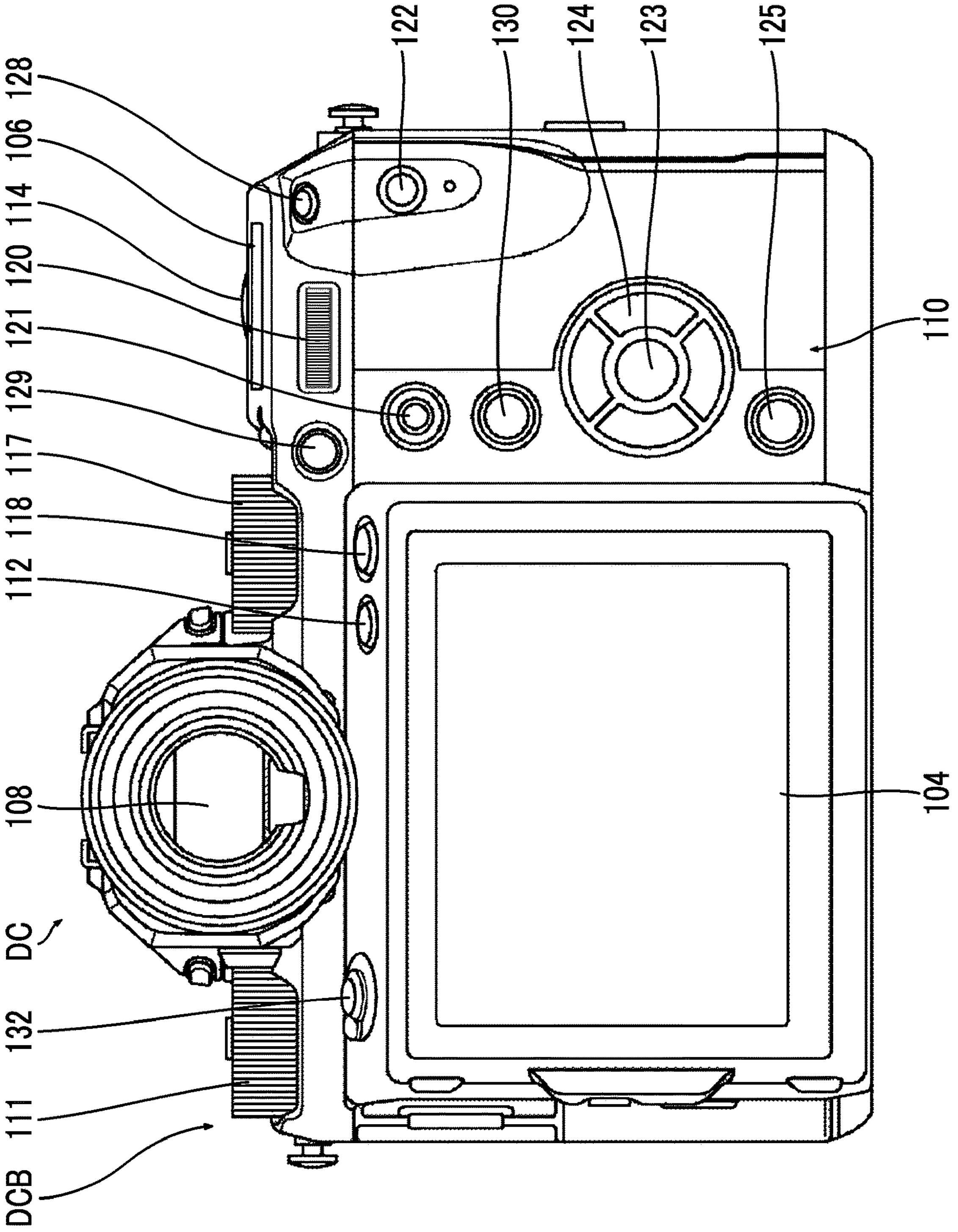
FIG. 4 is a rear view showing the external configuration of the digital camera.

FIGS. 2 to 4 are a front perspective view, a rear perspective view, and a rear view showing an appearance configuration of the digital camera.

As described above, the digital camera DC is constituted by attaching one of the interchangeable lenses CL on the digital camera main body DCB.

<<Appearance Configuration of Digital Camera Main Body>>

As shown in FIGS. 2 to 4, the digital camera main body DCB comprises a main body side mount 102, a main monitor 104, a sub monitor 106, an electronic viewfinder 108, and a camera operation unit 110.

The main body side mount 102 is an attachment unit of the interchangeable lens CL, and is provided on a front surface of the digital camera main body DCB. The interchangeable lens CL is attachable and detachable to and from the main body side mount 102.

The main monitor 104 is provided on a rear surface of the digital camera main body DCB. The main monitor 104 includes a liquid crystal display (LCD). The main monitor 104 is used as a graphical user interface (GUI) in the case of performing various settings, and is also used as a monitor for reproducing captured images. In the case of imaging, a live view is displayed as necessary, and an image captured by an image sensor is displayed in real time.

The sub monitor 106 is provided on an upper surface of the digital camera main body DCB. The sub monitor 106 includes an LCD. The sub monitor 106 displays main imaging information such as shutter speed, an F number, sensitivity, and exposure correction.

The electronic viewfinder (EVF) 108 is provided at an upper portion of the digital camera main body DCB. The live view is displayed on the electronic viewfinder 108, and the image captured by the image sensor in real time is displayed. The electronic viewfinder 108 can be turned on and off as necessary, and can be switched to the display of the main monitor 104.

The camera operation unit 110 comprises, as operation members of the digital camera DC, a sensitivity dial 111, a delete button 112, a power lever 113, a shutter button 114, a drive button 115, a sub monitor illumination button 116, a shutter speed dial 117, a playback button 118, a front command dial 119, a rear command dial 120, a focus lever 121, a quick menu button 122, a menu/OK button 123, a selector button 124, a display/BACK button 125, a first function button 126, a second function button 127, a third function button 128, a fourth function button 129, a fifth function button 130, and a focus mode switching lever 132.

The sensitivity dial 111 is a dial for setting sensitivity. The delete button 112 is a button for deleting the captured image. In a case where the button is pushed during the reproduction of the image, the image being reproduced is deleted. The power lever 113 is a lever that turns on and off the power of the digital camera DC. The shutter button 114 is a button for instructing recording of an image. The shutter button 114 is a two-stroke button capable of being pushed halfway and fully. In a case where the shutter button 114 is pushed halfway, an S1ON signal is output, and in a case where the shutter button is pushed fully, an S2ON signal is output. In a case where a still image is captured, imaging preparation is performed by pushing the shutter button 114 halfway, and image recording is performed by fully pushing the shutter button. In a case where a motion picture is captured, imaging is started by fully pushing the shutter button 114 for the first time, and imaging is ended by fully pushing the shutter button 114 for the second time. The drive button 115 is a button for calling a selection screen of a drive mode. In a case where the drive button 115 is pushed, the selection screen of the drive mode is displayed on the main monitor 104. The drive mode is selected on the selection screen of the drive mode, and single frame imaging, continuous imaging, bracket imaging, multiple exposures, and motion picture image imaging are selected. The sub monitor illumination button 116 is a button for turning on and off the illumination of the sub monitor 106. The shutter speed dial 117 is a dial for setting the shutter speed. The playback button 118 is a button for instructing switching to the playback mode. In a case where the digital camera DC is activated in an imaging mode and the playback button 118 is pushed, the digital camera is switched to the playback mode. In a case where the shutter button 114 is pushed in the playback mode, the mode is switched to the imaging mode. Functions corresponding to states of the digital camera DC are assigned to the front command dial 119 and the rear command dial 120. The focus lever 121 is a lever that selects an auto focus (AF) area. The quick menu button 122 is a button for calling a quick menu. In a case where the quick menu button 122 is pushed, the quick menu is displayed on the main monitor 104. In the quick menu, items registered by a user among items capable of being set in the digital camera DC are displayed. The menu/OK button 123 is a button for calling a menu screen. In a case where the menu/OK button 123 is pushed, the menu screen is displayed on the main monitor 104. The menu/OK button 123 also functions as a button for confirming a selected item. The selector button 124 is a so-called cross button, and is a button capable of instructing in four directions. In a case where various settings are performed, the selector button 124 is used to select an item. The display/BACK button 125 is a button for switching between display contents of the main monitor 104. The display/BACK button 125 also functions as a button for canceling the selected item, that is, a button for returning to the previous state. Functions selected by the user from among functions prepared in advance are assigned to the first function button 126, the second function button 127, the third function button 128, the fourth function button 129, and the fifth function button 130. For example, a function of turning on and off an assistance function of focusing is assigned. The focus mode switching lever 132 is a lever that switches a focus mode. The focus mode switching lever 132 of the digital camera DC switches the focus mode between an auto focus (AF) mode (AF mode) and a manual focus (MF) mode (MF mode).

<<Appearance Configuration of Interchangeable Lens>>

Each interchangeable lens CL comprises a lens side mount 12*a* at a base end portion of a lens barrel 12 (see FIG. 1). Each interchangeable lens CL is attachable to and detachable from the digital camera main body DCB via the lens side mount 12*a*.

Each interchangeable lens CL has at least a focus adjustment function and a light amount adjustment function, and is configured to perform focus adjustment and light amount adjustment.

A lens operation unit 14 for manually operating the interchangeable lens CL is provided in each interchangeable lens CL. In FIG. 2, an example in which the interchangeable lens comprises a focus ring 16 and a stop ring 18 is illustrated as the lens operation unit 14.

The focus ring 16 is an operation member for focus adjustment, and is provided to be rotatable around the lens barrel 12. In a case where the focus ring 16 is rotated, a focus adjustment mechanism is operated according to this operation. That is, the focus lens group moves back and forth along an optical axis according to this operation, and the focus is adjusted.

The stop ring 18 is an operation member for stop adjustment, and is provided to be rotatable around the lens barrel 12. F numbers capable of being set on an outer periphery of the stop ring 18 are printed at regular intervals (not shown). The switching of the F number is performed by rotating the stop ring 18 and adjusting the F number desired to be set at a position of an index (not shown) provided on the lens barrel 12.

[Internal Configuration of Digital Camera]

<<Internal Configuration of Interchangeable Lens>>

The interchangeable lens CL is roughly classified into an interchangeable lens CL that can communicate with the attached digital camera main body DCB and an interchangeable lens CL that cannot communicate therewith. There is an interchangeable lens CL attached to the digital camera main body DCB via a so-called mount adapter. Due to the mount adapter, it is possible to attach interchangeable lenses having different mount standards to the camera main body. Thus, the mount adapter comprises a mount corresponding to the mount on the interchangeable lens side and a mount corresponding to the mount on the digital camera main body side.

<Internal Configuration of Interchangeable Lens that can Communicate with Digital Camera Main Body>

Figure 5:
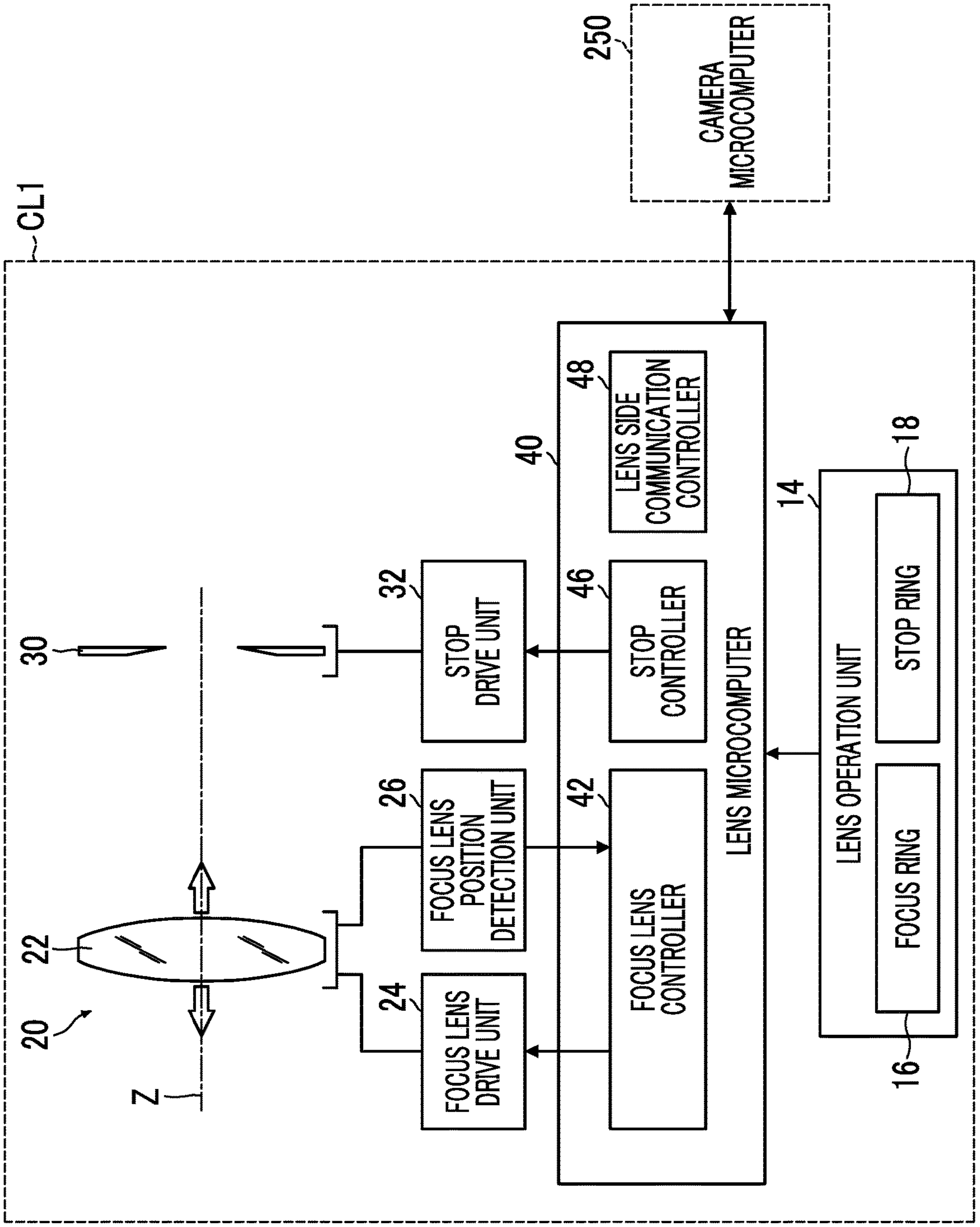
FIG. 5 is a block diagram showing an example of an internal configuration of an interchangeable lens that can communicate with a digital camera main body.

FIG. 5 is a block diagram showing an example of an internal configuration of the interchangeable lens that can communicate with the digital camera main body.

An interchangeable lens CL1 shown in this diagram is a single focus lens having a so-called auto focus function, and comprises a lens side focus adjustment mechanism 20 that performs focus adjustment, a stop 30 that performs light amount adjustment, a lens operation unit 14, and a lens microcomputer 40.

[Lens Side Focus Adjustment Mechanism]

The lens side focus adjustment mechanism 20 of the interchangeable lens CL1 adjusts the focus by moving the focus lens group 22 back and forth along an optical axis Z. The focus lens group 22 is composed of a part or all of lens groups composing the interchangeable lens CL1.

In the interchangeable lens CL1 according to the present example, the focus lens group 22 is driven by a focus lens drive unit 24, and moves along the optical axis Z. The focus lens drive unit 24 comprises an actuator that drives the focus lens group 22, and a drive circuit thereof. The actuator is constituted by, for example, a linear motor.

A position of the focus lens group 22 is detected by a focus lens position detection unit 26. The focus lens position detection unit 26 includes, for example, a photo interrupter and a magneto resistive (MR) sensor. The photo interrupter detects that the focus lens group 22 is located at an origin position. The MR sensor detects the amount of movement of the focus lens group 22. The MR sensor can detect the position of the focus lens group 22 relative to the origin position by detecting that the focus lens group 22 is located at the origin position by the photo interrupter and detecting the amount of movement of the focus lens group 22 from the origin position by the MR sensor.

[Stop]

The stop 30 is, for example, an iris stop. The stop 30 is driven by a stop drive unit 32, and an opening diameter (F number) changes. The stop drive unit 32 comprises an actuator and a drive circuit thereof.

[Lens Operation Unit]

The lens operation unit 14 outputs a signal corresponding to an operation of each operation member provided in the lens barrel 12 to the lens microcomputer 40. For example, a signal corresponding to the operation direction, the operation amount, and the operation speed of the focus ring 16 is output to the lens microcomputer 40. A signal corresponding to the setting of the stop ring 18 is output to the lens microcomputer 40.

[Lens Microcomputer]

The lens microcomputer 40 is a microcomputer comprising a central processing unit (CPU), a read only memory (ROM), a random access memory (RAM), and functions as a controller of the interchangeable lens CL1 by executing a predetermined program. The lens microcomputer 40 according to the present example functions as a focus lens controller 42, a stop controller 46, and a lens side communication controller 48 as shown in FIG. 5.

The focus lens controller 42 controls the movement of the focus lens group 22 by controlling the driving of the focus lens drive unit 24 based on an operation of the focus ring 16 or a command from the digital camera main body DCB. In a case where the focus mode of the camera is set to manual focus, the focus lens controller 42 controls the movement of the focus lens group 22 based on the operation of the focus ring 16. Specifically, the focus lens group 22 is moved in a direction corresponding to the operation of the focus ring 16, a speed corresponding to the operation, and the amount of movement corresponding to the operation. In a case where the focus mode of the camera is set to auto focus, the focus lens controller 42 moves the focus lens group 22 based on a command from the digital camera main body DCB. At this time, the focus lens controller 42 moves the focus lens group 22 at a prescribed speed.

The stop controller 46 controls the stop 30 by controlling the stop drive unit 32 based on an operation of the stop ring 18 or the command from the digital camera main body DCB. In a case where an exposure control mode of the camera is stop priority or manual, the stop controller 46 controls the stop drive unit 32 according to the setting of an operation ring, and sets the stop 30 to the set F number. In a case where the exposure control mode of the camera is shutter speed priority or auto, the stop controller 46 controls the stop drive unit 32 according to the command from the digital camera main body, and sets the stop to the instructed F number.

The lens side communication controller 48 controls communication with the digital camera main body DCB. In a case where the digital camera main body DCB has a communication function of a standard corresponding to a communication standard of the interchangeable lens CL1 and the interchangeable lens CL1 is attached to the digital camera main body DCB, the interchangeable lens and the digital camera main body are connected to communicate with each other. The communication is performed via contact points provided on the mounts thereof.

In a case where the focus is manually adjusted, positional information of the focus lens group 22 is transmitted to the digital camera main body DCB via the lens side communication controller 48. Accordingly, whether or not a focus adjustment operation is performed and the position of the focus lens group 22 can be recognized on the digital camera main body side.

In a case where the F number is switched, information on the newly set F number is transmitted to the digital camera main body DCB via the lens side communication controller 48. Accordingly, a setting situation of the F number can be recognized on the digital camera main body side.

<Internal Configuration of Interchangeable Lens that Cannot Communicate with Digital Camera Main Body>

Figure 6:
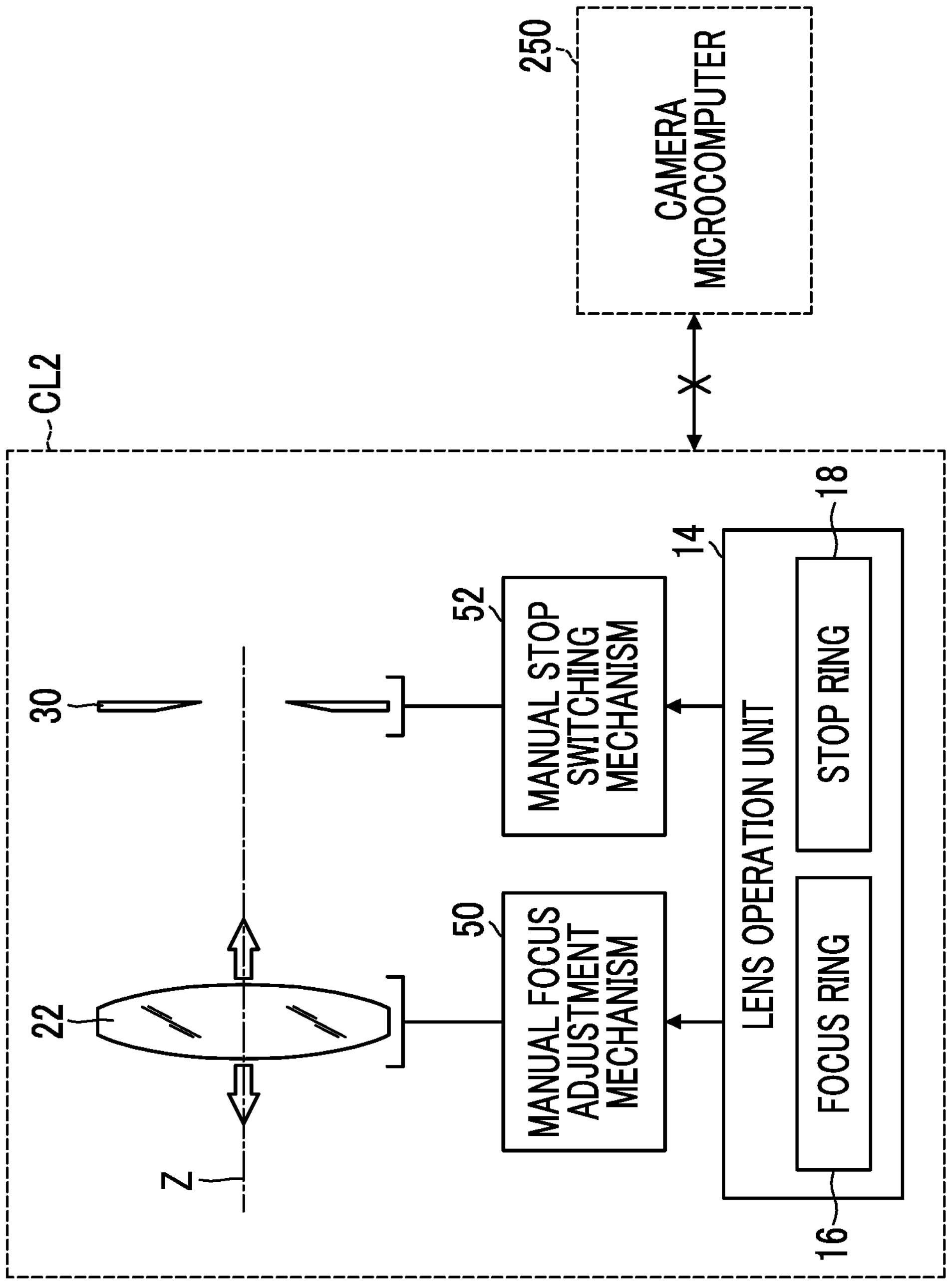
FIG. 6 is a block diagram showing an example of an internal configuration of an interchangeable lens having no communication function.

FIG. 6 is a block diagram showing an example of an internal configuration of the interchangeable lens having no communication function.

An interchangeable lens CL2 shown in this diagram is a single focus lens having a focus adjustment function and a light amount adjustment function, and all lens operations are manually performed.

The interchangeable lens CL2 according to the present example comprises a manual focus adjustment mechanism 50 that manually adjusts the focus and a manual stop switching mechanism 52 that manually switches the F number.

The manual focus adjustment mechanism 50 mechanically moves the focus lens group 22 back and forth along the optical axis Z according to the operation of the focus ring 16. For example, the focus lens group 22 is mechanically moved back and forth along the optical axis Z by using a helicoid or a cam mechanism.

The manual stop switching mechanism 52 mechanically switches the amount of opening of the stop 30 according to the operation of the stop ring 18. For example, the amount of opening of the stop 30 is mechanically switched by using a cam mechanism.

<<Internal Configuration of Digital Camera Main Body>>

Figure 7:
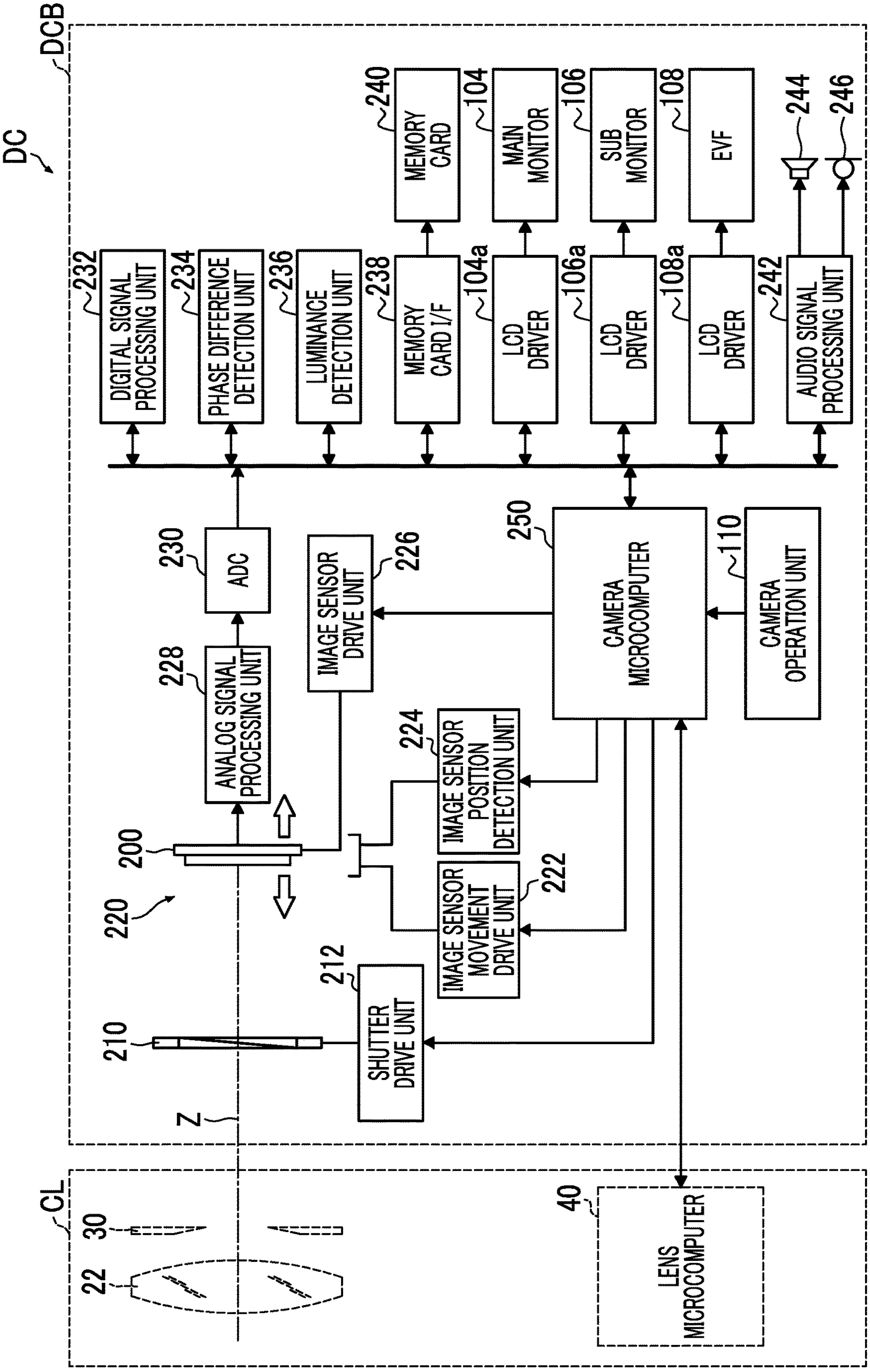
FIG. 7 is a block diagram showing an example of an internal configuration of the digital camera main body.

FIG. 7 is a block diagram showing an internal configuration of the digital camera main body.

As shown in this diagram, the digital camera main body DCB comprises an image sensor 200, a mechanical shutter 210, a shutter drive unit 212, a main body side focus adjustment unit 220, an image sensor drive unit 226, an analog signal processing unit 228, an analog-to-digital converter (ADC) 230, a digital signal processing unit 232, a phase difference detection unit 234, a luminance detection unit 236, a memory card interface 238, a memory card 240, an audio signal processing unit 242, a speaker 244, a microphone 246, the main monitor 104, the sub monitor 106, the electronic viewfinder (EVF) 108, the camera operation unit 110, and a camera microcomputer 250.

<Image Sensor>

The image sensor 200 receives an optical image of the subject passed through the interchangeable lens CL, and images the optical image of the subject. The image sensor 200 includes a solid-state imaging element such as a charged coupled device (CCD) or a complementary metal oxide semiconductor (CMOS). In the digital camera DC according to the present embodiment, the image sensor 200 having a phase difference detection function is used. That is, the image sensor 200 having a function of receiving the optical image passed through the interchangeable lens CL and detecting the phase difference of the received optical image is used.

Figure 8:
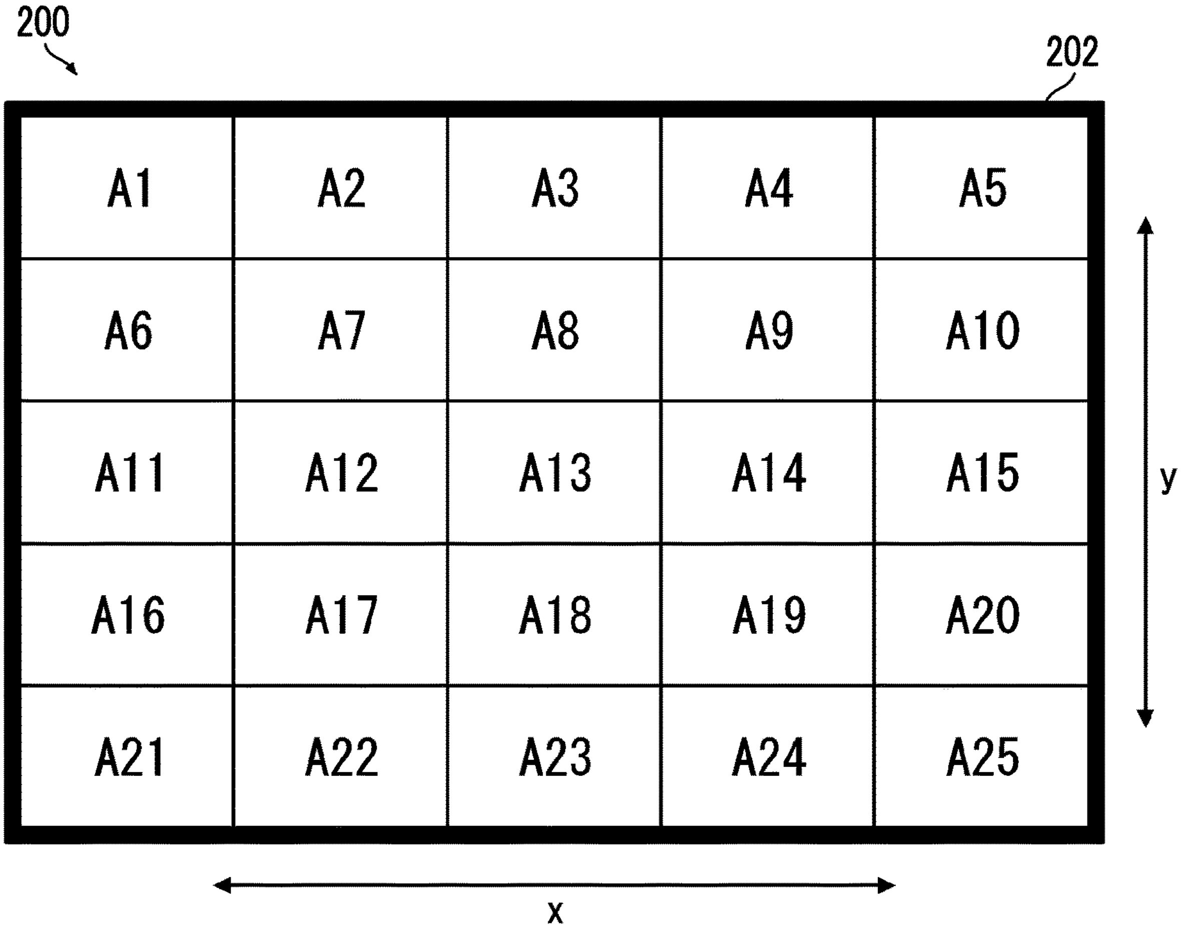
FIG. 8 is a diagram showing a schematic configuration of an image sensor.

FIG. 8 is a diagram showing a schematic configuration of the image sensor.

The image sensor 200 has an imaging surface 202 having a predetermined aspect ratio. The imaging surface 202 is an area that receives the optical image of the subject passed through the interchangeable lens CL and images the optical image of the subject.

The imaging surface 202 is divided into a plurality of areas. In the present embodiment, as shown in FIG. 8, the imaging surface 202 is divided into five equal areas in a vertical direction (y direction) and a horizontal direction (x direction). In this case, the imaging surface 202 is divided into 25 areas. Each of the divided areas A1 to A25 is called a divided area. In the divided areas A1 to A25, the phase differences are individually detected. Each of the divided areas A1 to A25 individually constitutes an AF area.

Figure 9:
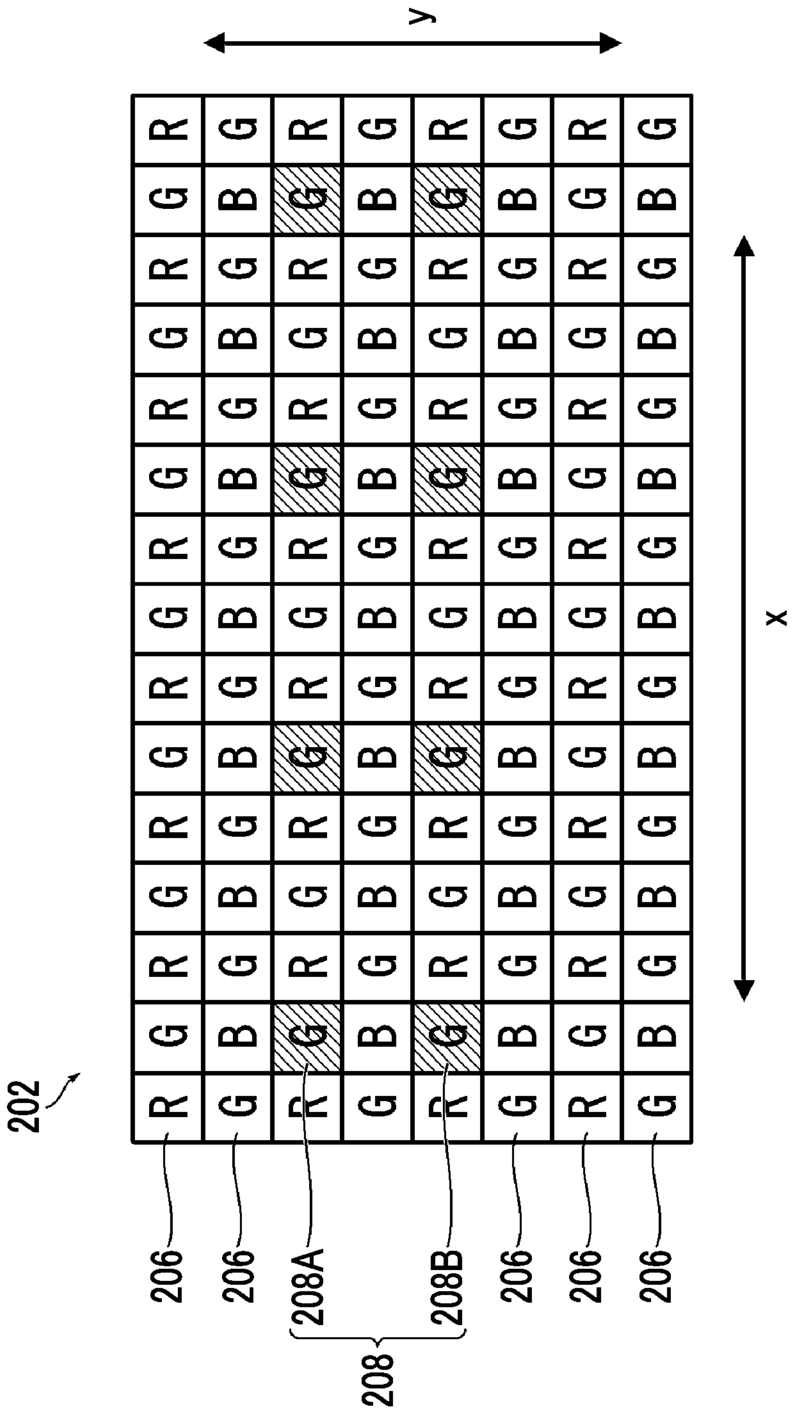
FIG. 9 is an enlarged view of a part of an imaging surface.

FIG. 9 is an enlarged view of a part of the imaging surface.

A plurality of pixels is two-dimensionally arranged in the vertical direction (y direction) and the horizontal direction (x direction) on the imaging surface 202. Each pixel comprises a photoelectric conversion unit and outputs a signal corresponding to the amount of received light. Each pixel has a color filter of any color of red (R), green (G), and blue (B). The color filters are assigned to the pixels in a predetermined arrangement. FIG. 9 shows an example of a Bayer array. In this diagram, a letter R is given to a pixel (R pixel) having the color filter of R, a letter G is given to a pixel (G pixel) having the color filter of G, and a letter B is given to a pixel (B pixel) having the color filter of B.

In addition to normal pixels 206, phase difference detection pixels 208 are arranged in each divided area. The normal pixel 206 is a normal imaging pixel. The phase difference detection pixel 208 is a pixel that detects a phase difference. The pixels other than the phase difference detection pixels are the normal pixels.

The phase difference detection pixels 208 form a pair, and are arranged close to each other. One of the pair is a first phase difference detection pixel 208A, and the other is a second phase difference detection pixel 208B. In the example shown in FIG. 9, the first phase difference detection pixels 208A are arranged at regular intervals in one of two rows of the same array adjacent to each other, and the second phase difference detection pixels 208B are arranged at regular intervals on the other row. In particular, an example in which specific G pixels in a specific row in which the R pixels and the G pixels are arranged are used as the phase difference detection pixels is shown. As stated above, the phase difference detection pixels 208 are arranged in each divided area according to a predetermined rule.

Figure 10:
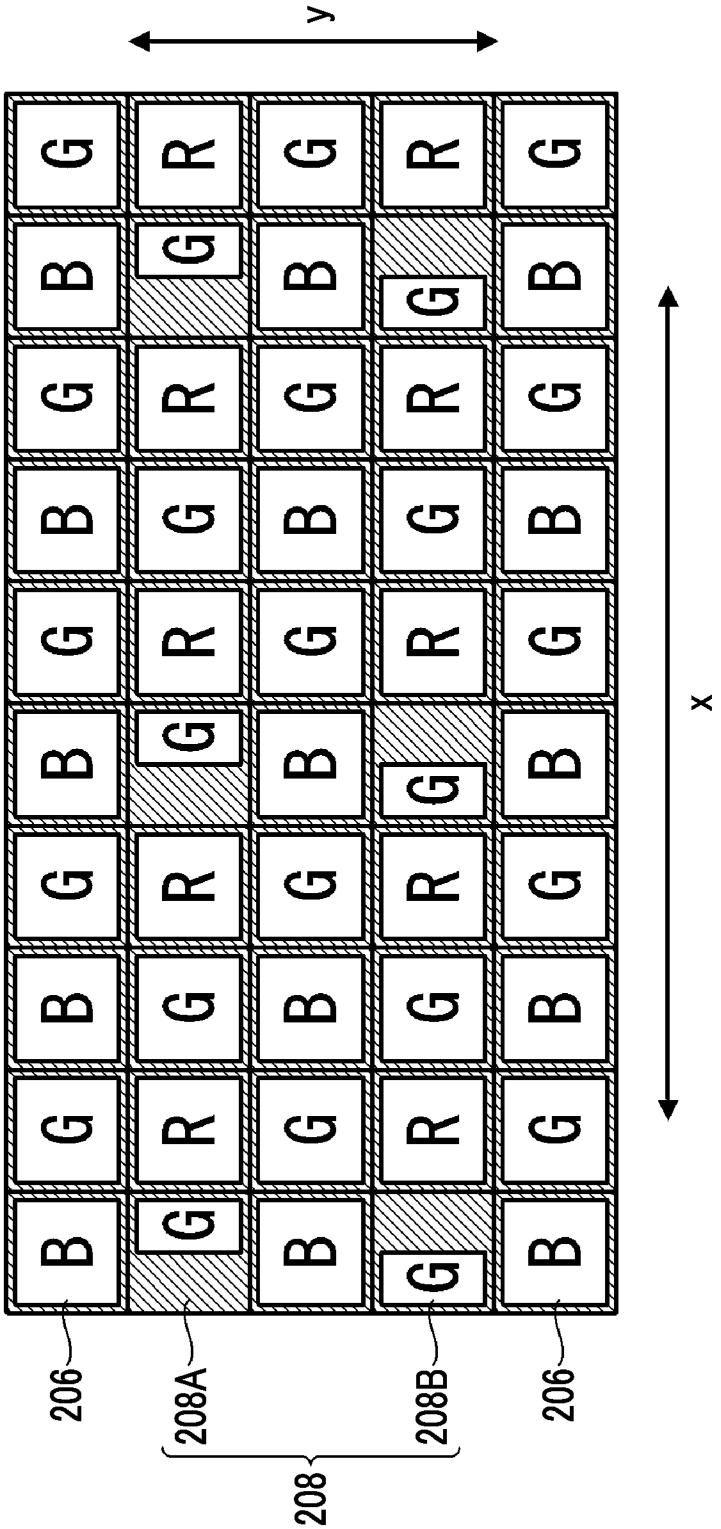
FIG. 10 is a diagram showing a schematic configuration of each pixel.

FIG. 10 is a diagram showing a schematic configuration of each pixel.

Each pixel has a light shielding film comprising a predetermined opening portion. In FIG. 10, the light shielding film is represented by a diagonal line, and the opening portion of the light shielding film is represented in white.

The normal pixel 206 has a light shielding film of which an opening portion coincides with a center of the photoelectric conversion unit. The normal pixel 206 receives light rays passed through almost the entire pupil area of the interchangeable lens CL.

The first phase difference detection pixel 208A has a light shielding film of which an opening portion is eccentric to a right side with respect to the center of the photoelectric conversion unit. As a result, the first phase difference detection pixel 208A receives one of a pair of light rays passed through different portions of the pupil area of the interchangeable lens CL.

The second phase difference detection pixel 208B has a light shielding film of which an opening portion is eccentric to a left side with respect to the center of the photoelectric conversion unit. As a result, the second phase difference detection pixel 208B receives the other of the pair of light rays passed through the different portions of the pupil area of the interchangeable lens CL.

With the aforementioned configuration, it is possible to individually detect the phase difference in each of the divided areas A1 to A25 by acquiring signals of the first phase difference detection pixel 208A and the second phase difference detection pixel 208B and comparing these pixels.

That is, the phase difference of the optical image passed through the interchangeable lens CL can be detected for each divided area.

<Mechanical Shutter and Shutter Drive Unit>

The mechanical shutter 210 is a focal plane shutter. The mechanical shutter 210 opens and closes the imaging surface of the image sensor 200. The mechanical shutter 210 is opened and closed by being driven by the shutter drive unit 212.

<Main Body Side Focus Adjustment Unit>

The main body side focus adjustment unit 220 adjusts the focus by moving the image sensor 200 back and forth along the optical axis Z. The main body side focus adjustment unit 220 comprises an image sensor movement drive unit 222 that moves the image sensor 200 along the optical axis Z, and an image sensor position detection unit 224 that detects a position of the image sensor 200.

The image sensor movement drive unit 222 comprises, for example, an actuator such as a piezo actuator, and a drive circuit thereof. The image sensor 200 moves within a movable range with a reference position as a reference. The reference position is set at a center of the movable range, and is set at a position of a flange back. In general, the interchangeable lens CL is optically designed by using the flange back position as a reference. Therefore, the optical performance of the interchangeable lens CL can be maximized by positioning the image sensor 200 at the reference position.

The image sensor position detection unit 224 detects the position of the image sensor 200 relative to the reference position. The image sensor position detection unit 224 includes, for example, a displacement sensor such as an eddy current sensor.

<Image Sensor Drive Unit>

The image sensor drive unit 226 drives the image sensor 200 under the control of the camera microcomputer 250. The image sensor 200 is driven by the image sensor drive unit 226 to image an image.

<Analog Signal Processing Unit>

The analog signal processing unit 228 acquires an analog image signal for each pixel output from the image sensor 200, and performs predetermined signal processing (for example, sampling two correlation pile and amplification processing).

<ADC>

The ADC 230 converts the analog image signals output from the analog signal processing unit 228 into digital image signals, and outputs the digital image signals.

<Digital Signal Processing Unit>

The digital signal processing unit 232 acquires the digital image signals, and generates image data by performing predetermined signal processing (for example, gradation transformation processing, white balance correction processing, gamma-correction processing, demosaicing processing, and YC conversion processing).

<Phase Difference Detection Unit>

The phase difference detection unit 234 individually detects the phase difference for each of the divided areas A1 to A25. The phase difference detection unit 234 acquires the signals of the first phase difference detection pixels 208A and the second phase difference detection pixels 208B from each of the divided area A1 to A25, and individually calculates the phase difference for each of the divided areas A1 to A25 by performing predetermined correlation calculation processing on the acquired signals.

<Luminance Detection Unit>

The luminance detection unit 236 individually detects the luminance of each of the divided areas A1 to A25. The luminance detection unit 236 individually detects the luminance of each of the divided areas A1 to A25 based on the output from the normal pixel of each of the divided areas A1 to A25.

<Memory Card Interface and Memory Card>

The memory card interface 238 reads and writes data from and to the memory card 240 attached to a card slot under the control of the camera microcomputer 250.

<Audio Signal Processing Unit, Speaker, and Microphone>

The audio signal processing unit 242 processes an audio signal output from the speaker 244. The audio signal processing unit 242 also processes an audio signal input from the microphone 246.

<Main Monitor>

The main monitor 104 includes an LCD. The display on the main monitor 104 is controlled by the camera microcomputer 250. The camera microcomputer 250 controls the display on the main monitor 104 via an LCD driver 104*a*.

<Sub Monitor>

The sub monitor 106 includes an LCD. The display on the sub monitor 106 is controlled by the camera microcomputer 250. The camera microcomputer 250 controls the display on the sub monitor 106 via an LCD driver 106*a*.

<Electronic Viewfinder>

The display unit of the electronic viewfinder (EVF) 108 is an LCD. The display on the electronic viewfinder 108 is controlled by the camera microcomputer 250. The camera microcomputer 250 controls the display on the electronic viewfinder 108 via an LCD driver 108*a*.

<Camera Operation Unit>

The camera operation unit 110 outputs a signal corresponding to the operation of each operation member to the camera microcomputer 250.

<Camera Microcomputer>

The camera microcomputer 250 is a microcomputer comprising a CPU, a ROM, and a RAM, and functions as a controller that performs various controls of the camera by executing a predetermined program (for example, a focus adjustment operation detection program or a focusing assistance program).

Figure 11:
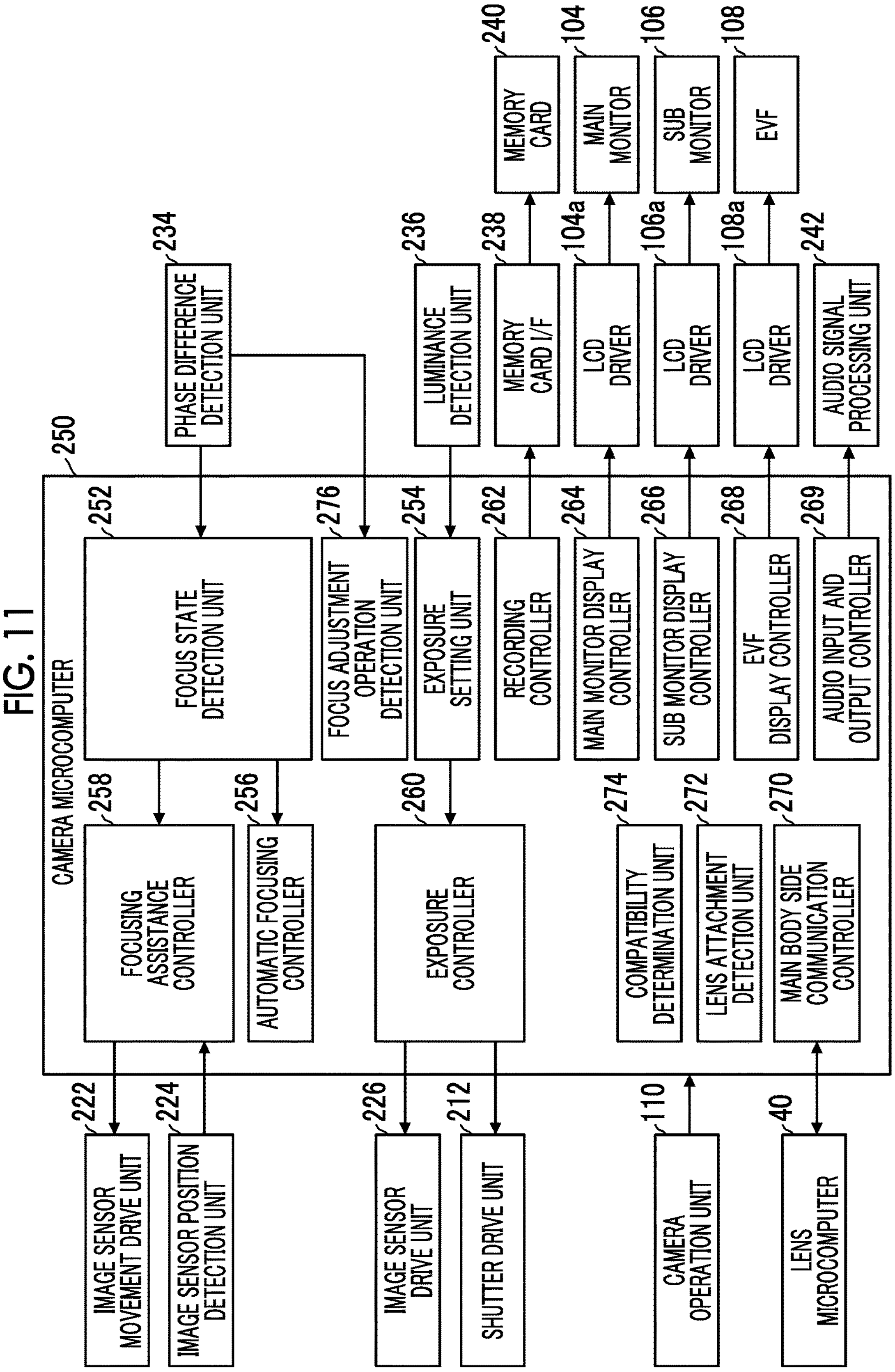
FIG. 11 is a block diagram of main functions realized by a camera microcomputer.

FIG. 11 is a block diagram of main functions realized by the camera microcomputer.

The camera microcomputer 250 functions as a focus state detection unit 252, an exposure setting unit 254, an automatic focusing controller 256, a focusing assistance controller 258, an exposure controller 260, a recording controller 262, a main monitor display controller 264, a sub monitor display controller 266, an EVF display controller 268, an audio input and output controller 269, a main body side communication controller 270, a lens attachment detection unit 272, a communication availability determination unit 274, and a focus adjustment operation detection unit 276 by executing a predetermined control program.

[Focus State Detection Unit]

The focus state detection unit 252 detects a focus state of the designated AF area. The focus state detection unit 252 detects a direction and amount of defocus as the focus state. The focus state detection unit 252 calculates the direction and amount of defocus based on information on the phase difference information calculated by the phase difference detection unit 234.

[Exposure Setting Unit]

The exposure setting unit 254 sets the exposure (F number and shutter speed). The exposure setting unit 254 calculates an EV value (EV: Exposure Value) based on the output of the luminance detection unit 236, and decides the exposure based on the obtained EV value.

[Automatic Focusing Controller]

In a case where the focus mode of the camera is set to auto focus, the automatic focusing controller 256 controls the driving of the focus lens group 22 such that the main subject is automatically focused. The automatic focusing controller 256 focuses on the main subject by controlling the driving of the focus lens group 22 based on the detection result of the focus state detection unit 252. The automatic focusing controller 256 outputs a drive command of the focus lens group 22 to the lens microcomputer 40, and controls the driving of the focus lens group 22.

The automatic focusing can be performed only in a case where the interchangeable lens can be controlled on the digital camera main body side. In a case where the interchangeable lens CL cannot communicate with the digital camera main body DCB or the drive unit of the focus lens group 22 is not provided, the interchangeable lens cannot use an automatic focusing function.

[Focusing Assistance Controller]

In a case where the focus mode of the camera is set to manual focus and the focusing assistance function is turned on, the focusing assistance controller 258 assists the focusing by controlling the main body side focus adjustment unit 220 based on the detection result of the focus state detection unit 252. That is, the in-focus state is automatically achieved by moving the image sensor 200.

The assistance function operates is a case where the defocus amount for the main subject is equal to or less than a prescribed amount. In a case where the defocus amount for the main subject is equal to or less than the prescribed amount, the movement of the image sensor 200 is controlled based on the detection result of the focus state detection unit 252, and the focusing is assisted. Accordingly, the assistance is performed in the form of final fine adjustment.

[Exposure Controller]

The exposure controller 260 controls an exposure according to the exposure set by the exposure setting unit 254. That is, the driving of the stop 30 is controlled such that the F number reaches the set value, and the driving of the mechanical shutter 210 and the image sensor 200 is controlled such that the exposure is performed at the set shutter speed (exposure time). A drive command is output to the lens microcomputer 40, and the stop 30 is set to the set F number.

The stop 30 can be controlled only in a case where the interchangeable lens CL can communicate with the digital camera main body DCB. In a case where the interchangeable lens CL cannot communicate with the digital camera main body DCB, the F number set on the lens side is manually input to the digital camera main body DCB.

[Recording Controller]

The recording controller 262 controls recording of image data obtained by imaging. The recording controller 262 generates an image file in a predetermined format from the image data obtained by imaging, and records the image file in the memory card 240.

[Main Monitor Display Controller]

The main monitor display controller 264 controls the display on the main monitor 104. For example, an image captured by the image sensor 200 is displayed on the main monitor 104 in real time according to a live view display instruction. The menu screen is displayed on the main monitor 104 according to a display instruction of the menu screen.

[Sub Monitor Display Controller]

The sub monitor display controller 266 controls the display on the sub monitor 106. The sub monitor display controller 266 acquires information to be displayed on the sub monitor 106, and displays the acquired information on the sub monitor 106 in a predetermined format.

[EVF Display Controller]

The EVF display controller 268 controls the display of the electronic viewfinder (EVF) 108. In a case where the use of the EVF 108 is selected, the EVF display controller 268 displays the image captured by the image sensor 200 on the electronic viewfinder (EVF) 108 in real time.

[Audio Input and Output Controller]

The audio input and output controller 269 controls an output of audio from the speaker 244 via the audio signal processing unit 242. The audio input and output controller 269 also controls an input of audio from the microphone 246 via the audio signal processing unit 242.

[Main Body Side Communication Controller]

The main body side communication controller 270 controls communication with the interchangeable lens CL. In a case where the interchangeable lens CL has a communication function of a standard corresponding to a communication standard of the digital camera main body DCB and the interchangeable lens CL is attached to the digital camera main body DCB, the interchangeable lens and the digital camera main body are connected to communicate with each other. The communication is performed via contact points provided on the mounts thereof.

[Lens Attachment Detection Unit]

The lens attachment detection unit 272 detects attachment of the interchangeable lens CL. The detection is performed, for example, by detecting energization to a detection contact point provided on the main body side mount 102.

[Communication Availability Determination Unit]

The communication availability determination unit 274 determines availability of communication with the interchangeable lens CL attached to the digital camera main body DCB. The communication availability determination unit 274 determines the availability of the communication with the interchangeable lens CL based on a connection state of the communication with the interchangeable lens CL. That is, it is determined that the communication is available in a case where the communication connection is established with the interchangeable lens CL.

In a case where the digital camera main body DCB is powered on, the main body side communication controller 270 performs processing for establishing the communication connection with the interchangeable lens CL. Similarly, in a case where the interchangeable lens CL is exchanged, the processing for establishing the communication connection with the interchangeable lens CL is performed. In a case where the interchangeable lens CL has a communication function of a standard corresponding to a communication standard of the digital camera main body DCB, the interchangeable lens and the digital camera main body are connected to communicate with each other.

[Focus Adjustment Operation Detection Unit]

The focus adjustment operation detection unit 276 detects whether or not the focus adjustment operation of the interchangeable lens CL is performed based on the amount of change in the phase difference for each of the divided areas A1 to A25 detected by the phase difference detection unit 234. The focus adjustment operation detection unit 276 is an example of a focus adjustment operation detection device. The camera microcomputer 250 executes the focus adjustment operation detection program, and thus, a function of the focus adjustment operation detection unit 276 is realized by the camera microcomputer 250.

In a case where the focus adjustment operation is performed on the interchangeable lens CL, the phase differences of the areas captured by the image sensor 200 via the interchangeable lens CL change as a whole. Thus, it is possible to determine whether or not the focus adjustment operation is performed on the interchangeable lens CL by determining whether or not the phase difference of the areas captured by the image sensor 200 via the interchangeable lens CL change as a whole. The focus adjustment operation detection unit 276 determines whether or not the focus adjustment operation is performed on the interchangeable lens CL by determining whether or not the phase differences of the areas captured by the image sensor 200 via the interchangeable lens CL change as a whole. Hereinafter, detection processing (focus adjustment operation detection method) of the focus adjustment operation detection unit 276 will be described in detail.

(1) Concept of Detection

First, the concept of detection of the focus adjustment operation using a change in the phase difference will be described.

(i) Case Where Subject is Stationary

Figure 12:
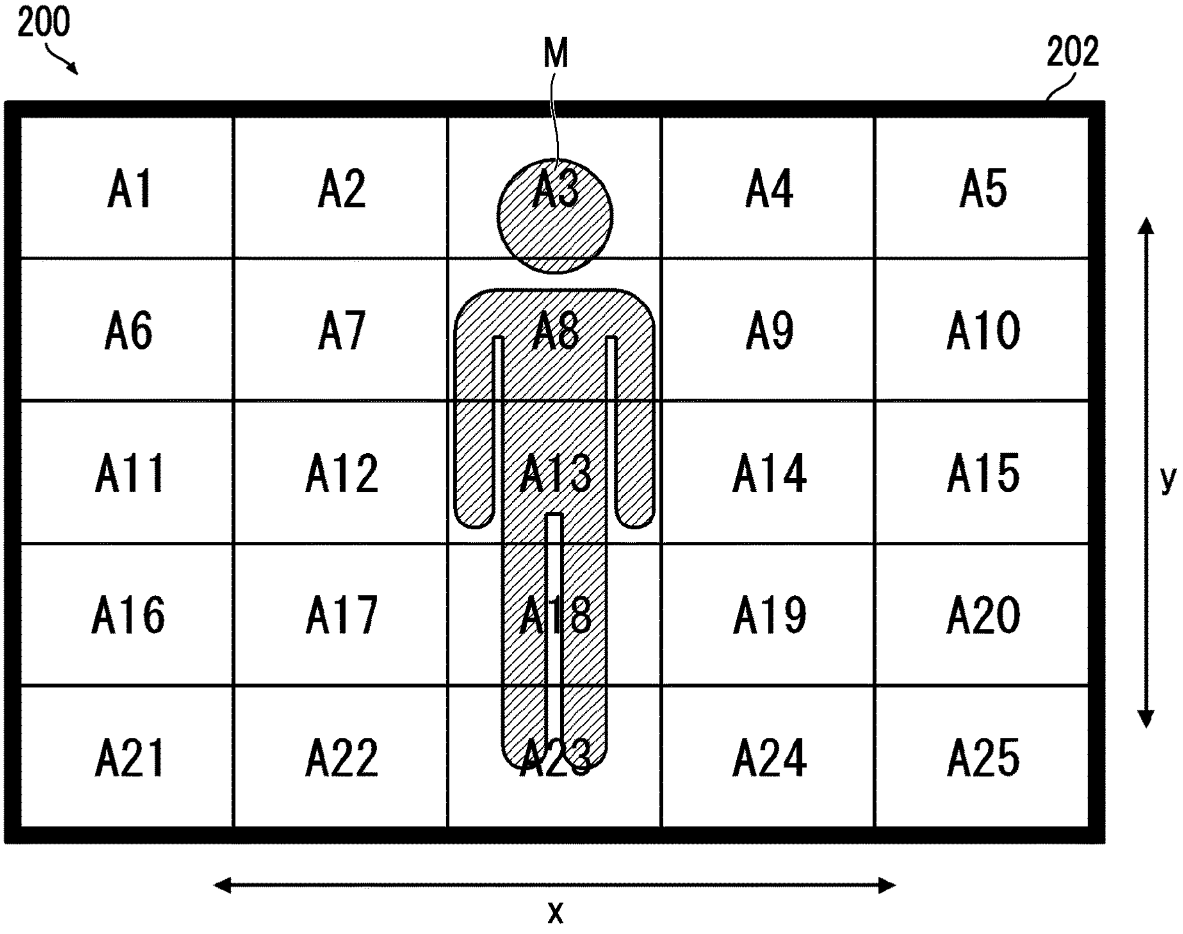
FIG. 12 is a diagram showing an example of a composition of imaging.

FIG. 12 is a diagram showing an example of a composition of imaging.

As shown in this diagram, it is considered that a stationary subject M is disposed in the center of the screen and is captured. In the case of this diagram, in a case where the subject M is focused, the phase difference is 0 in the divided areas A3, A8, A13, A18, and A23.

Figure 13:
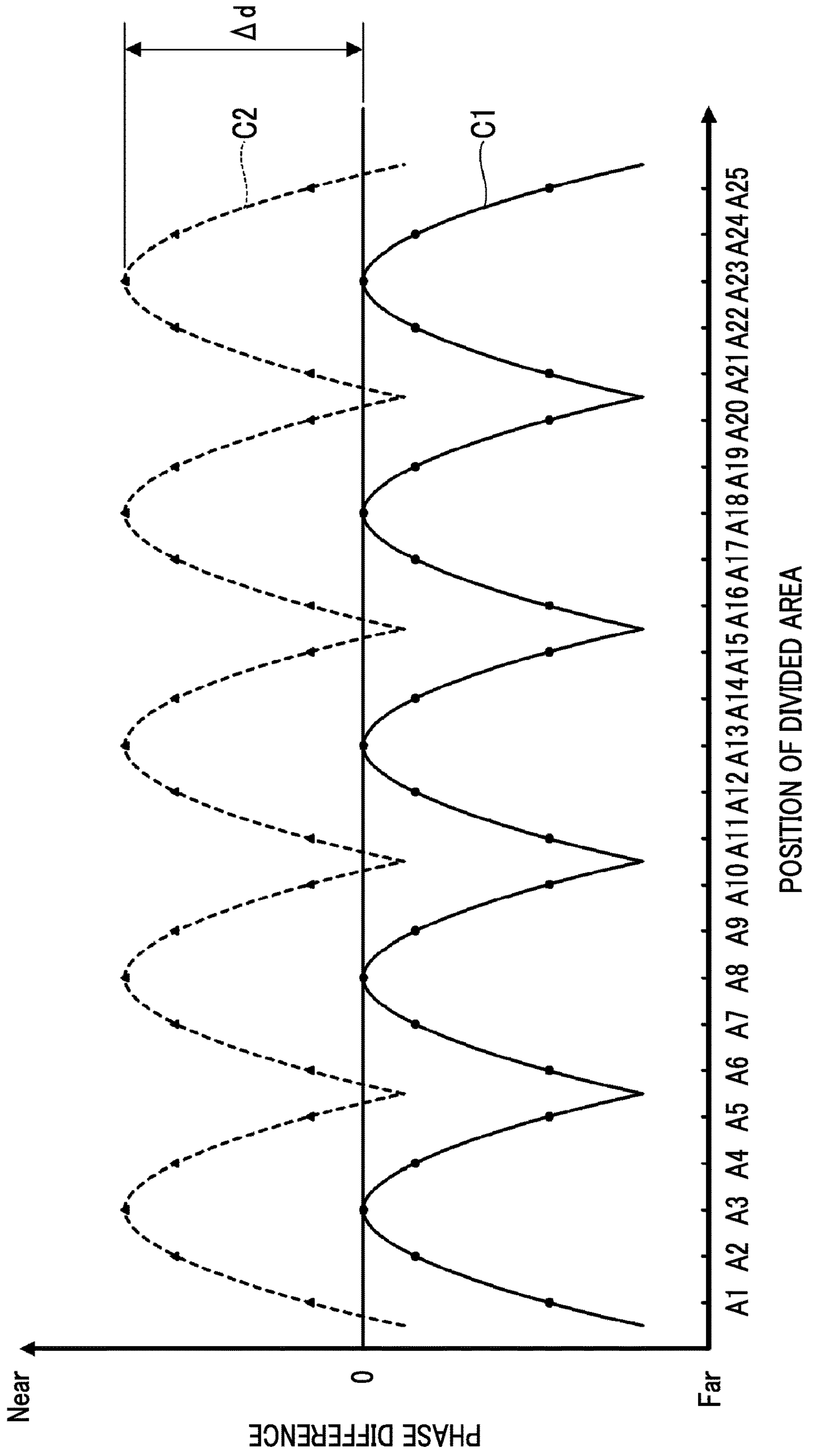
FIG. 13 is a graph showing a change in a phase difference detected in each divided area in a case where a focus adjustment operation is performed.

FIG. 13 is a graph showing a change in the phase difference detected in the divided areas in a case where the focus adjustment operation is performed. In this diagram, a horizontal axis represents the positions of the divided areas A1 to A25, and a vertical axis represents the phase differences.

In FIG. 13, a graph C1 indicated by a solid line is a graph of the phase differences obtained in the divided areas A1 to A25 in a case where the stationary subject M is focused. Meanwhile, a graph C2 indicated by a broken line is a graph of the phase differences obtained in the divided areas A1 to A25 in a case where the focus lens group of the interchangeable lens CL is moved from a state in which the stationary subject M is focused by a predetermined amount. That is, FIG. 13 shows graphs of the phase differences obtained in the divided areas A1 to A25 in a case where the focus adjustment operation is performed.

As shown in FIG. 13, in a case where the focus adjustment operation is performed on the interchangeable lens CL, the phase differences obtained in the divided areas A1 to A25 change as a whole (shift as a whole).

Figure 14:
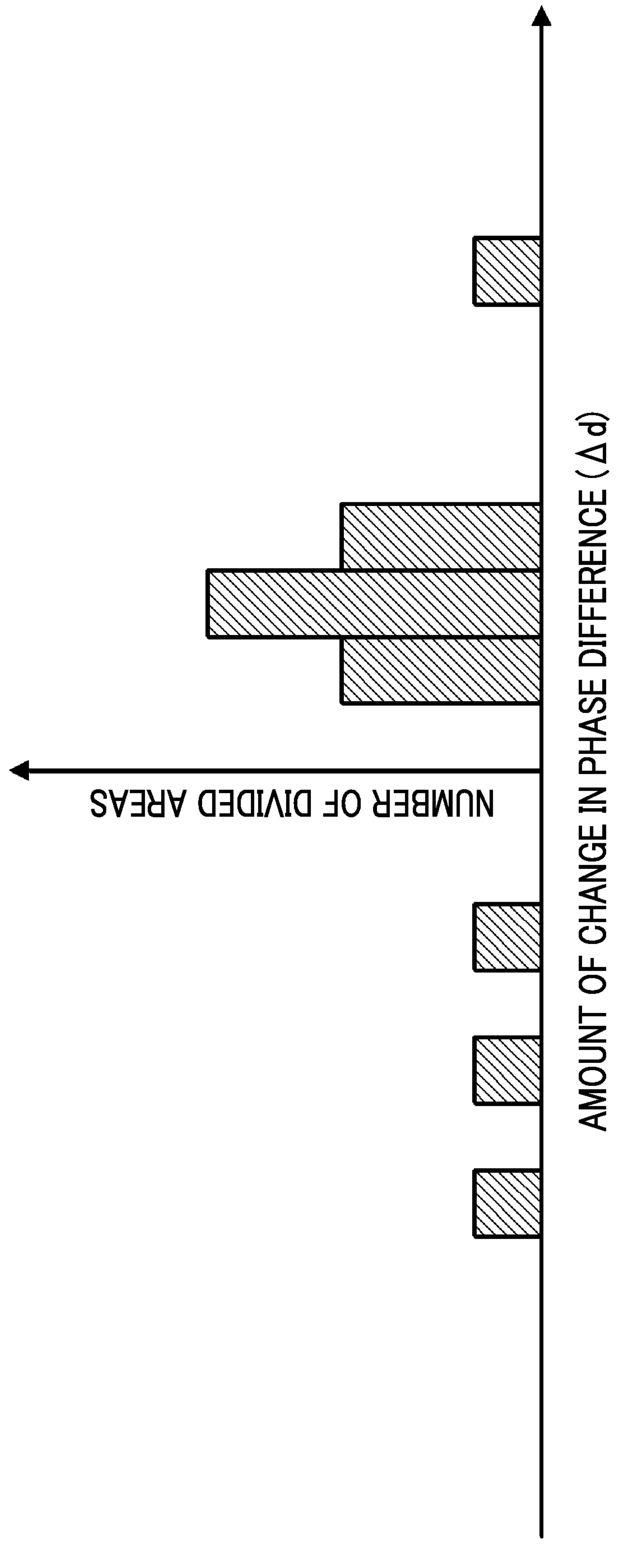
FIG. 14 is a graph showing a frequency distribution of the amount of change in the phase difference detected in each divided area.

FIG. 14 is a graph (histogram) showing a frequency distribution of the amount of change in the phase differences detected in the divided areas. In this diagram, a horizontal axis represents the amount of change Δd in the phase differences (see FIG. 13), and a vertical axis represents the number of divided areas having the same amount of change in the phase differences.

In a case where the focus adjustment operation is performed on the interchangeable lens CL in a state in which the subject is stationary, the phase difference between the divided areas A1 to A25 is substantially the same amount of change. In this case, as shown in FIG. 14, the frequency distribution of the amount of change is a distribution concentrated in the vicinity of the specific amount of change. That is, except for irregular detection, a distribution is concentrated substantially in the vicinity of an average value.

Figure 15:
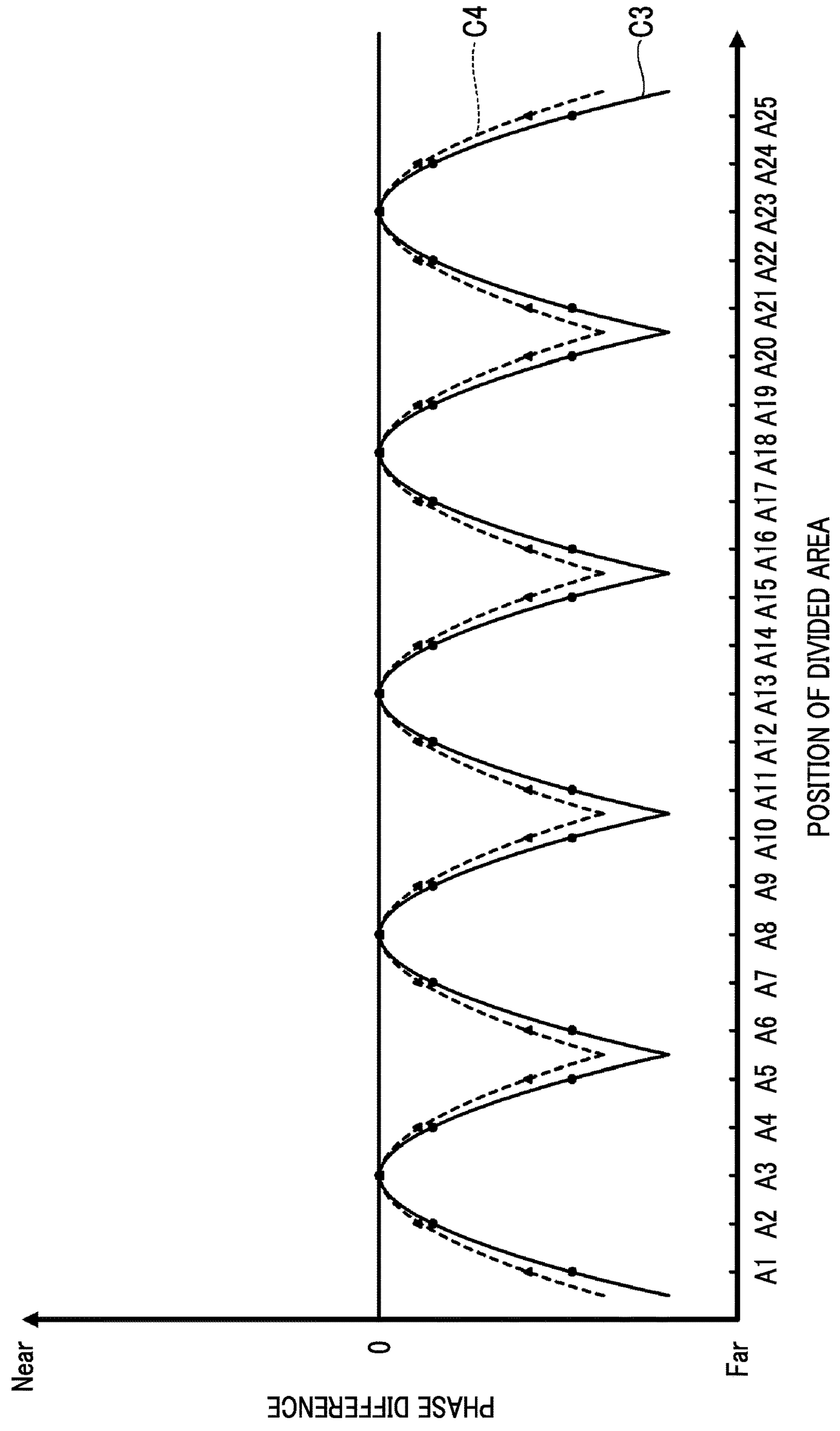
FIG. 15 is a graph showing the change in the phase difference detected in each divided area in a case where an F number is switched.

FIG. 15 is a graph showing a change in the phase differences detected in the divided areas in a case where the F number is switched.

In FIG. 15, a graph C3 indicated by a solid line is a graph of the phase differences obtained in the divided areas A1 to A25 in a case where the subject M is focused. Meanwhile, a graph C4 indicated by a broken line is a graph of the phase differences obtained in the divided areas A1 to A25 in a case where the F number is switched in a state in which the stationary subject M is focused.

In a case where the F number is switched, depth of field changes. Thus, the phase difference changes in a part of the divided areas. However, since the in-focus state is maintained, the phase difference does not change in the entire area to be captured.

Figure 16:
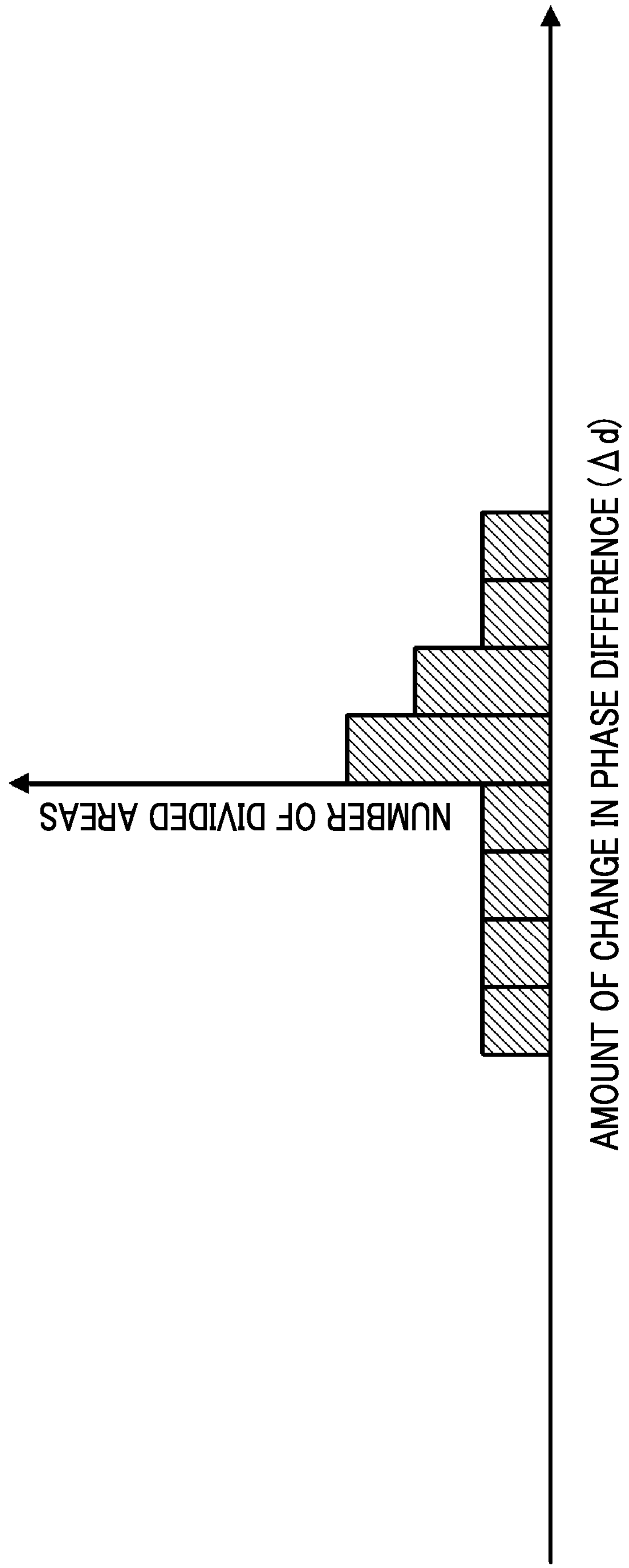
FIG. 16 is a graph showing a frequency distribution of the amount of change in the phase difference detected in each divided area in a case where the F number is switched.

FIG. 16 is a graph (histogram) showing a frequency distribution of the amount of change in the phase difference detected in the divided areas in a case where the F number is switched.

As described above, in a case where the F number is switched, the phase difference changes in a part of the divided areas. In this case, as shown in FIG. 16, the frequency distribution of the amount of change is a scattered distribution. Accordingly, even in a case where the phase difference changes, it is clearly distinguished from the case of the focus adjustment.

(ii) Case Where Subject is Moving

In a case where the subject is moving, the phase difference in the area where the subject is present changes.

Figure 17:
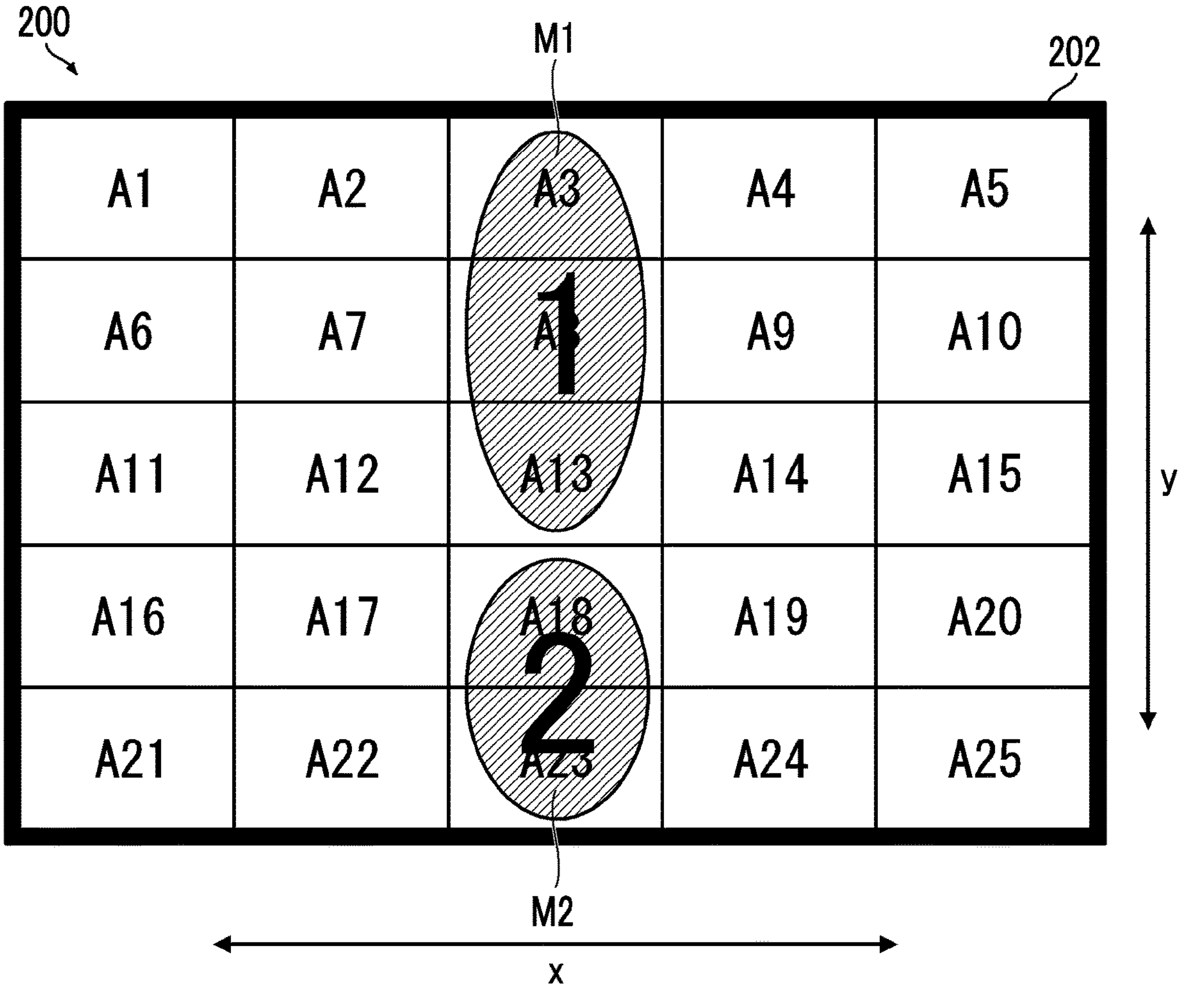
FIG. 17 is a diagram showing an example of a composition of imaging.

FIG. 17 is a diagram showing an example of a composition of imaging.

It is considered that two subjects M1 and M2 are simultaneously captured as shown in this diagram. One subject is a first subject M1, and the other subject is a second subject M2. It is assumed that both the subjects are present at the same subject distance position. Thus, in a case where one subject is focused, the other subject is also focused. In the case of the example shown in FIG. 17, in a vase where the first subject M1 is focused, the phase difference is zero in the divided areas A3, A8, A13, A18, and A23.

Figure 18:
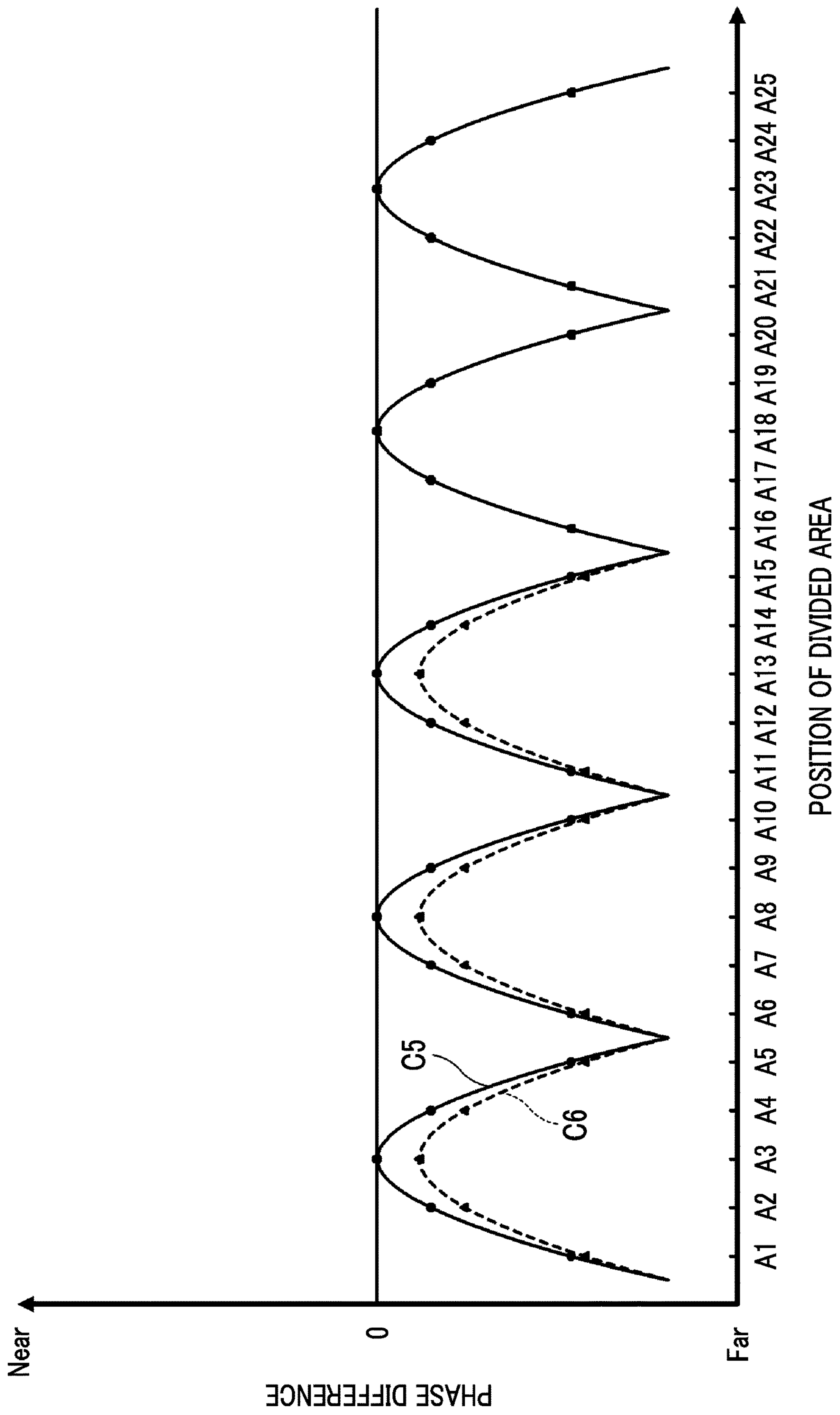
FIG. 18 is a graph showing a change in a phase difference detected in each divided area in a case where only a first subject moves in a front and back direction.

FIG. 18 is a graph showing a change in the phase difference detected in the divided areas in a case where only the first subject moves in a front and back direction.

In FIG. 18, a graph C5 indicated by a solid line is a graph of the phase differences obtained in the divided areas A1 to A25 before the movement. Meanwhile, a graph C6 indicated by a broken line is a graph of the phase differences obtained in the divided areas A1 to A25 after the movement.

In a case where the first subject M1 before movement is focused, a graph in which the phase difference is zero in the divided areas A3, A8, A13, A18, and A23 is obtained as shown by the graph C5 indicated by the solid line. In a case where only the first subject M1 moves in the front and back direction (away direction) from this state, the phase difference changes in the divided areas A3, A8, and A13 as shown by the graph C6 indicated by the broken line.

As stated above, in a case where the subject moves in the front and back direction, the phase difference in the area in which the moving subject exists changes. However, as described above, in the case of the focus adjustment operation, the phase difference changes in the entire captured area. Accordingly, even in a case where the phase difference changes, it is clearly distinguished from the case of the focus adjustment.

Figure 19:
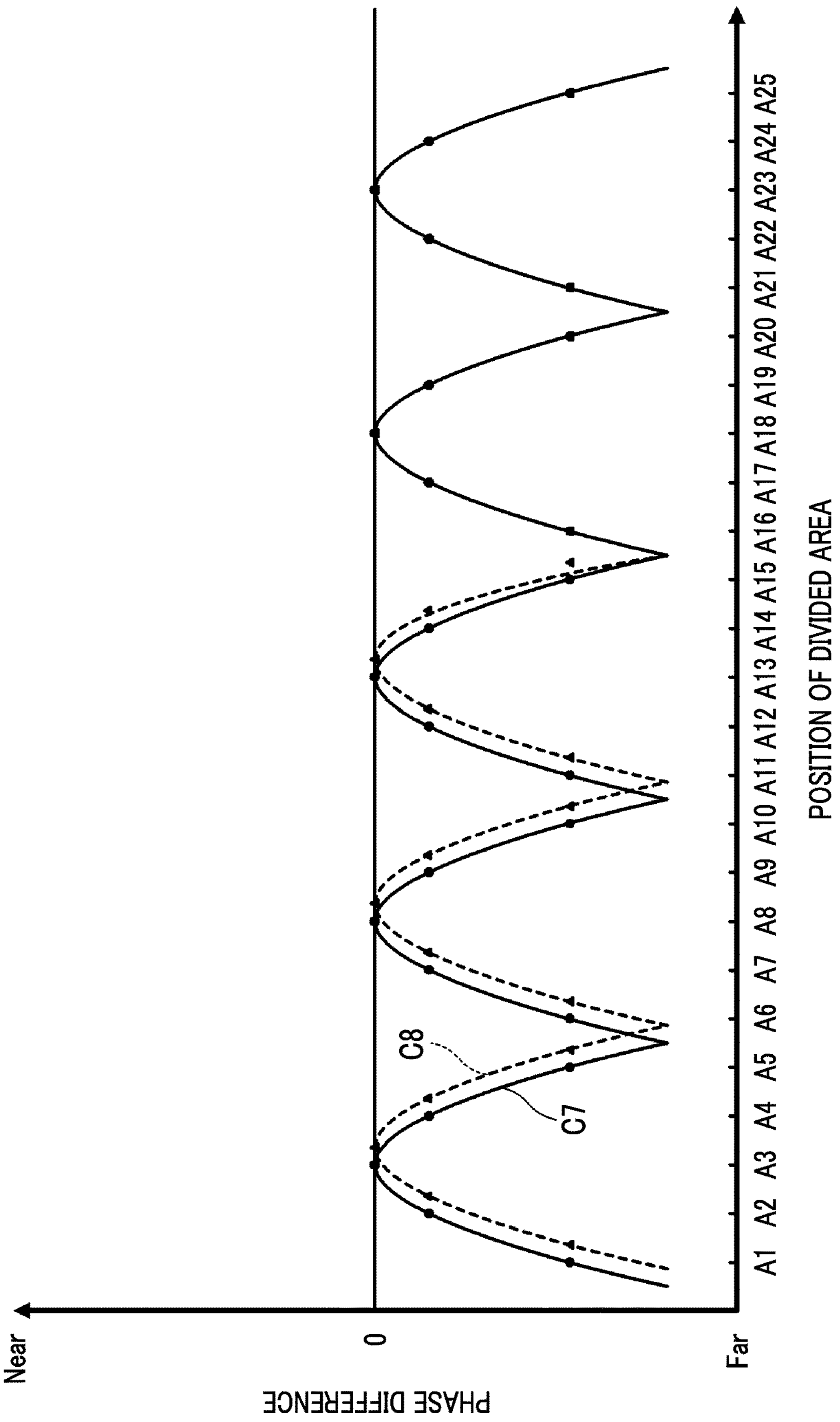
FIG. 19 is a graph showing a change in a phase difference detected in each divided area in a case where only the first subject moves in a horizontal direction.

FIG. 19 is a graph showing a change in the phase difference detected in the divided areas in a case where only the first subject moves in the horizontal direction.

In FIG. 19, a graph C7 indicated by a solid line is a graph of the phase differences obtained in each of the divided areas A1 to A25 before the movement. Meanwhile, a graph C8 indicated by a broken line is a graph of the phase differences obtained in the divided areas A1 to A25 after the movement.

In a case where the first subject M1 before moving is focused, a graph in which the phase difference is zero in the divided areas A3, A8, A13, A18, and A23 is obtained as shown by the graph C7 indicated by the solid line. In a case where only the first subject M1 moves in the horizontal direction (in a right direction in FIG. 17) from this state, the phase difference changes in the divided areas A3, A4, A8, A9, A13, and A14 as shown by the graph C8 indicated by the broken line.

As stated above, even in a case where the subject moves in the horizontal direction, the phase difference in the area where the moving subject is present changes. However, as described above, in the case of the focus adjustment operation, the phase difference changes in the entire captured area. Accordingly, even in a case where the phase difference changes, it is clearly distinguished from the case of the focus adjustment.

Figure 20:
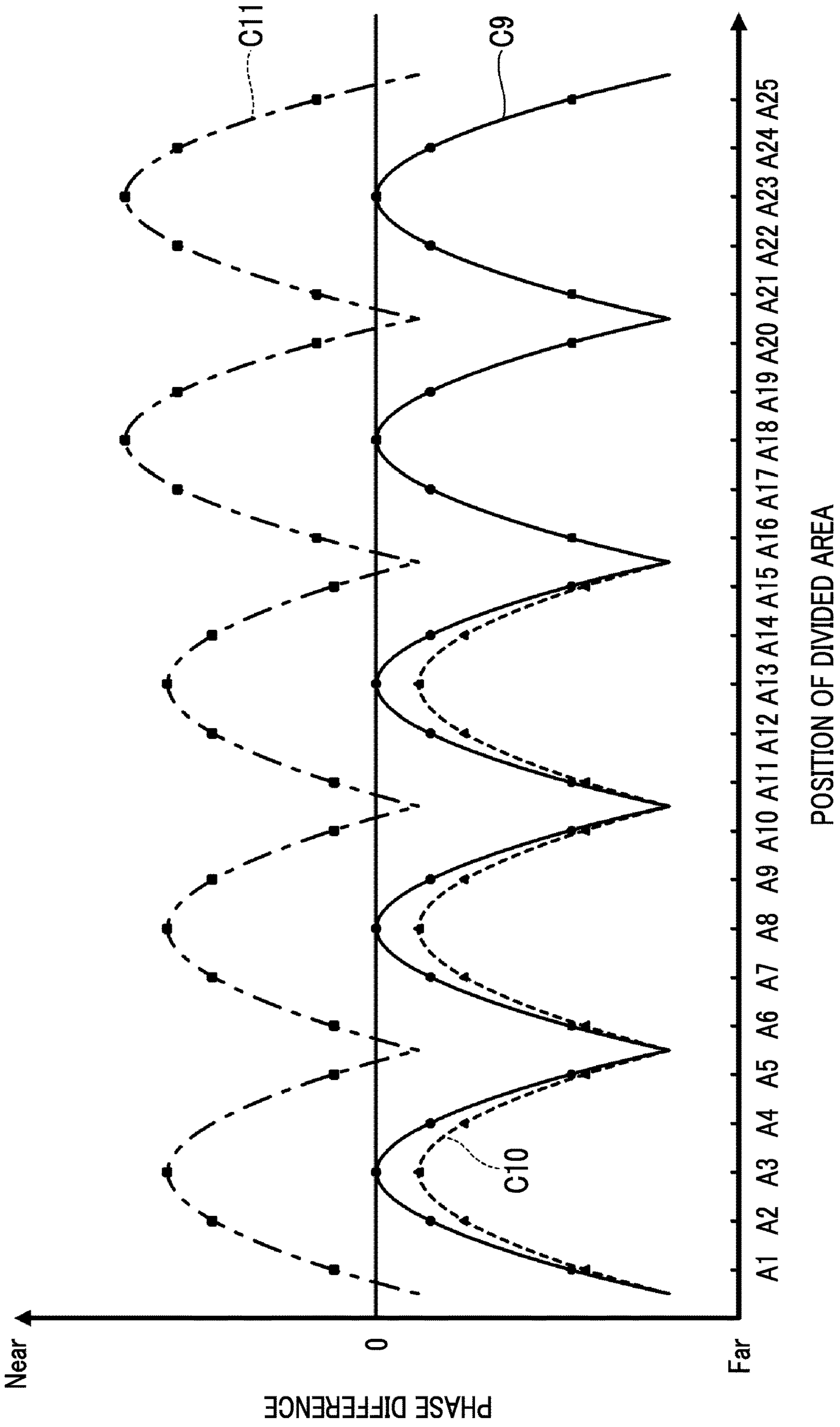
FIG. 20 is a graph showing a change in a phase difference detected in each divided area in a case where a focus adjustment operation is performed while the first subject is moving in the composition shown in FIG. 17.

(iii) Case Where Focus Adjustment Operation is Performed in a Case Where Subject is Moving FIG. 20 is a graph showing a change in the phase differences detected in the divided areas in a case where the focus adjustment operation is performed while the first subject is moving in the composition shown in FIG. 17. It is assumed that only the first subject M1 moves in the front and back direction (the away direction).

In FIG. 20, a graph C9 indicated by a solid line is a graph of the phase differences obtained in the divided areas A1 to A25 before the movement of the first subject M1. A graph C10 indicated by a broken line is a graph of the phase differences obtained in the divided areas A1 to A25 after the movement of the first subject M1. A graph C11 indicated by a dashed line is a graph of the phase differences obtained in the divided areas A1 to A25 in a case where the focus adjustment operation is performed while the first subject M1 is moving.

As shown in FIG. 20, even in a case where the focus adjustment operation is performed while the subject is moving, the phase difference changes in the entire captured area.

Figure 21:
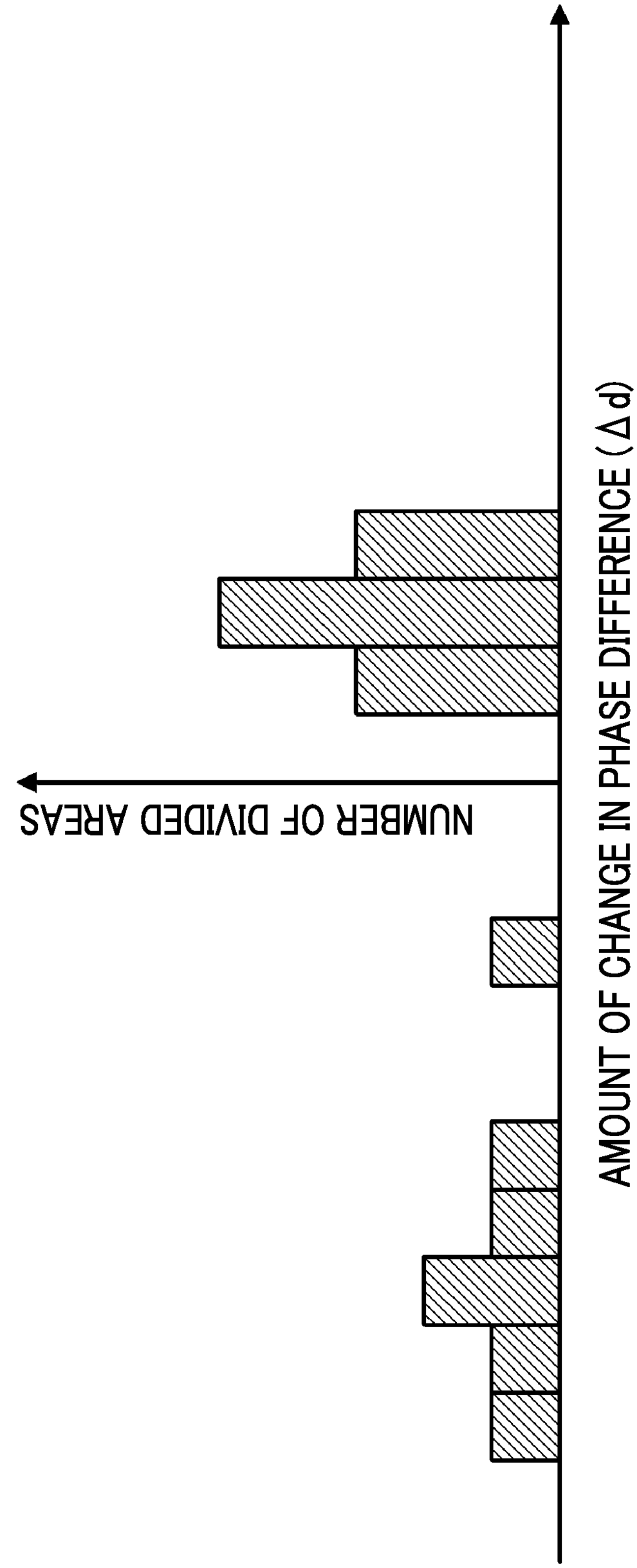
FIG. 21 is a graph showing a frequency distribution of the amount of change in the phase difference detected in each divided area in a case where the focus adjustment operation is performed while the first subject is moving.

FIG. 21 is a graph (histogram) showing a frequency distribution of the amount of change in the phase differences detected in the divided areas in a case where the focus adjustment operation is performed while the first subject is moving.

In a case where the subject moves in the front and back direction, a subject distance changes, and the phase difference changes. However, the amount of change is smaller than the change in the phase differences due to the focus adjustment operation. Accordingly, as shown in FIG. 21, even in a case where the focus adjustment operation is performed while the subject is moving, the frequency distribution of the amount of change in the phase differences is a distribution concentrated in the vicinity of the specific amount of change except for irregular detection. That is, the distribution is concentrated substantially in the vicinity of the average value.

The same is true of a case where the focus adjustment operation is performed while the subject is moving in the horizontal direction, and the frequency distribution of the amount of change in the phase differences is concentrated in the vicinity of the specific amount of change except for irregular detection. That is, the distribution is concentrated substantially in the vicinity of the average value.

As described above, whether or not the focus adjustment operation is performed can be detected from the change in the phase difference between the divided areas A1 to A25. That is, whether or not the focus adjustment operation is performed can be detected by analyzing a change state of the phase difference detected in each of the divided areas A1 to A25.

As described above, in the case of the focus adjustment operation, the amount of change in the phase difference shows a specific frequency distribution. Thus, whether or not the focus adjustment operation is performed can be detected from the frequency distribution of the amount of change in the phase difference. That is, it is possible to detect whether or not the focus adjustment operation is performed by analyzing a degree of variation in the distribution.

As described above, in the case of the focus adjustment operation, the frequency distribution of the amount of change in the phase difference is a distribution concentrated substantially in the vicinity of the average value. Thus, the average value of the amount of change in the phase difference is obtained, and thus, it is possible to discriminate whether or not the focus adjustment operation is performed from the number of areas showing the amount of change deviating from a numerical value in the vicinity of the average value of the amount of change in the phase difference. That is, since a case where the number of divided areas deviating from the average value is large is a case where the variation is large, it is possible discriminate that the focus adjustment operation is not performed. Meanwhile, in a case where the number of divided areas deviating from the average value is small is a case where the areas are concentrated in the vicinity of the average value, it is possible to discriminate that the focus adjustment operation is performed. Thus, in a case where whether or not the focus adjustment operation is performed is detected based on the frequency distribution of the amount of change in the phase difference, it is possible to detect the presence or absence of the focus adjustment operation according to the following procedure. First, the average value of the amount of change in phase difference for each of the divided areas A1 to A25 is calculated. Subsequently, the divided areas in which a difference from the average value is equal to or greater than a prescribed amount are extracted, and the number of areas is counted. Subsequently, it is determined whether or not the counted number is equal to or less than a prescribed number. In a case where the counted number is equal to or less than the prescribed number, it is determined that the focus adjustment operation is performed. That is, in this case, since there is no variation in the amount of change, it is considered that the phase differences change as a whole, and it is determined that the focus adjustment operation is performed. Meanwhile, in a case where the counted number exceeds the prescribed number, it is determined that the focus adjustment operation is not performed. That is, in this case, since the amount of change varies, it is considered that the phase difference has not changed overall, and it is determined that the focus adjustment operation is not performed.

(2) Detection Processing of Focus Adjustment Operation in Focus Adjustment Operation Detection Unit As described above, whether or not the focus adjustment operation is performed can be detected by monitoring the change in the phase difference detected in each of the divided areas A1 to A25.

Figure 22:
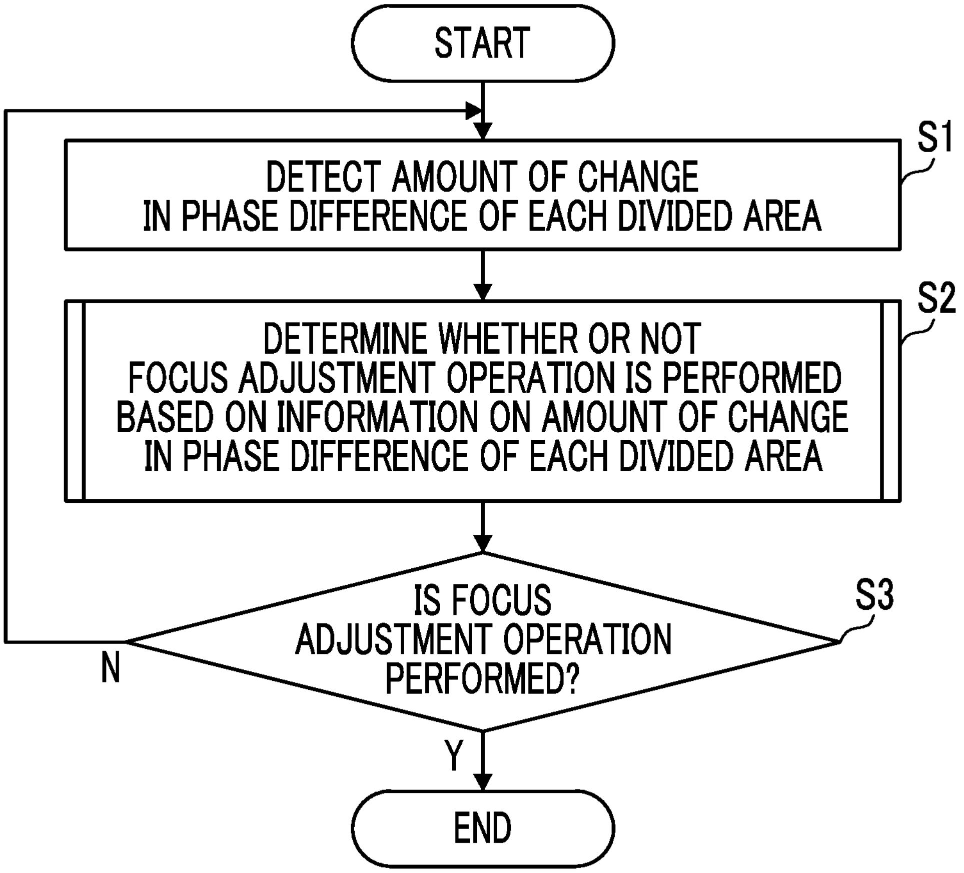
FIG. 22 is a flowchart showing a procedure of detection processing of a focus adjustment operation executed by a focus adjustment operation detection unit.

FIG. 22 is a flowchart showing a procedure of detection processing of the focus adjustment operation executed by the focus adjustment operation detection unit.

First, the amount of change in the phase difference for each of the divided areas A1 to A25 is detected (step S1). The amount of change mentioned herein is the amount of change per unit time. A unit time Δt is set in advance. The focus adjustment operation detection unit 276 acquires the information on the phase difference for each of the divided areas A1 to A25 from the phase difference detection unit 234, and acquires the information on the phase difference for each of the divided areas A1 to A25 from the phase difference detection unit 234 after the passage of the unit time Δt. The difference is obtained, and the amount of change in the phase difference for each of the divided areas A1 to A25 is detected.

Subsequently, processing for determining whether or not the focus adjustment operation is performed is performed based on the obtained information on the amount of change in the phase difference for each of the divided areas A1 to A25 (step S2). That is, whether or not the focus adjustment operation is performed is determined by analyzing the obtained information on the amount of change in the phase difference for each of the divided areas A1 to A25.

Figure 23:
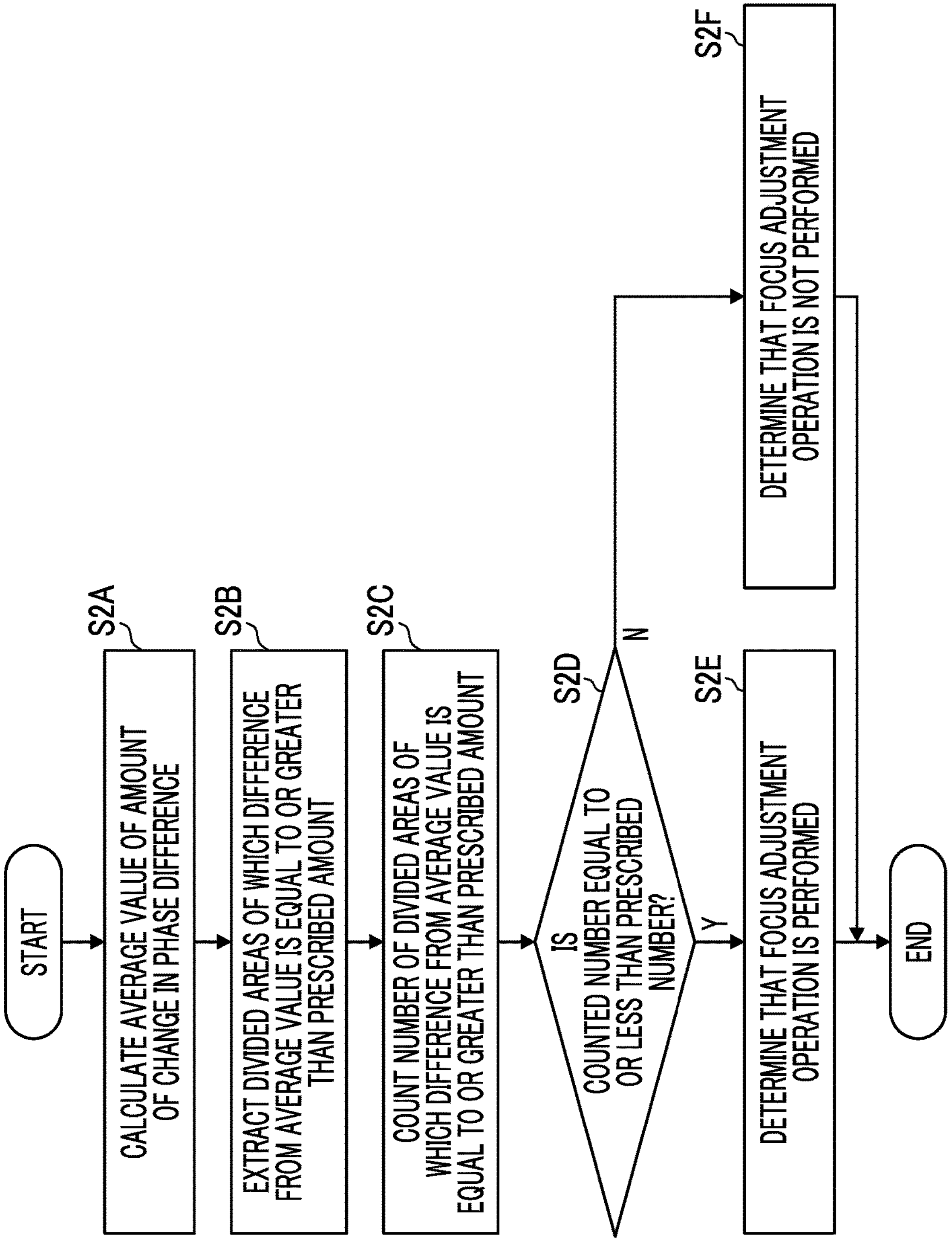
FIG. 23 is a flowchart showing a processing procedure for determining whether or not the focus adjustment operation is performed.

FIG. 23 is a flowchart showing a processing procedure for determining whether or not the focus adjustment operation is performed.

First, the average value of the amount of change in the phase difference for each of the divided areas A1 to A25 is calculated (step S2A). Subsequently, the divided areas in which the difference from the average value is equal to or greater than a preset prescribed amount are extracted (step S2B). Subsequently, the number of extracted divided areas is counted (step S2C). Subsequently, it is determined whether or not the counted number is equal to or less than a preset prescribed number by comparing the counted number with the prescribed number (step S2D). In a case where the counted number is equal to or less than the prescribed number, it is determined that the focus adjustment operation is performed (step S2E). That is, in this case, since there is no variation in the amount of change, it is considered that the phase differences change as a whole, and it is determined that the focus adjustment operation is performed. Meanwhile, in a case where the counted number exceeds the prescribed number, it is determined that the focus adjustment operation is not performed (step S2F). That is, in this case, since the amount of change varies, it is considered that the phase difference has not changed overall, and it is determined that the focus adjustment operation is not performed.

As shown in FIG. 22, after the determination processing, whether or not the focus adjustment operation is performed is determined based on the result of the determination processing (step S3). In a case where the focus adjustment operation is detected, the processing ends. Meanwhile, in a case where the focus adjustment operation is not detected, the processing returns to step S1 and the detection processing is performed again.

[Operation of Digital Camera]

<<Determination of Communication Availability>>

In a case where the power is turned on, the digital camera DC determines whether or not the interchangeable lens CL is attached. In a case where it is determined that the interchangeable lens CL is attached, it is further determined whether or not the communication is available.

In a case where an interchangeable lens of which the communication is not available is attached to the digital camera main body DCB, the interchangeable lens cannot be controlled from the digital camera main body side. Accordingly, in this case, a function related to lens control is limited. That is, the focus adjustment and the setting of the F number are manually set.

<<Still Image Imaging>>

In the digital camera DC, imaging preparation is performed by pushing the shutter button 114 halfway, and image recording is performed by fully pushing the shutter button. In a case where the focus mode of the camera is set to auto focus, the auto focus is operated by pushing the shutter button 114 halfway. In a case where the focus mode of the camera is set to manual focus, the focusing is manually performed.

<<Motion Picture Imaging>>

The digital camera DC starts the imaging by fully pushing the shutter button 114 for the first time, and ends the imaging by fully pushing the shutter button 114 for the second time. In a case where the focus mode of the camera is set to auto focus, the auto focus operates simultaneously with the start of the imaging. In a case where the focus mode of the camera is set to manual focus, the focusing is manually performed.

[Focusing Assistance Function]

The digital camera DC according to the present embodiment has a function of assisting the manual focusing. This function is a function of automatically achieving the in-focus state in the case of manual focusing, and operates in a case where it is approaching the in-focus state. Hereinafter, the focusing assistance function will be described.

Figure 24:
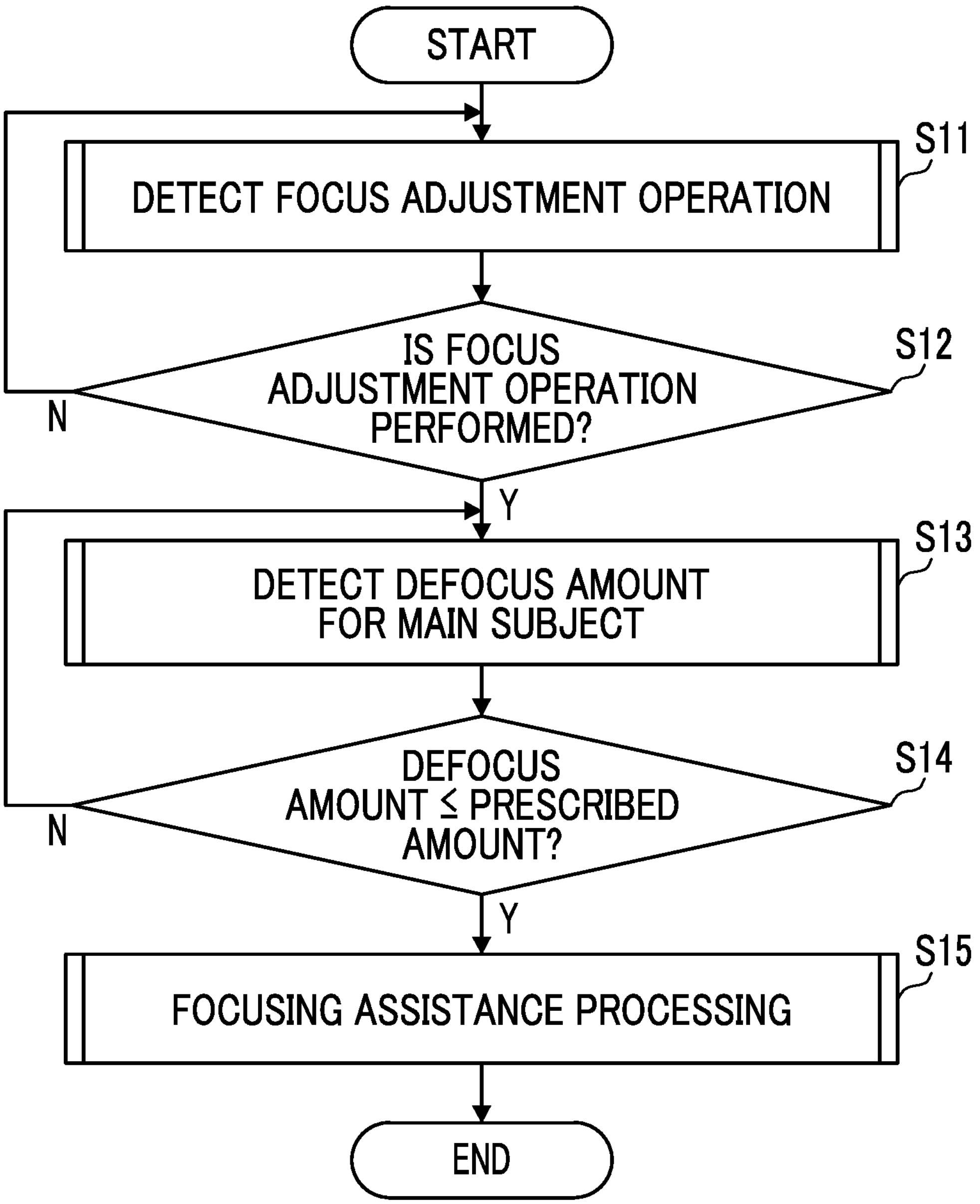
FIG. 24 is a flowchart showing a procedure of focusing assistance processing.

FIG. 24 is a flowchart showing a procedure of the focusing assistance processing.

The focusing assistance function operates in a case where the focus mode of the camera is set to manual focus and the focusing assistance function is turned on. Thus, the following processing is performed on the assumption that the focus mode of the camera is set to manual focus and the focusing assistance function is turned on.

First, it is detected whether or not the focus adjustment operation is performed (step S11). The method of detecting the focus adjustment operation is different depending on the type of the interchangeable lens CL attached to the digital camera main body DCB. Specifically, the detection method is different depending on whether or not the interchangeable lens CL attached to the digital camera main body DCB is the lens that can communicate with the digital camera main body DCB.

In the case of the interchangeable lens CL that can communicate with the digital camera main body DCB, in a case where the focus adjustment operation is performed on the interchangeable lens CL, the operation information is transmitted from the interchangeable lens CL to the digital camera main body DCB. The camera microcomputer 250 detects whether or not the focus adjustment operation is performed depending on whether or not this operation information is received.

Meanwhile, in the case of the interchangeable lens CL that cannot communicate with the digital camera main body DCB, the focus adjustment operation detection unit 276 detects whether or not the focus adjustment operation is performed.

The communication availability determination unit 274 determines whether or not the interchangeable lens CL attached to the digital camera main body DCB can communicate with the digital camera main body DCB.

In a case where the detection is performed, it is determined whether or not the focus adjustment operation is performed based on the detection result (step S12). In a case where the operation is not detected, the detection processing is performed again.

Meanwhile, in a case where the focus adjustment operation is detected, the defocus amount for the main subject is detected (step S13). It is determined whether or not it is approaching the in-focus state based on the detected defocus amount. That is, it is determined whether or not the detected defocus amount is equal to or less than the prescribed amount (step S14).

In a case where it is determined that the defocus amount for the main subject is equal to or less than the prescribed amount, focusing assistance processing is performed (step S15). That is, the in-focus state is achieved by controlling the movement of the image sensor 200 based on the detection result of the focus state detection unit 252.

As stated above, the focusing assistance is performed in a case where it is approaching the in-focus state, and the in-focus state is automatically achieved. Accordingly, for example, even in a case where the manual focusing cannot be performed, it is possible to accurately achieve the in-focus state. In particular, in a case where the focusing is performed by using the low-resolution main monitor 104 or the electronic viewfinder 108, there is a limit to the manual focusing, but the in-focus state can be accurately achieved by using this assistance mechanism.

Modification Example

Modification Example of Detection of Focus Adjustment Operation

<<Detection of Focus Adjustment Operation Using Reliable Detection Result of Phase Difference>>

In the aforementioned embodiment, in the case of detecting whether or not the focus adjustment operation is performed, the phase difference for each divided area is detected. However, some phase differences detected in each divided area have low reliability. In a case where the detection processing of the focus adjustment operation is performed by using the detection result having low reliability, the detection accuracy decreases. Accordingly, it is preferable that the processing of the focus adjustment operation is performed only by using the reliable detection result of the phase difference.

Figure 25:
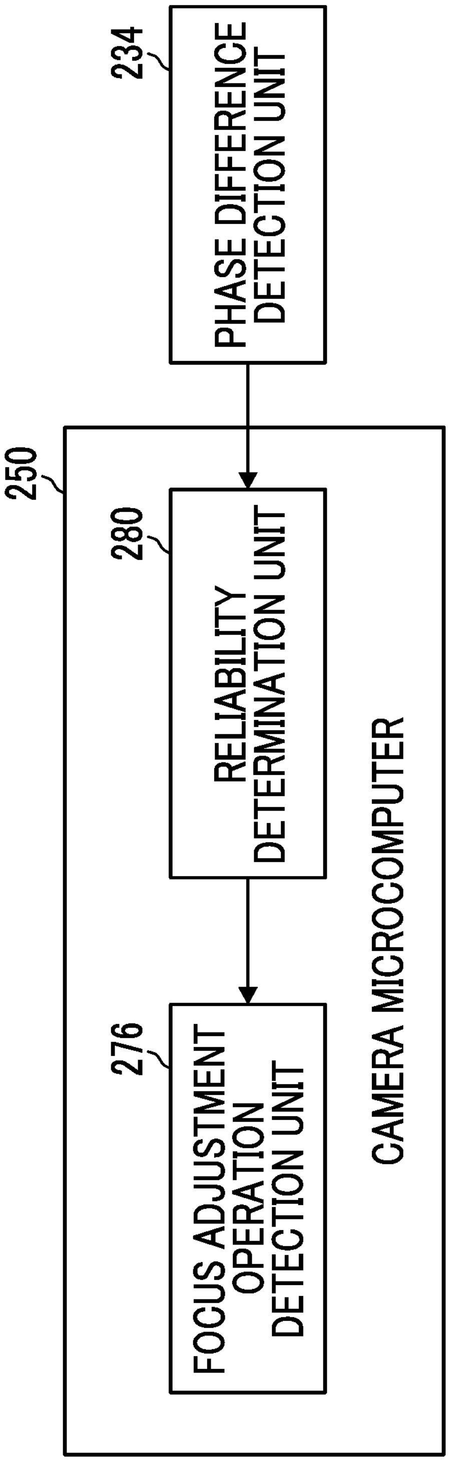
FIG. 25 is a block diagram of a main configuration in a case where whether or not the focus adjustment operation is performed is detected based on a change in a phase difference of a reliable divided area.

FIG. 25 is a block diagram of a main configuration in a case where whether or not the focus adjustment operation is performed is detected based on the change in the phase difference of the reliable divided area.

As shown in this diagram, a reliability determination unit 280 is further provided. A function of the reliability determination unit 280 is realized by the camera microcomputer 250 executing a predetermined program.

The reliability determination unit 280 determines the reliability of the phase difference detected for each divided area by the phase difference detection unit 234. The reliability determination unit 280 calculates a degree of correlation between the signal of the first phase difference detection pixel 208A and the signal of the second phase difference detection pixel 208B in the case of calculating the phase difference, and determines whether or not the phase difference is reliable by determining whether or not the signal has the degree of correlation equal to or greater than a threshold value. That is, it is determined that the phase difference is reliable in a case where the signal has the degree of correlation equal to or greater than the threshold value.

The focus adjustment operation detection unit 276 detects whether or not the focus adjustment operation of the interchangeable lens CL is performed based on the change in the phase difference of the divided areas for which the reliability determination unit 280 determines that the phase difference is reliable.

Figure 26:
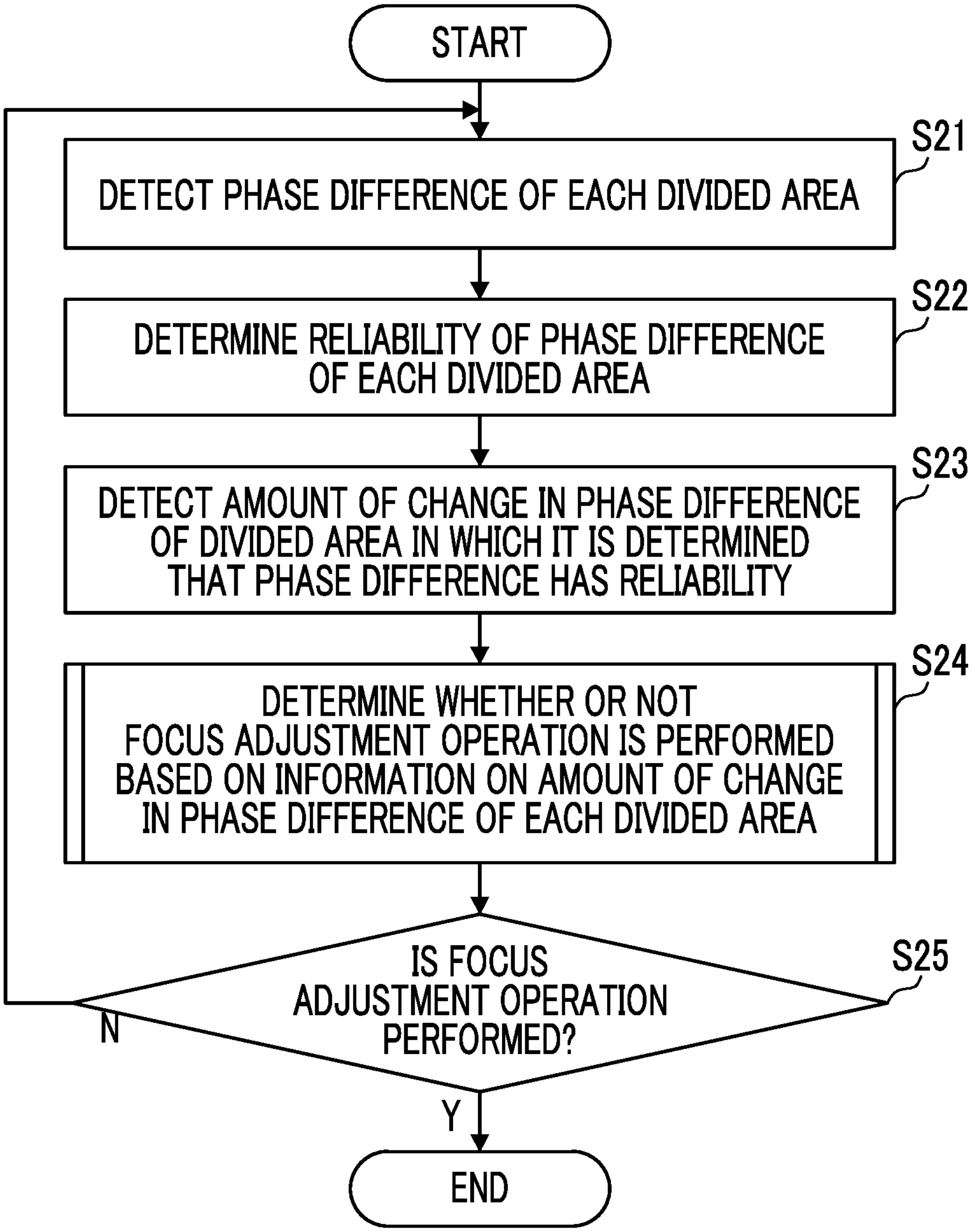
FIG. 26 is a flowchart showing a processing procedure in a case where whether or not the focus adjustment operation is performed is detected based on the change in the phase difference of the reliable divided area.

FIG. 26 is a flowchart showing a processing procedure in a case where whether or not the focus adjustment operation is performed is detected based on the change in the phase difference of the reliable divided area.

First, the phase difference for each of the divided areas A1 to A25 is detected (step S21). Subsequently, the reliability of the detected phase difference is determined (step S22). Subsequently, the amount of change in the phase difference of the divided area in which it is determined that the phase difference is reliable is detected (step S23). Subsequently, processing for determining whether or not the focus adjustment operation is performed is performed based on the obtained information on the amount of change in the phase difference for each divided area (step S24). Subsequently, whether or not the focus adjustment operation is performed is determined based on the result of the determination processing (step S25).

As stated above, highly accurate detection can be stably performed by determining the reliability of the detection result of the phase difference and detecting whether or not the focus adjustment operation is performed based on the reliable detection result.

<<Detection of Focus Adjustment Operation Excluding Specific Divided Area>>

In the aforementioned embodiment, whether or not the focus adjustment operation is performed is detected by using the information on the phase differences of all the divided areas A1 to A25. However, it is preferable that a specific divided area is excluded and whether or not the focus adjustment operation is performed is detected in some cases. For example, a moving body is present in the area to be captured in some cases. In this case, whether or not the focus adjustment operation is performed is detected by excluding the divided area in which the moving body is present. Accordingly, it is possible to perform more stable and highly accurate detection.

Figure 27:
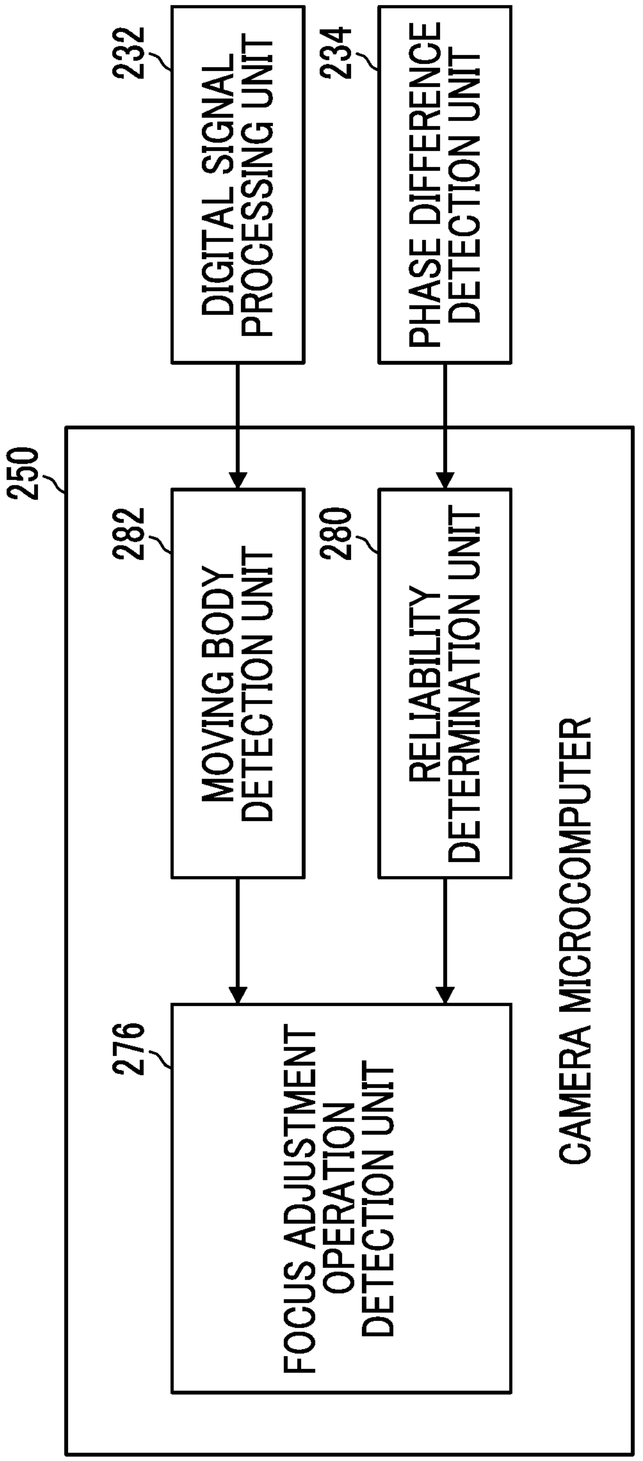
FIG. 27 is a block diagram of a main configuration in a case where whether or not the focus adjustment operation is performed is detected by excluding the divided area in which a moving body is present.

FIG. 27 is a block diagram of a main configuration in a case where whether or not the focus adjustment operation is performed is detected by excluding the divided area in which the moving body is present.

As shown in this diagram, a moving body detection unit 282 is further provided. A function of the moving body detection unit 282 is realized by the camera microcomputer 250 executing a predetermined program.

The moving body detection unit 282 detects the moving body by analyzing the captured images sequentially obtained from the digital signal processing unit 232. A known technology (moving body detection using so-called image processing) is used for this processing.

In a case where the moving body is detected, the focus adjustment operation detection unit 276 detects whether or not the focus adjustment operation is performed by excluding the divided area in which the moving body is present.

In the example shown in this diagram, the reliability determination unit 280 is further provided, and whether or not the focus adjustment operation is performed is detected based on the change in the phase difference for each of the divided areas in which the reliability determination unit 280 determines that the phase difference is reliable.

Figure 28:
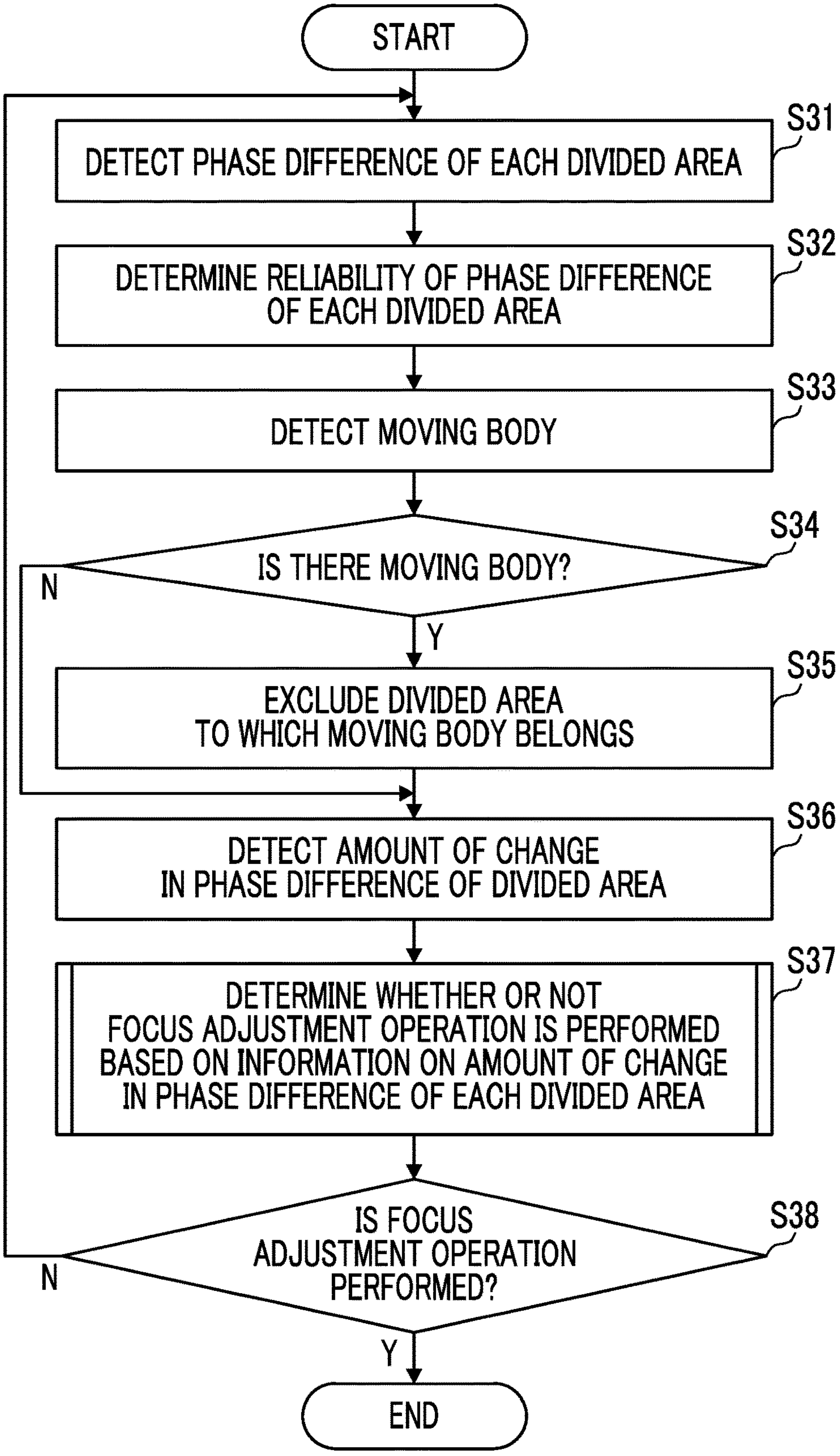
FIG. 28 is a flowchart showing a processing procedure in a case where whether or not the focus adjustment operation is performed is detected by excluding the divided area in which the moving body is present.

FIG. 28 is a flowchart showing a processing procedure in a case where whether or not the focus adjustment operation is performed is detected by excluding the divided area in which the moving body is present.

First, the phase difference for each of the divided areas A1 to A25 is detected (step S31). Subsequently, the reliability of the detected phase difference is determined (step S32). Subsequently, the moving body is detected (step S33). Subsequently, whether or not the moving body is present is determined based on the detection result of the moving body (step S34). In a case where the moving body is present, the divided area in which the moving body is present is specified, and the specified divided area is excluded from a detection target (step S35). Subsequently, the amount of change in the phase difference for each divided area is detected (step S36). At this time, in a case where the moving body is detected, the displacement amount of the divided area other than the excluded divided area is detected. The amount of change in the phase difference of the divided area in which it is determined that the phase difference is reliable is detected. Subsequently, processing for determining whether or not the focus adjustment operation is performed is performed based on the obtained information on the amount of change in the phase difference for each divided area (step S37). Subsequently, whether or not the focus adjustment operation is performed is determined based on the result of the determination processing (step S38).

As described above, a more stable and highly accurate focus adjustment operation can be detected by excluding the divided area in which the moving body is present and detecting whether or not the focus adjustment operation is performed.

Another Modification Example

In the aforementioned example, the moving body is detected by so-called image processing, but the area in which the moving body is present can be estimated from a change in luminance. In this case, whether or not the focus adjustment operation is performed is detected by excluding the divided area in which it is estimated that the moving body is present.

Figure 29:
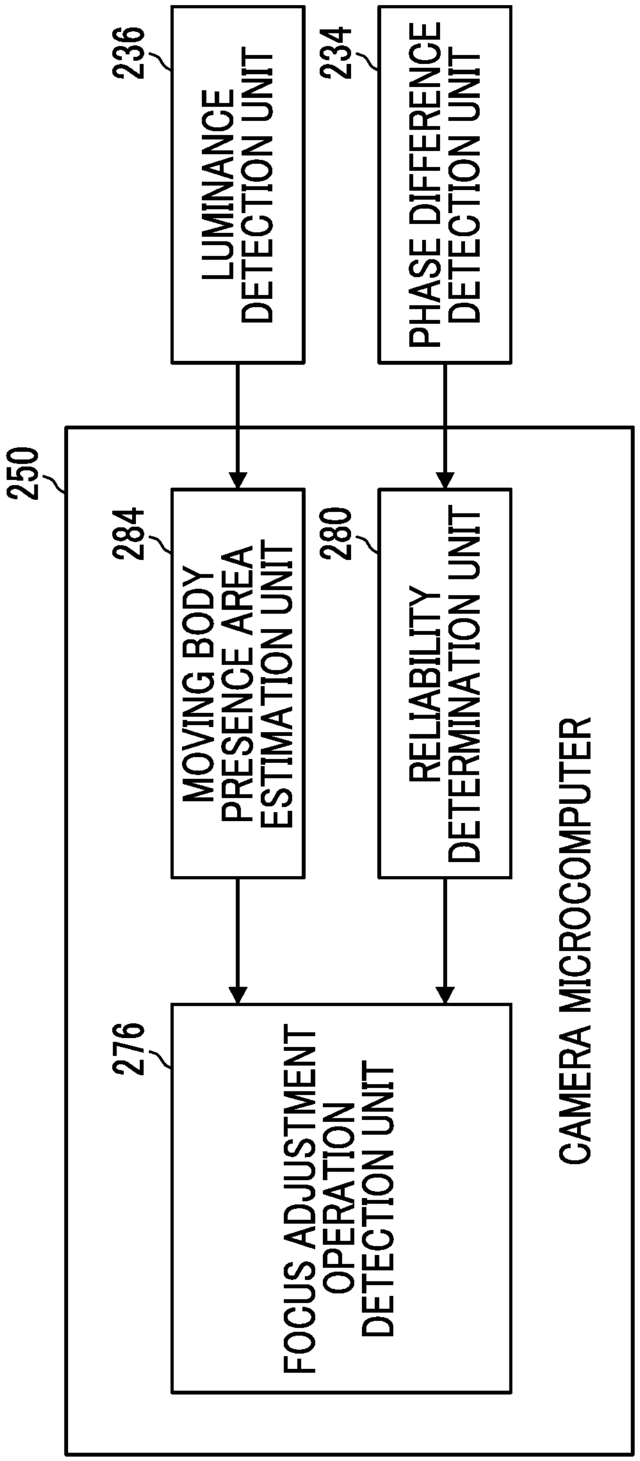
FIG. 29 is a block diagram of a main configuration in a case where the divided area in which the moving body is present is estimated from a change in luminance.

FIG. 29 is a block diagram of a main configuration in a case where the divided area in which the moving body is present is estimated from the change in the luminance.

As shown in this diagram, a moving body presence area estimation unit 284 is further provided. A function of the moving body presence area estimation unit 284 is realized by the camera microcomputer 250 executing a predetermined program.

The moving body presence area estimation unit 284 estimates the area in which the moving body is present based on the luminance of each of the divided areas A1 to A25 detected by the luminance detection unit 236. Specifically, first, the change in the luminance per unit time in each of the divided areas A1 to A25 is detected. Subsequently, the divided area in which the amount of change in the luminance is equal to or greater than a first threshold value is extracted based on the detection result. The extracted divided area is estimated to be the divided area in which the moving body is present.

In general, in the area in which the moving body is present, the luminance changes greatly. Thus, it is possible to estimate the area in which the moving body is present by detecting the area in which the amount of change in the luminance is equal to or greater than a certain level.

As described above, the area in which the moving body is present may be detected from the change in the luminance. In the case of the present example, the luminance detection unit 236 functions as a first luminance detection unit.

The detection of the moving body by image processing and the detection of the moving body based on the change in the luminance can be used together. That is, both the moving body detection unit 282 and the moving body presence area estimation unit 284 can be provided.

Figure 30:
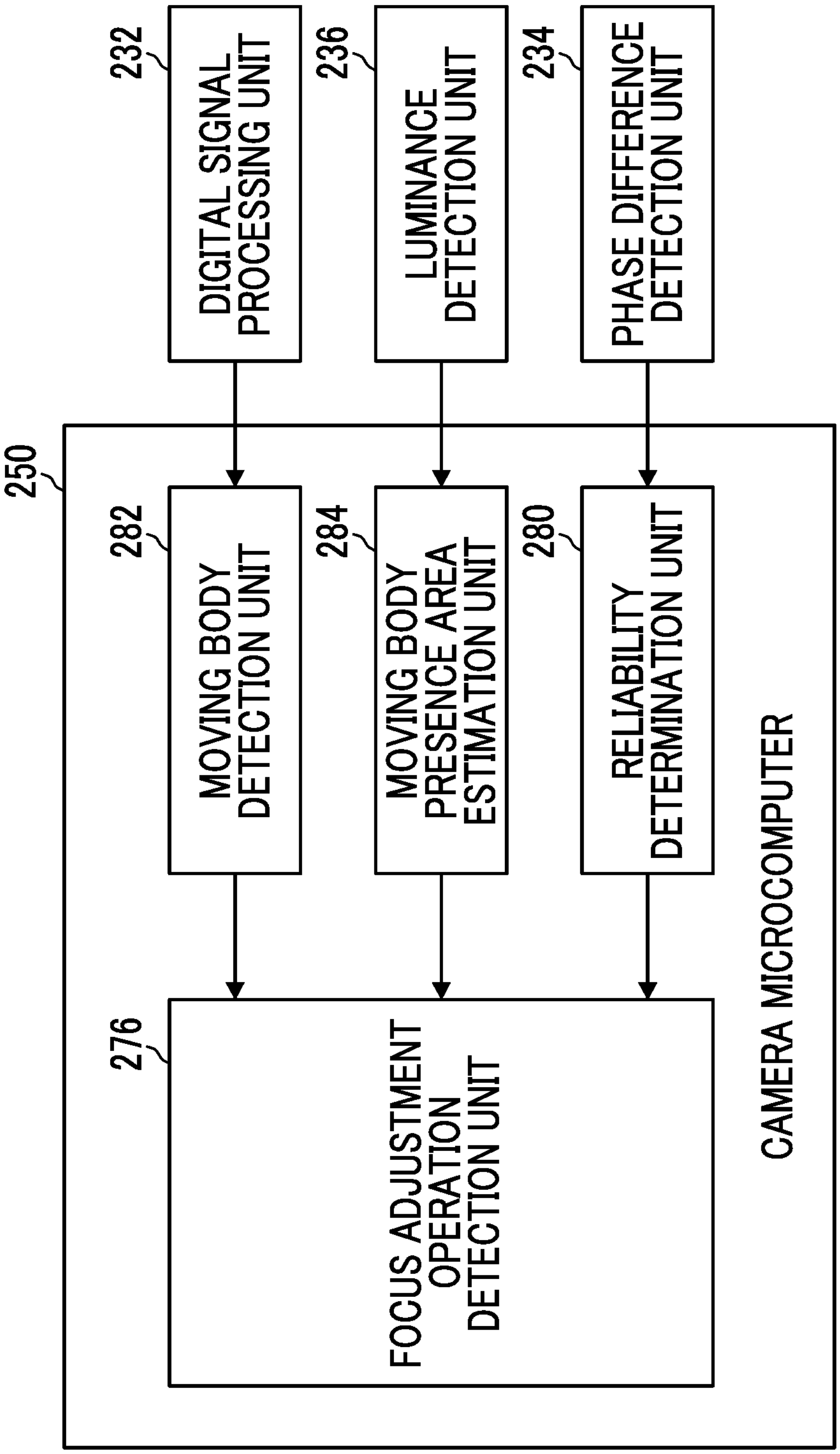
FIG. 30 is a block diagram of a main configuration in a case where whether or not the focus adjustment operation is performed is detected based on a detection result of a moving body detection unit and an estimation result of a moving body presence area estimation unit.

FIG. 30 is a block diagram of a main configuration in a case where whether or not the focus adjustment operation is performed is detected based on the detection result of the moving body detection unit and the estimation result of the moving body presence area estimation unit.

In this case, the focus adjustment operation detection unit 276 excludes the divided area in which the moving body is detected by the moving body detection unit 282 and the divided area in which the presence of the moving body is estimated by the moving body presence area estimation unit 284, and detects whether or not the focus adjustment operation is performed.

<<Detection of Focus Adjustment Operation in Consideration of Information on Change in Angle of View>>

In a case where the interchangeable lens CL has a zoom function and a zoom operation is performed, the phase difference detected in each of the divided areas A1 to A25 changes according to the operation. In a case where the zoom operation is performed, the detection of the focus adjustment operation is stopped, and thus, more stable and highly accurate detection of the focus adjustment operation can be performed.

In the present example, whether or not the zoom operation is performed is detected by detecting the change in the angle of view. That is, in a case where the change in the angle of view is detected, it is considered that the zoom is being operated, and the detection processing of the focus adjustment operation is stopped. In other words, only in a case where the zoom is not operated, that is, a case where the angle of view is maintained at a constant value, whether or not the focus adjustment operation is performed is detected.

Figure 31:
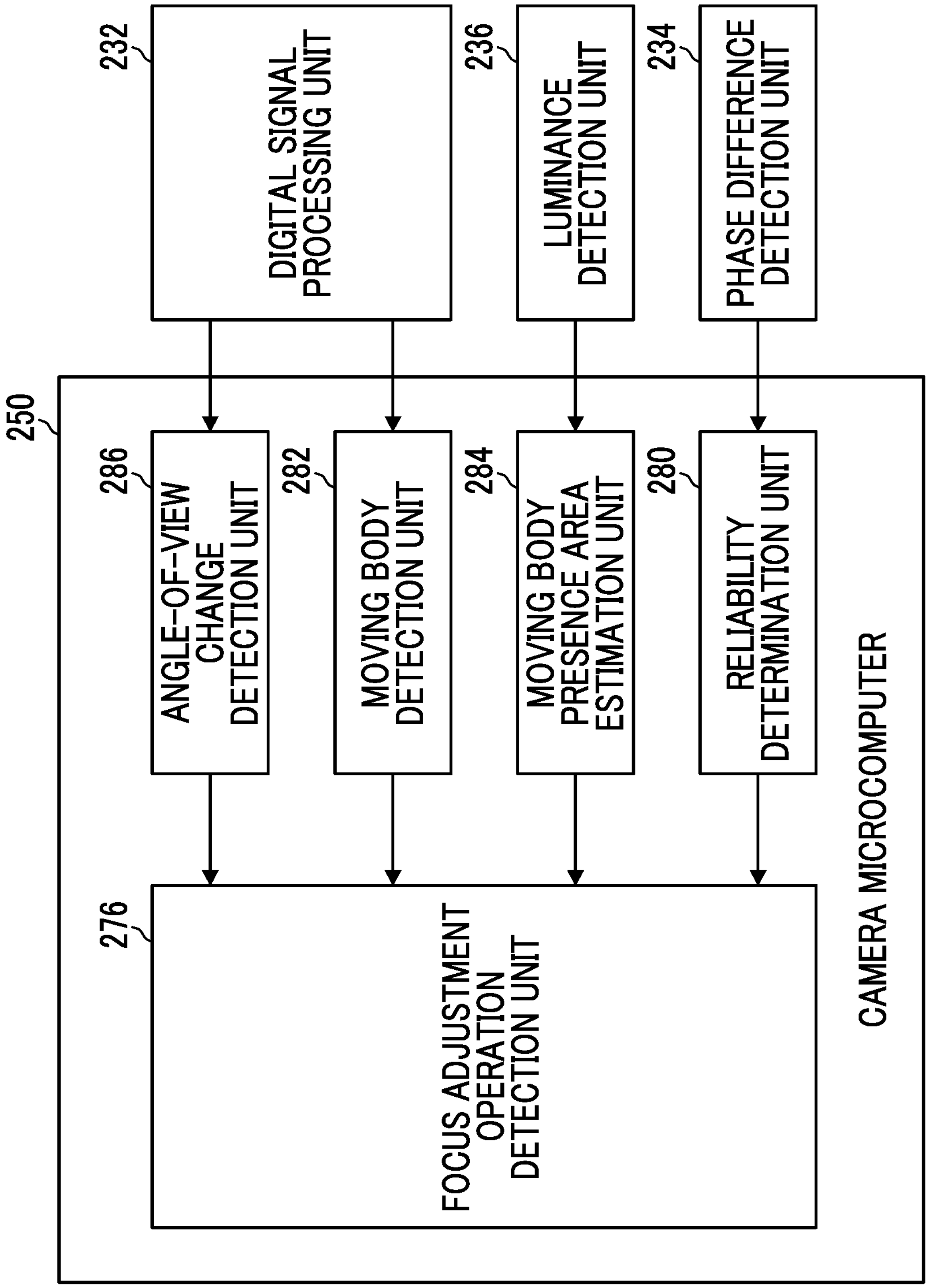
FIG. 31 is a block diagram of a main configuration in a case where whether or not the focus adjustment operation is performed is detected in consideration of information on a change in angle of view.

FIG. 31 is a block diagram of a main configuration a case where whether or not the focus adjustment operation is performed is detected in consideration of the information on the change in the angle of view.

As shown in this diagram, an angle-of-view change detection unit 286 is further provided. A function of the angle-of-view change detection unit 286 is realized by the camera microcomputer 250 executing a predetermined program.

The angle-of-view change detection unit 286 detects the change in the angle of view by analyzing the captured images sequentially obtained from the digital signal processing unit 232. A known technology (so-called detection of the change in the angle of view by image processing) is adopted for this processing. For example, a change in a position of the subject is detected from the captured images, and the change in the angle of view is detected.

The focus adjustment operation detection unit 276 stops the detection processing of the focus adjustment operation while the angle-of-view change detection unit 286 detects the change in the angle of view.

In the example shown in this diagram, the reliability determination unit 280, the moving body detection unit 282, and the moving body presence area estimation unit 284 are further provided, and whether or not the focus adjustment operation is performed is detected based on the change in the phase difference of the divided areas in which the reliability determination unit 280 determines that the phase difference is reliable. Whether or not the focus adjustment operation is performed is detected by excluding the divided area in which the moving body is detected by the moving body detection unit 282 and the divided area in which the presence of the moving body is estimated by the moving body presence area estimation unit 284.

Figure 32:
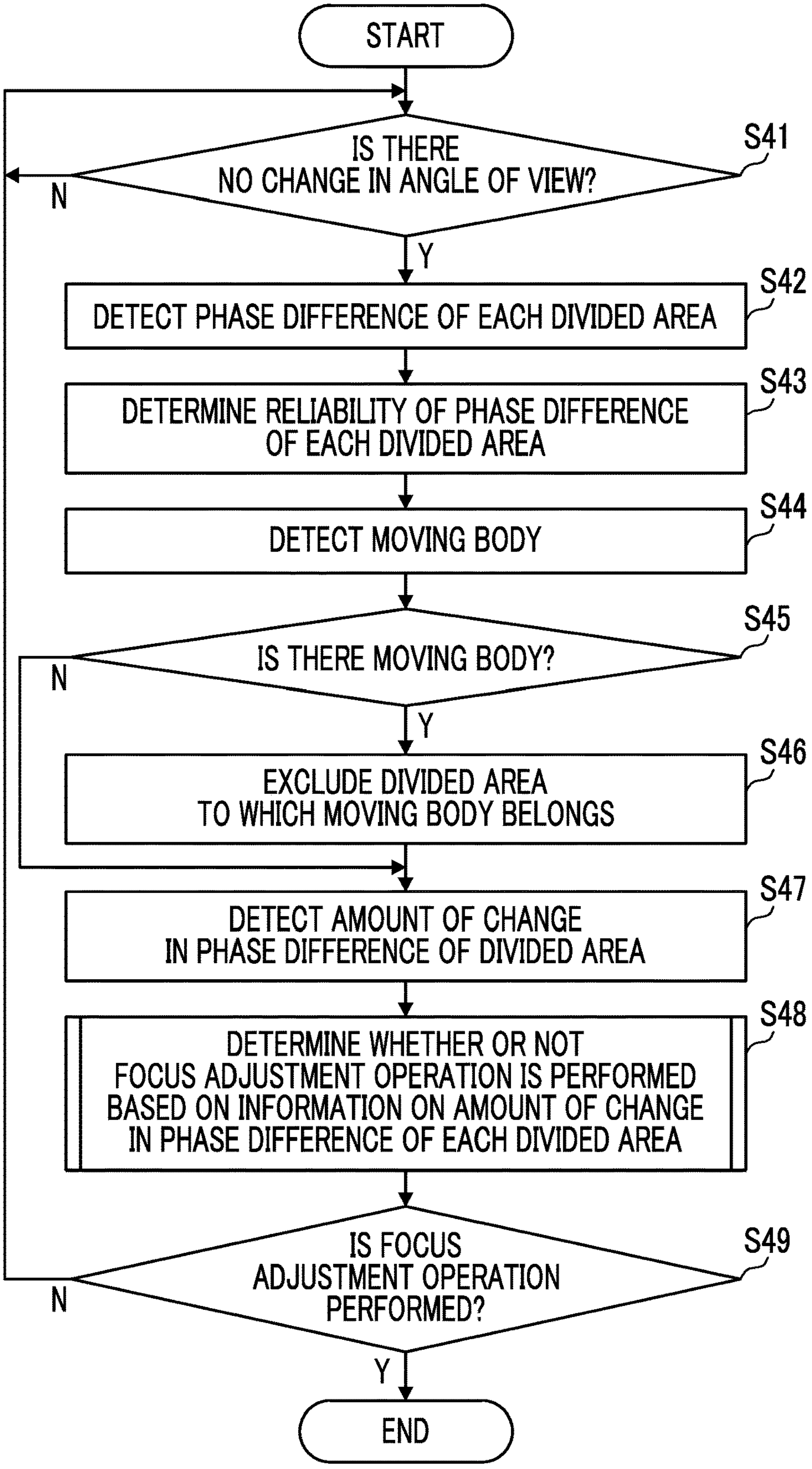
FIG. 32 is a flowchart showing a processing procedure in a case where whether or not the focus adjustment operation is performed is detected in consideration of information on the change in the angle of view.

FIG. 32 is a flowchart showing a processing procedure in a case where whether or not the focus adjustment operation is performed is detected in consideration of the information on the change in the angle of view.

First, it is determined whether or not the angle of view changes (step S41). That is, it is determined whether or not the change in the angle of view is detected by the angle-of-view change detection unit 286. In a case where the angle of view changes, it is determined that the zoom operation is being performed, and the subsequent processing is stopped. That is, the detection processing of the focus adjustment operation is stopped. In a case where the angle of view does not change, it is determined that the zoom operation is not performed, and the subsequent processing is performed. First, the phase difference for each of the divided areas A1 to A25 is detected (step S42). Subsequently, the reliability of the detected phase difference is determined (step S43). Subsequently, the moving body is detected (step S44). Subsequently, whether or not the moving body is present is determined based on the detection result of the moving body (step S45). In a case where the moving body is present, the divided area in which the moving body is present is specified, and the specified divided area is excluded from a detection target (step S46). Subsequently, the amount of change in the phase difference for each divided area is detected (step S47). At this time, in a case where the moving body is detected, the displacement amount of the divided area other than the excluded divided area is detected. The amount of change in the phase difference of the divided area in which it is determined that the phase difference is reliable is detected. Subsequently, processing for determining whether or not the focus adjustment operation is performed is performed based on the obtained information on the amount of change in the phase difference for each divided area (step S48). Subsequently, whether or not the focus adjustment operation is performed is determined based on the result of the determination processing (step S49).

As stated above, more stable and highly accurate detection can be performed by detecting whether or not the zoom operation is performed is detected from the change in the angle of view and performing the detection of the focus adjustment operation only in a case where the angle of view is maintained at a constant value.

<<Detection of Focus Adjustment Operation in Consideration of Information on Change in Brightness>>

In a case where the area to be captured changes due to panning or tilting, the phase difference detected in each of the divided areas A1 to A25 also changes. In a case where the area to be captured changes, the detection of the focus adjustment operation is stopped, and thus, a more stable and highly accurate focus adjustment operation can be detected.

In the present example, whether or not there is the change in the captured area is detected by detecting the change in brightness (luminance) of the entire screen. In a case where the brightness of the entire screen is changing, it is considered that the captured area is changing, and the detection processing of the focus adjustment operation is stopped.

Figure 33:
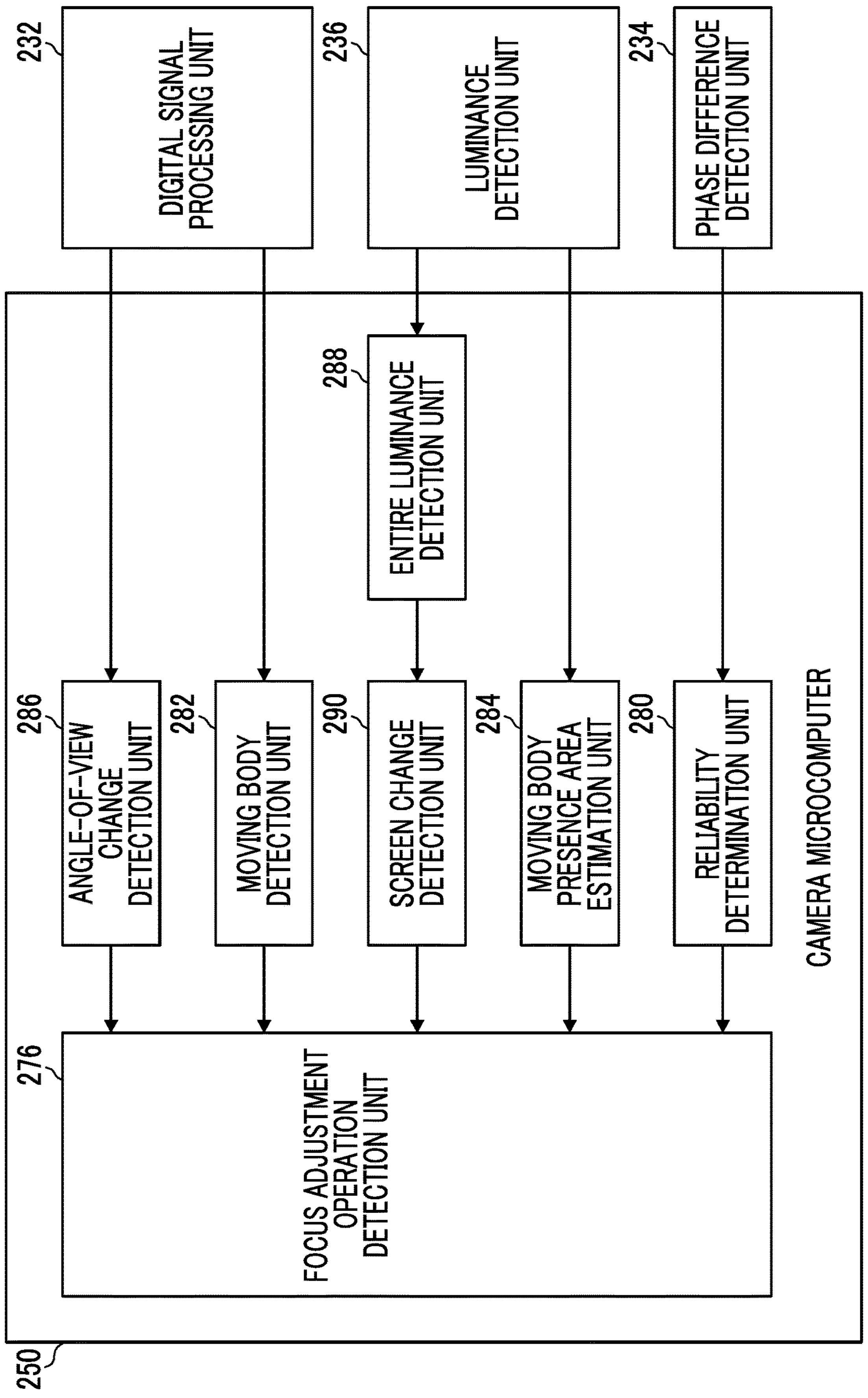
FIG. 33 is a block diagram of a main configuration in a case where whether or not the focus adjustment operation is performed is detected in consideration of information on a change in brightness of the entire screen.

FIG. 33 is a block diagram of a main configuration in a case where whether or not the focus adjustment operation is performed is detected in consideration of the information on the change in the brightness of the entire screen.

As shown in this diagram, an entire luminance detection unit 288 and a screen change detection unit 290 are further provided. Functions of the entire luminance detection unit 288 and the screen change detection unit 290 are realized by the camera microcomputer 250 executing a predetermined program.

The entire luminance detection unit 288 calculates the luminance of the entire screen, that is, the luminance of the entire area captured by the image sensor 200 via the interchangeable lens CL based on the change in the luminance of each of the divided areas A1 to A25 detected by the luminance detection unit 236.

The screen change detection unit 290 detects whether or not there is a change in the screen, that is, a change in the area captured by the image sensor 200 via the interchangeable lens CL based on the change in the luminance of the entire screen detected by the entire luminance detection unit 288. Specifically, the amount of change in the luminance of the entire screen per unit time is obtained, and is compared with a threshold value (second threshold value). In a case where the amount of change in the luminance of the entire screen per unit time exceeds the threshold value (second threshold value), it is determined that the screen is changing. The entire luminance detection unit 288 is an example of a second luminance detection unit.

The focus adjustment operation detection unit 276 stops the detection of the focus adjustment operation while the screen change detection unit 290 detects the change in the screen. In other words, whether or not the focus adjustment operation is performed is detected in a case where the screen change detection unit 290 does not detect the change in the screen. A case where the change in the screen is not detected by the screen change detection unit 290 is a case where the change in the luminance of the entire screen is equal to or less than the second threshold value.

In the example shown in this diagram, the reliability determination unit 280, the moving body detection unit 282, the moving body presence area estimation unit 284, and the angle-of-view change detection unit 286 are further provided, and whether or not the focus adjustment operation is performed is detected based on the change in the phase difference of the divided area in which the reliability determination unit 280 determines that the phase difference is reliable. Whether or not the focus adjustment operation is performed is detected by excluding the divided area in which the moving body is detected by the moving body detection unit 282 and the divided area in which the presence of the moving body is estimated by the moving body presence area estimation unit 284. The detection of the focus adjustment operation is stopped while the change in the angle of view is detected by the angle-of-view change detection unit 286.

Figure 34:
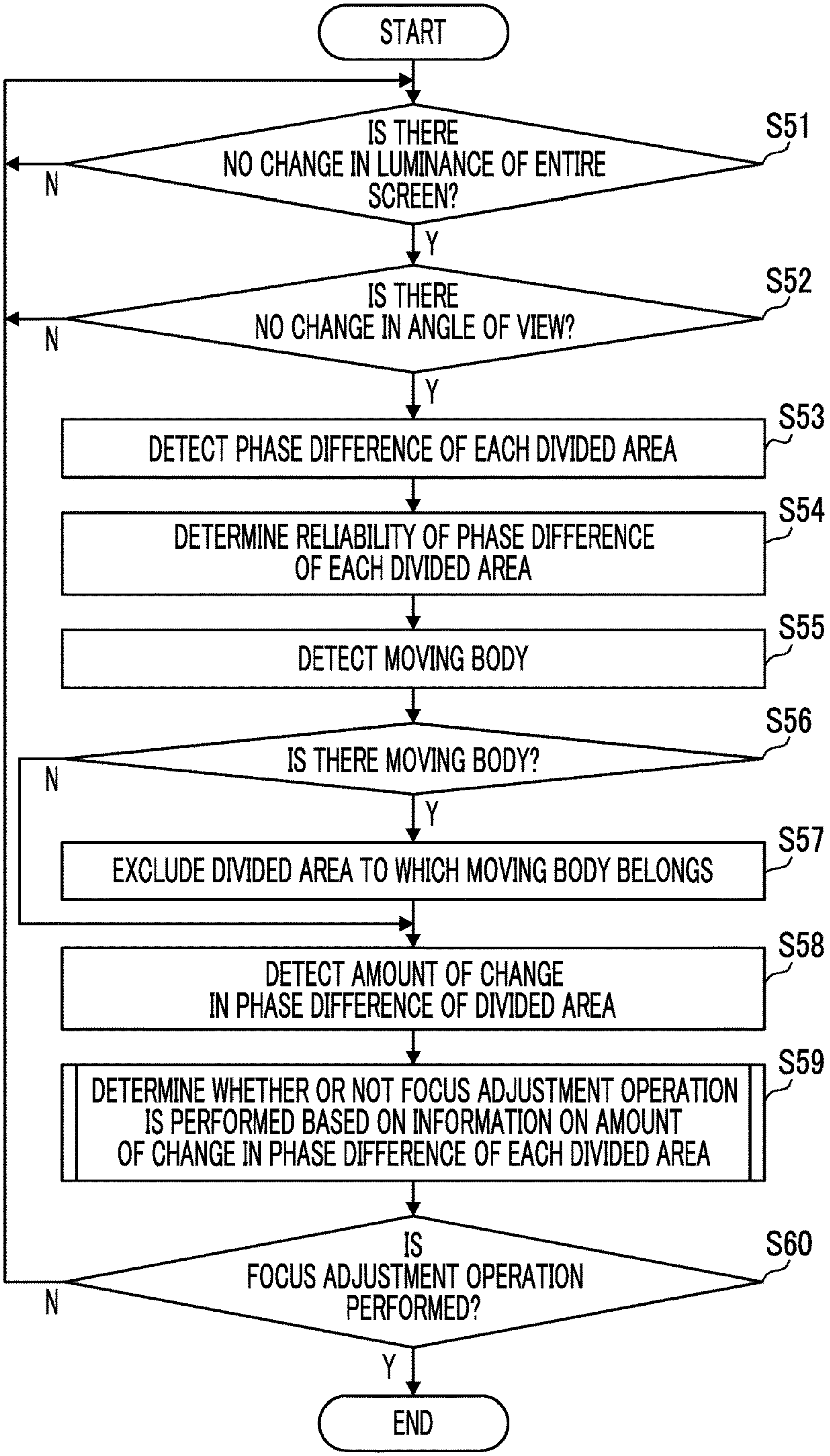
FIG. 34 is a flowchart showing a processing procedure in a case where whether or not the focus adjustment operation is performed is detected in consideration of information on the change in the brightness of the entire screen.

FIG. 34 is a flowchart showing a processing procedure in a case where whether or not the focus adjustment operation is performed is detected in consideration of the information on the change in the brightness of the entire screen.

First, it is determined whether or not there is the change in the luminance of the entire screen (step S51). In a case where there is the change in the luminance of the entire screen (case where the amount of change in the luminance of the entire screen is equal to or greater than the second threshold value), it is considered that the screen is changing, and the subsequent processing is stopped. Meanwhile, in a case where there is no change in the luminance of the entire screen (case where the amount of change in the luminance of the entire screen is less than the second threshold value), it is determined whether or not the angle of view changes (step S52). In a case where the angle of view changes, it is determined that the zoom operation is being performed, and the subsequent processing is stopped. In a case where the angle of view does not change, it is determined that the zoom operation is not performed, and the subsequent processing is performed. First, the phase difference for each of the divided areas A1 to A25 is detected (step S53). Subsequently, the reliability of the detected phase difference is determined (step S54). Subsequently, the moving body is detected (step S55). Subsequently, whether or not the moving body is present is determined based on the detection result of the moving body (step S56). In a case where the moving body is present, the divided area in which the moving body is present is specified, and the specified divided area is excluded from a detection target (step S57). Subsequently, the amount of change in the phase difference for each divided area is detected (step S58). At this time, in a case where the moving body is detected, the displacement amount of the divided area other than the excluded divided area is detected. The amount of change in the phase difference of the divided area in which it is determined that the phase difference is reliable is detected. Subsequently, processing for determining whether or not the focus adjustment operation is performed is performed based on the obtained information on the amount of change in the phase difference for each divided area (step S59). Subsequently, whether or not the focus adjustment operation is performed is determined based on the result of the determination processing (step S60).

As described above, more stable and highly accurate detection can be performed by detecting whether or not the screen changes from the change in the luminance of the entire screen and performing the detection of the focus adjustment operation only in a case where screen does not change.

In a case where the stop is operated, the luminance of the entire screen also changes, but in this case, the detection of the focus adjustment operation is stopped.

<<Modification Example of Detection Based on Change in Phase Difference for Each Divided Area>>

Although it has been described in the aforementioned embodiment that the change in the phase difference detected in each divided area, in particular, whether or not the focus adjustment operation is performed is detected based on the frequency distribution of the amount of change in the phase difference, the aspect of the detection is not limited thereto. For example, it is possible to detect whether or not the focus adjustment operation is performed from the change in the phase difference detected in each divided area by using a learned discriminator.

Although it has been described in the aforementioned embodiment that the divided areas are set by equally dividing the area captured by the image sensor 200 via the interchangeable lens vertically and horizontally, the aspect of the division is not limited thereto. It is also possible to set the divided areas discretely like the center and the four corners. Each divided area may be weighted.

<<Modification Example of Detection of Phase Difference>>

Although it has been described in the aforementioned embodiment that the phase difference is detected based on the output of the phase difference detection pixel provided on the image sensor, the method of detecting the phase difference for each divided area is not limited thereto. The phase difference for each divided area may be detected by using a known AF sensor (AF: Auto Focus) used for phase difference AF (AF: Auto Focus). In this case, AF sensors are provided corresponding to the divided areas.

[Notification of Operation Detection]

In a case where the focus adjustment operation of the interchangeable lens CL is detected, the focus adjustment operation detection unit 276 may notify the user of the detection. Accordingly, the user can recognize whether or not the detection is performed, and convenience can be improved.

For example, in a case where the focus adjustment operation is detected, a predetermined audio is output from the speaker 244. In a case where the focus adjustment operation detection unit 276 detects the focus adjustment operation, the audio input and output controller 269 outputs a predetermined audio from the speaker 244 via the audio signal processing unit 242. In this case, the audio input and output controller 269, the audio signal processing unit 242, and the speaker 244 constitute a notification unit.

For example, in a case where the focus adjustment operation is detected, a message or an icon indicating the detection is displayed on the main monitor 104 or the electronic viewfinder 108. In a case where the focus adjustment operation detection unit 276 detects the focus adjustment operation, the main monitor display controller 264 displays the message or the icon indicting the detection on the main monitor 104 via the LCD driver 104*a*. In a case where the focus adjustment operation detection unit 276 detects the focus adjustment operation, the EVF display controller 268 displays the message or the icon indicating the detection on the electronic viewfinder 108 via the LCD driver 108*a*. In this case, the main monitor display controller 264, the LCD driver 104*a*, and the main monitor 104 constitute a notification unit. The EVF display controller 268, the LCD driver 108*a*, and the electronic viewfinder 108 constitute a notification unit.

Modification Example of Assistance Function for Manual Focusing

In the case of achieving the in-focus state by assisting the manual focusing, it is preferable that the movement of the image sensor 200 is controlled such that the sum of the manual focus adjustment speed and the focus adjustment speed by the movement of the image sensor 200 is equal to or less than a predetermined speed. Specifically, the movement of the image sensor 200 is controlled such that the sum is equal to or less than the speed in the case of starting the assistance. Accordingly, the focusing can be assisted without giving the uncomfortable feeling. Since the assistance is started in a case where the defocus amount is equal to or less than the prescribed amount, the movement of the image sensor 200 is controlled such that the speed is equal to or less than a speed in a case where the defocus amount reaches the prescribed amount. For example, the in-focus state is achieved by controlling the movement of the image sensor 200 such that the speed is maintained at the speed in a case where the defocus amount reaches the prescribed amount. Alternatively, the in-focus state is achieved by controlling the movement of the image sensor 200 such that the speed of the sum gradually decreases from the speed in a case where the defocus amount reaches the prescribed amount.

The manual focus adjustment speed can be detected based on, for example, a change in the focus state detected by the focus state detection unit 252 or the change in the phase difference detected by the phase difference detection unit 234. That is, the manual focus adjustment speed is detected by detecting the speed of the change in the focus state or the speed of the change in the phase difference. Accordingly, for example, even in a case where the digital camera main body DCB cannot communicate with the interchangeable lens CL, the manual focus adjustment speed can be detected.

After the focusing is assisted, it is preferable that the in-focus state is maintained by moving the image sensor 200 within the movable range. In a case where the image sensor 200 reaches an end portion of the movable range, the image sensor may be returned to a reference position, or may stand by at a position of the end portion. In a case where the image sensor is returned to the reference position, it is preferable that the image sensor 200 is moved according to the change speed of the focus. Accordingly, the image sensor 200 can be returned to an origin position without giving an uncomfortable feeling to the user.

In a case where the in-focus state is released after being brought into the in-focus state by the assistance, the assistance is performed in a case where the condition is satisfied again.

[Movable Range of Image Sensor]

The movable range of the image sensor 200 is optionally set within a mechanical operation range of the image sensor movement drive unit 222. For example, in a case where the image sensor movement drive unit 222 is a piezo actuator, the movable range of the image sensor 200 is optionally set within the mechanical operation range of the piezo actuator. As the movable range of the image sensor 200 becomes wider, the range of the focus adjustment executable on the digital camera main body side becomes wider.

As in the digital camera of the aforementioned embodiment, in a case where the focus is adjusted by using the main monitor 104 or the electronic viewfinder 108, it is preferable that the movable range of the image sensor 200 is set with consideration for the resolution of the main monitor 104 and the electronic viewfinder 108. In a case where the resolution of the main monitor 104 and the electronic viewfinder 108 is lower than the resolution of the image sensor 200, the accuracy capable of being adjusted on the main monitor 104 and the electronic viewfinder 108 is limited. Therefore, it is preferable that the movable range is set such that the range that cannot be adjusted can be covered by the movement of the image sensor 200 in the main monitor 104 and the electronic viewfinder 108. Specifically, it is preferable that the movable range equal to or greater than a pixel pitch of the main monitor 104 and the electronic viewfinder 108 is secured. Accordingly, even though the focus is adjusted by using the main monitor 104 or the electronic viewfinder 108 having a low resolution, the target subject can be focused with high accuracy.

[Reference Position of Image Sensor]

Although it has been described in the aforementioned embodiment that the reference position of the image sensor 200 is set at the center of the movable range, the position set as the reference position is not limited thereto. For example, the reference position may be set at a position on the subject side (front side) from the center of the movable range, or the reference position may be set at a position on the image plane side (rear side). The user may set any position.

Although it has been described in the aforementioned embodiment that the reference position is set at the position of the flange back, the reference position may be set at a position different from the flange back. As described above, it is possible to maximize the optical performance of the interchangeable lens CL in the case of performing the focusing at the reference position by setting the reference position at the flange back position.

[Image Sensor Movement Drive Unit]

Although it has been described in the aforementioned embodiment that the image sensor 200 is moved along the optical axis Z by using the piezo actuator, the configuration of the image sensor movement drive unit is not limited thereto. The image sensor 200 can be moved by using a known linear-motion-type drive mechanism such as a linear motor or a leadscrew mechanism.

[Imaging Unit]

Although it has been described in the aforementioned embodiment that the present invention is applied to a single-sensor digital camera has been described as an example, the present invention can also be applied to a multi-sensor camera.

Figure 35:
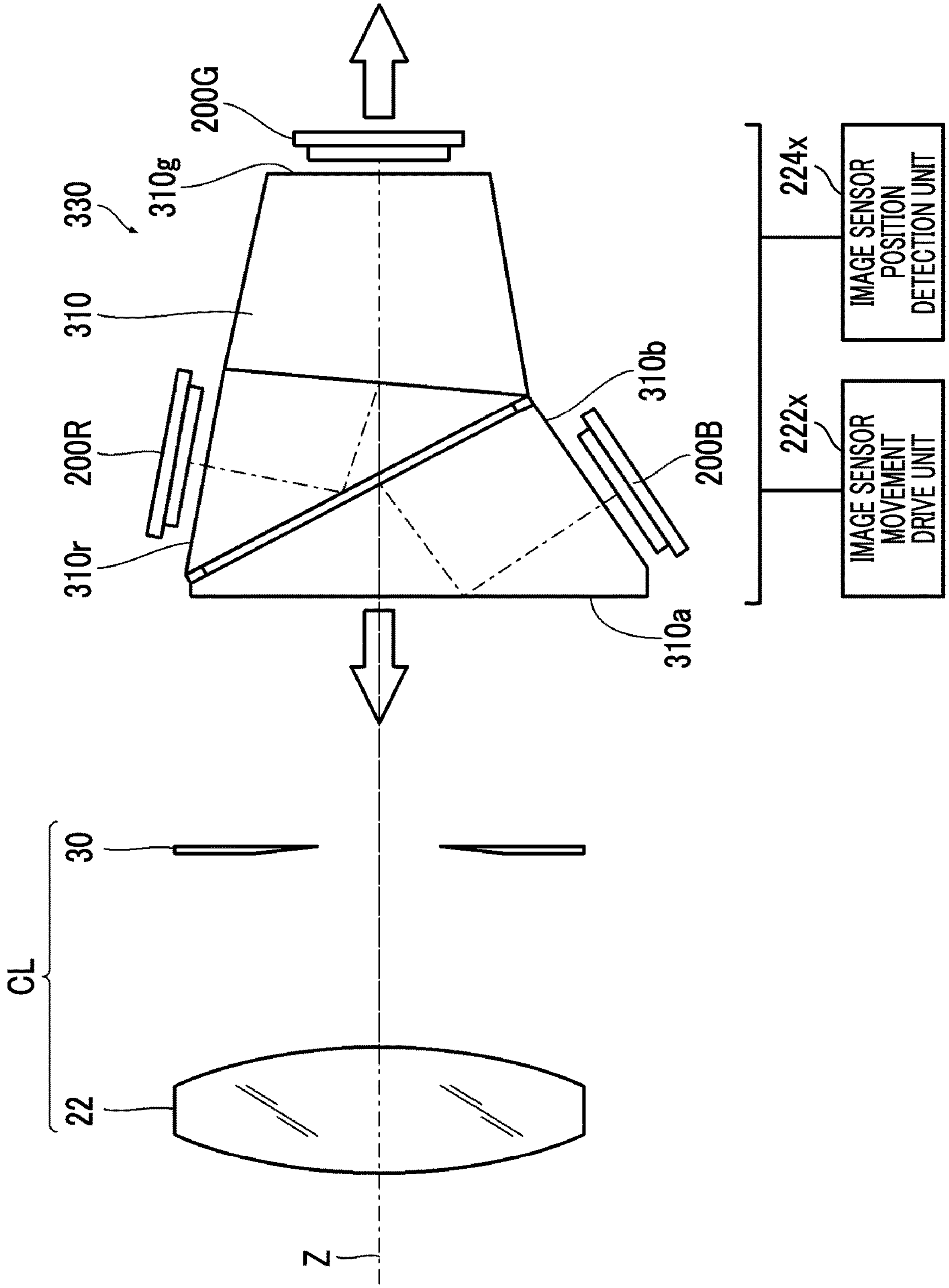
FIG. 35 is a diagram showing an example in a case where the present invention is applied to a three-sensor digital camera.

FIG. 35 is a diagram showing an example in a case where the present invention is applied to a three-sensor digital camera.

As shown in this diagram, the three-sensor digital camera comprises a color separation prism 310 and three image sensors 200R, 200G, and 200B in the imaging unit.

The color separation prism 310 separates light incident on an incident surface 310*a* into light rays of three colors of red (R) light, green (G) light, and blue (B) light. The separated light rays of the three colors are emitted from an R light exit surface 310*r*, a G light exit surface 310*g*, and a B light exit surface 310*b*, respectively.

The three image sensors include an image sensor 200R that receives R light, an image sensor 200G that receives G light, and an image sensor 200B that receives B light.

The image sensor 200R that receives the R light is disposed so as to face the R light exit surface 310*r*, and receives the R light emitted from the R light exit surface 310*r*.

The image sensor 200G that receives the G light is disposed so as to face the G light exit surface 310*g*, and receives the G light emitted from the G light exit surface 310*g*.

The image sensor 200B that receives the B light is disposed so as to face the B light exit surface 310*b*, and receives the B light emitted from the B light exit surface 310*b*.

The three image sensors 200R, 200G, and 200B are arranged at positions at which optical path lengths from the incident surface 310*a* of the color separation prism 310 are identical.

The three image sensors 200R, 200G, and 200B are integrally attached to the color separation prism 310 via a holder (not shown). A unit in which the image sensors 200R, 200G, and 200B are integrally attached to the color separation prism 310 is referred to as an imaging unit 330. An image sensor movement drive unit 222*x* moves the imaging unit 330 back and forth along the optical axis Z. An image sensor position detection unit 224*x* detects a position of the imaging unit 330 relative to the reference position.

[Imaging Lens]

Although it has been described in the aforementioned embodiment that the focus is adjusted by moving the focus lens back and forth along the optical axis, a focus adjustment mechanism of the imaging lens is not limited thereto. A liquid lens or a liquid crystal lens can be used as the focus lens. In the liquid lens and the liquid crystal lens, the focus is adjusted by using a change in refractive index.

[Imaging Device]

Although it has been described in the aforementioned embodiment that the present invention is applied to the digital camera, the application of the present invention is not limited thereto. For example, the present invention can be applied to a video camera, a television camera, and a cinema camera, and can be similarly applied to electronic devices (for example, a mobile phone, a smartphone, a tablet personal computer, and a laptop personal computer) having an imaging function.

In the above-described embodiment, the case where the present invention is applied to an interchangeable lens type digital camera has been described as an example. However, the present invention can be similarly applied to a camera in which an imaging lens is integrated in a digital camera main body.

The camera microcomputer 250 may perform various processing performed by the lens microcomputer 40. For example, the camera microcomputer 250 may perform drive control of the focus lens group 22 and drive control of the stop 30.

[Others]

Although it has been described in the aforementioned embodiments that the function of the focus adjustment operation detection unit is realized by the microcomputer, the hardware configuration for realizing the functions is not limited thereto. These functions can be realized by various processors. A CPU which is a general-purpose processor functioning as a processing unit that performs various processing by executing software (program) and a dedicated electric circuit which is a processor having a circuit configuration designed as a dedicated circuit in order to execute specific processing such as programmable logic device (PLD) and application specific integrated circuit (ASIC) of which a circuit configuration can be changed after field-programmable gate array (FPGA) is manufactured are included in the various processors. The medium in which the predetermined program (for example, the focus adjustment operation detection program or the focusing assistance program) is stored may be a non-transitory computer-readable recording medium such as a hard disk, a compact disk (CD), a digital versatile disk (DVD), and various semiconductor memories.

One processing unit may be constituted by one of these various processors, or may be constituted by two or more processors of the same type or different types. For example, one processing unit may be constituted by a plurality of FPGAs or a combination of a CPU and FPGA.

A plurality of processing units may be constituted by a single processor. As an example in which the plurality of processing units is constituted by one processor, there is a first example in which one processor is constituted by a combination of one or more CPUs and software or one processor functions as the plurality of processing units as represented by a computer such as a client or server. There is a second example in which as represented by system on chip (SoC), a processor that realizes the functions of the entire system including the plurality of processing units by a single integrated circuit (IC) chip is used. As described above, the various processing units are constituted by using one or more of the various processors as a hardware structure.

The hardware structures of these various processors are more specifically electric circuits in which circuit elements such as semiconductor elements are combined.

EXPLANATION OF REFERENCES

12: lens barrel
**12*a***: lens side mount
14: lens operation unit
16: focus ring
18: stop ring
20: lens side focus adjustment mechanism
22: focus lens group
24: focus lens drive unit
26: focus lens position detection unit
30: stop
32: stop drive unit
40: lens microcomputer
42: focus lens controller
46: stop controller
48: lens side communication controller
50: manual focus adjustment mechanism
52: manual stop switching mechanism
102: main body side mount
104: main monitor
**104*a***: LCD driver
106: sub monitor
**106*a***: LCD driver
108: electronic viewfinder
**108*a***: LCD driver
110: camera operation unit
111: sensitivity dial
112: delete button
113: power lever
114: shutter button
115: drive button
116: sub monitor illumination button
117: shutter speed dial
118: playback button
119: front command dial
120: rear command dial
121: focus lever
122: quick menu button
123: menu/OK button
124: selector button
125: display/BACK button
126: first function button
127: second function button
128: third function button
129: fourth function button
130: fifth function button
132: focus mode switching lever
200: image sensor
200B: image sensor
200G: image sensor
200R: image sensor
202: imaging surface
206: normal pixel
208: phase difference detection pixel
208A: first phase difference detection pixel
208B: second phase difference detection pixel
210: mechanical shutter
212: shutter drive unit
220: main body side focus adjustment unit
222: image sensor movement drive unit
**222*x***: image sensor movement drive unit
224: image sensor position detection unit
**224*x***: image sensor position detection unit
226: image sensor drive unit
228: analog signal processing unit
230: analog-to-digital converter (ADC)
232: digital signal processing unit
234: phase difference detection unit
236: luminance detection unit
238: memory card interface

240: memory card
242: audio signal processing unit
244: speaker
246: microphone
250: camera microcomputer
252: focus state detection unit
254: exposure setting unit
256: automatic focusing controller
258: focusing assistance controller
260: exposure controller
262: recording controller
264: main monitor display controller
266: sub monitor display controller
268: EVF display controller
269: audio input and output controller
270: main body side communication controller
272: lens attachment detection unit
274: communication availability determination unit
276: focus adjustment operation detection unit
280: reliability determination unit
282: moving body detection unit
284: moving body presence area estimation unit
286: angle-of-view change detection unit
288: entire luminance detection unit
290: screen change detection unit
310: color separation prism
310*a*: incident surface
310*b*: B light exit surface
310*g*: G light exit surface
310*r*: R light exit surface
330: imaging unit
A1 to A25: divided areas
C1: graph
C2: graph
C3: graph
C4: graph
C5: graph
C6: graph
C7: graph
C8: graph
C9: graph
CL: interchangeable lens
CL1: interchangeable lens
CL2: interchangeable lens
CLG: interchangeable lens group
DC: digital camera
DCB: digital camera main body
DCS: digital camera system
M: subject
M1: first subject
M2: second subject
Z: optical axis
S1 to S3: procedure of detection processing of focus adjustment operation executed by focus adjustment operation detection unit
S2A to S2F: procedure of processing for determining presence and absence of focus adjustment operation
S11 to S15: procedure of focusing assistance processing
S21 to S25: processing procedure in case presence or absence of focus adjustment operation is detected based on change in phase difference of reliable divided area
S31 to S38: processing procedure in case presence or absence of focus adjustment operation is detected by excluding divided area where moving body is present
S41 to S49: processing procedure in case presence or absence of focus adjustment operation is detected in consideration of information on change in angle of view
S51 to S60: processing procedure in case presence or absence of focus adjustment operation is detected in consideration of info illation on change in luminance of entire screen

What is claimed is:

1. A focus adjustment operation detection device comprising:

an image sensor configured to image an optical image passed through an imaging lens, the image sensor having an imaging surface divided into a plurality of divided areas each of which includes a phase difference detection pixel; and at least one processor configured to:

detect a phase difference for each divided area based on an output of the phase difference detection pixel;

detect a change in an angle of view; and detect whether or not a focus adjustment operation of the imaging lens is performed based on an amount of change in the phase difference for each divided area, in a case where the detected angle of view is maintained at a constant value, wherein the at least one processor detects luminance of an entire area to be imaged through the imaging lens, wherein, in a case where a change in the luminance per unit time is equal to or less than a second threshold value, the at least one processor determines that a screen is changed, and wherein the at least one processor stops the detection of the focus adjustment operation of the imaging lens, during when the change in the screen is detected.

2. An imaging device main body comprising:

a mount which an imaging lens is attachable to and detachable from; and the focus adjustment operation detection device according to claim 1.

3. An imaging device comprising:

an imaging lens;

the focus adjustment operation detection device according to claim 1.

4. A focus adjustment operation detection device comprising:

an image sensor configured to image an optical image passed through an imaging lens, the image sensor having an imaging surface divided into a plurality of divided areas each of which includes a phase difference detection pixel; and at least one processor configured to:

detect a phase difference for each divided area based on an output of the phase difference detection pixel;

analyze an image to be imaged by the imaging sensor and detect a moving body in a divided area to be imaged;

detect whether or not a focus adjustment operation of the imaging lens is performed based on an amount of change in the phase difference for each divided area, wherein the divided area in which the moving body is detected is excluded in the detection of whether or not the focus adjustment operation of the imaging lens is performed, wherein the at least one processor detects luminance for each divided area, and extracts a divided area in which an amount of change in the luminance is equal to or greater than a first threshold value to estimate the divided area in which a moving body is present, and wherein in the detection of whether or not the focus adjustment operation of the imaging lens is performed, the at least one processor excludes: the divided area in which the moving body is detected; and the divided area which is estimated that the moving body is present therein.

5. A focus adjustment operation detection device comprising:

an image sensor configured to image an optical image passed through an imaging lens, the image sensor having an imaging surface divided into a plurality of divided areas each of which includes a phase difference detection pixel; and at least one processor configured to:

detect a phase difference for each divided area based on an output of the phase difference detection pixel;

detect luminance for each divided area;

extract a divided area in which a change in the luminance per unit time is equal to or greater than a first threshold value to estimate the divided area in which a moving body is present; and detect whether or not a focus adjustment operation of the imaging lens is performed based on an amount of change in the phase difference for each divided area, wherein the divided area which is estimated that the moving body is present therein is excluded in the detection of whether or not the focus adjustment operation of the imaging lens is performed.

6. A focus adjustment operation detection method comprising:

detecting a phase difference for each divided area of an image to be imaged by an image sensor which is configured to image an optical image passed through an imaging lens and has an imaging surface divided into a plurality of divided areas each of which includes a phase difference detection pixel, based on an output of the phase difference detection pixel;

detecting a change in an angle of view; and detecting whether or not a focus adjustment operation of the imaging lens is performed based on an amount of change in the phase difference for each divided area, in a case where the detected angle of view is maintained at a constant value, detecting luminance of an entire area to be imaged through the imaging lens; and detecting whether or not a screen is changed based on a change in the luminance of the entire area to be imaged through the imaging lens, wherein, in a case where the change in the luminance per unit time is equal to or less than a second threshold value, it is determined that a screen is changed, wherein the detection of the focus adjustment operation of the imaging lens is stopped during when the change in the screen is detected.

7. A focus adjustment operation detection method comprising:

detecting a phase difference for each divided area of an image to be imaged by an image sensor which is configured to image an optical image passed through an imaging les and has an imaging surface divided into a plurality of divided areas each of which includes a phase difference detection pixel, based on an output from the phase difference detection pixel; and analyzing the image to be imaged by the imaging sensor to detect a moving body in a divided area to be imaged;

detecting whether or not a focus adjustment operation of the imaging lens is performed based on an amount of change in the phase difference for each divided area, wherein the divided area in which the moving body is detected is excluded in the detecting of whether or not the focus adjustment operation of the imaging lens is performed;

detecting luminance for each divided area; and extracting a divided area in which an amount of change in the luminance is equal to or greater than a first threshold value to estimate the divided area in which a moving body is present, wherein in the detecting of whether or not the focus adjustment operation of the imaging lens is performed, the divided area in which the moving body is detected and the divided area which is estimated that the moving body is present therein, are excluded.

8. A focus adjustment operation detection method comprising:

detecting a phase difference for each divided area of an image to be imaged by an image sensor which is configured to image an optical image passed through an imaging les and has an imaging surface divided into a plurality of divided areas each of which includes a phase difference detection pixel, based on an output from the phase difference detection pixel; and detecting luminance for each divided area;

extracting a divided area in which a change in the luminance per unit e is equal to or greater than a first threshold value to estimate the divided area in which a moving body is present; and detecting whether or not a focus adjustment operation of the imaging lens is performed based on an amount of change in the phase difference for each divided area, wherein the divided area which is estimated that the moving body is present therein is excluded, in the detecting of whether or not the focus adjustment operation of the imaging lens is performed.

9. A non-transitory computer-readable recording medium causing a computer to realize a focus adjustment operation detection function in a case where a command stored in the recording medium is read by the computer, the focus adjustment operation detection function comprising the functions of:

detecting a phase difference for each divided area of an image to be imaged by an image sensor which is configured to image an optical image passed through an imaging lens and has an imaging surface divided into a plurality of divided areas each of which includes a phase difference detection pixel, based on an output of the phase difference detection pixel;

detecting a change in an angle of view; and detecting whether or not a focus adjustment operation of the imaging lens is performed based on an amount of change in the phase difference for each divided area, in a case where the detected angle of view is maintained at a constant value, detecting luminance of an entire area to be imaged through the imaging lens; and detecting whether or not a screen is changed based on a change in the luminance of the entire area to be imaged through the imaging lens, wherein, in a case where the change in the luminance per unit time is equal to or less than a second threshold value, it is determined that a screen is changed, wherein the detection of the focus adjustment operation of the imaging lens is stopped during when the change in the screen is detected.

10. A non-transitory computer-readable recording medium causing a computer to realize a focus adjustment operation detection function in a case where a command stored in the recording medium is read by the computer, the focus adjustment operation detection function comprising the functions of:

detecting a phase difference for each divided area of an image to be imaged by an image sensor which is configured to image an optical image passed through an imaging les and has an imaging surface divided into a plurality of divided areas each of which includes a phase difference detection pixel, based on an output from the phase difference detection pixel; and analyzing the image to be imaged by the imaging sensor to detect a moving body in a divided area to be imaged;

detecting whether or not a focus adjustment operation of the imaging lens is performed based on an amount of change in the phase difference for each divided area, wherein the divided area in which the moving body is detected is excluded in the detecting of whether or not the focus adjustment operation of the imaging lens is performed, detecting luminance for each divided area; and extracting a divided area in which an amount of change in the luminance is equal to or greater than a first threshold value to estimate the divided area in which a moving body is present, wherein in the detecting of whether or not the focus adjustment operation of the imaging lens is performed, the divided area in which the moving body is detected and the divided area which is estimated that the moving body is present therein, are excluded.

11. A non-transitory computer-readable recording medium causing a computer to realize a focus adjustment operation detection function in a case where a command stored in the recording medium is read by the computer, the focus adjustment operation detection function comprising the functions of:

detecting a phase difference for each divided area of an image to be imaged by an image sensor which is configured to image an optical image passed through an imaging les and has an imaging surface divided into a plurality of divided areas each of which includes a phase difference detection pixel, based on an output from the phase difference detection pixel; and detecting luminance for each divided area;

extracting a divided area in which a change in the luminance per unit time is equal to or greater than a first threshold value to estimate the divided area in which a moving body is present; and detecting whether or not a focus adjustment operation of the imaging lens is performed based on an amount of change in the phase difference for each divided area, wherein the divided area which is estimated that the moving body is present therein is excluded, in the detecting of whether or not the focus adjustment operation of the imaging lens is performed.

* * * * *